US012634758B2

(12) United States Patent
Zhu et al.

(10) Patent No.: US 12,634,758 B2
(45) Date of Patent: May 19, 2026

(54) MULTI-ACCESS TRAFFIC MANAGEMENT

(71) Applicant: Intel Corporation, Santa Clara, CA (US)

(72) Inventors: Jing Zhu, Portland, OR (US); Menglei Zhang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/139,887

(22) Filed: Apr. 26, 2023

(65) Prior Publication Data

US 2024/0056885 A1 Feb. 15, 2024

Related U.S. Application Data

(60) Provisional application No. 63/455,921, filed on Mar. 30, 2023, provisional application No. 63/346,149, filed on May 26, 2022.

(51) Int. Cl.
H04W 28/086 (2023.01)
H04W 76/15 (2018.01)

(52) U.S. Cl.
CPC ....... H04W 28/0861 (2023.05); H04W 76/15 (2018.02)

(58) Field of Classification Search
CPC .... H04W 28/0861; H04W 76/15; H04L 45/24
See application file for complete search history.

(56) References Cited

U.S. PATENT DOCUMENTS

| | | | | |
|---|---|---|---|---|
| 2014/0068104 A1* | 3/2014 | Armstrong | .............. | H04L 45/00 |
| | | | | 709/238 |
| 2019/0363843 A1* | 11/2019 | Gordaychik | .......... | H04L 1/1835 |
| 2020/0236727 A1* | 7/2020 | Salkintzis | ............. | H04W 48/18 |
| 2021/0083983 A1* | 3/2021 | Chin | ..................... | H04L 63/029 |
| 2021/0409335 A1 | 12/2021 | Zhu et al. | | |
| 2022/0369398 A1* | 11/2022 | Akl | ......................... | H04W 76/12 |
| 2023/0397084 A1* | 12/2023 | Shah | ..................... | H04W 40/12 |
| 2024/0214882 A1* | 6/2024 | Zhuo | ..................... | H04W 28/09 |
| 2024/0349161 A1* | 10/2024 | Malkamäki | .......... | H04W 40/02 |
| 2025/0055920 A1* | 2/2025 | Kweon | ................. | H04L 67/125 |
| 2025/0056376 A1* | 2/2025 | Dortschy | .............. | H04W 40/34 |

(Continued)

FOREIGN PATENT DOCUMENTS

WO WO-2019207403 A1 * 10/2019 ............. H04L 47/32

OTHER PUBLICATIONS

Beibei, Qiu, "What is Hierarchical Quality of Service (HQoS)?", Huawei IP Encyclopedia, https://info.support.huawei.com/info-finder/encyclopedia/en/HQoS.html, Last updated Sep. 30, 2021, 6 pages.

(Continued)

*Primary Examiner* — Sudesh M. Patidar
(74) *Attorney, Agent, or Firm* — Compass IP Law PC

(57) ABSTRACT

Examples described herein relate to a network device that includes at least one network interface and circuitry. In some examples, the circuitry is to transmit one or more packets for Integrated Access Backhaul (IAB) via a 3rd Generation Partnership Project (3GPP)-consistent wireless network and transmit one or more other packets for IAB to Multi Access Management Services (MAMS) over Generic Multi-Access (GMA) over a second network.

18 Claims, 28 Drawing Sheets

(56) References Cited

U.S. PATENT DOCUMENTS

2025/0106162 A1\*  3/2025  Di Girolamo  ........  H04W 24/08

OTHER PUBLICATIONS

Feng, Wu-chang et al., "A Self-Configuring RED Gateway", In IEEE INFOCOM'99, Conference on Computer Communications. Proceedings. Eighteenth Annual Joint Conference of the IEEE Computer and Communications Societies. The Future is Now (Cat. No. 99CH36320), vol. 3, Mar. 1999, IEEE, pp. 1320-1328.

Feng, Wu-chang et al., "BLUE: A New Class of Active Queue Management Algorithms", http://www.eecs.umich.edu/techreports/cse/99/CSE-TR-387-99.pdf, Published 1999, 27 pages.

Floyd, Sally et al., "Adaptive RED: An Algorithm for Increasing the Robustness of RED's Active Queue Management", http://www.icir.org/floyd/papers/adaptiveRed.pdf, Aug. 2001, 12 pages.

Kanugovi, Satish et al., RFC 8743, "Multi-Access Management Services (MAMS)", https://www.rfc-editor.org/rfc/rfc8743.txt, Mar. 2020, 100 pages.

Kundel, Ralf et al., "OpenBNG: Central office network functions on programmable data plane hardware", Special Issue Paper, https://onlinelibrary.wiley.com/doi/pdf/10.1002/nem.2134, Accepted Jul. 13, 2020, 25 pages.

Metaswitch, "What is 5G Integrated Access and Backhaul (IAB)?", https://www.metaswitch.com/knowledge-center/reference/what-is-5g-integrated-access-and-backhaul-iab, 2020, 2 pages.

Murillo, Sergio Garcia and Garcia, Gustavo, "Chrome's WebRTC VP9 SVC Layer Cake", https://webrtchacks.com/chrome-vp9-svc/, Feb. 14, 2017, 13 pages.

Nichols, Kathleen et al., RFC 8289, "Controlled Delay Active Queue Management", https://datatracker.ietf.org/doc/html/rfc8289, Jan. 2018, 25 pages.

O-RAN ALLIANCE, "O-RAN ALLIANCE Announces New Leadership, New Specifications, 3 Face-to-Face Meetings in 2023 and Further Alignment with TIP", https://www.businesswire.com/news/home/20221116005893/en/O-RAN-ALLIANCE-Announces-New-Leadership-New-Specifications-3-Face-to-Face-Meetings-in-2023-and-Further-Alignment-with-TIP, Nov. 16, 2022, 3 pages.

Pan, Rong et al., RFC 8033, "Proportional Integral Controller Enhanced (PIE): A Lightweight Control Scheme to Address the Bufferbloat Problem", https://datatracker.ietf.org/doc/html/draft-ietf-aqm-pie, Feb. 2017, 30 pages.

Rhee, Injong et al., RFC 8312, "CUBIC for Fast Long-Distance Networks", https://www.rfc-editor.org/rfc/rfc8312, Feb. 2018, 18 pages.

Rosenberg, Jonathan et al., RFC 3489 "STUN—Simple Traversal of User Datagram Protocol (UDP) Through Network Address Translators (NATs)", https://www.ietf.org/rfc/rfc3489.txt, Mar. 2003, 41 pages.

Szigeti, Tim et al., RFC 8325, "Mapping Diffserv to IEEE 802.11", https://www.rfc-editor.org/rfc/rfc8325.html, Feb. 2018, 37 pages.

Uberti, Justin et al., "RTP Payload Format for VP9 Video", Internet Draft, https://www.ietf.org/archive/id/draft-ietf-payload-vp9-16.txt, Jun. 10, 2021, 22 pages.

Wikipedia, "Random early detection: Revision history", https://en.wikipedia.org/wiki/Random_early_detection, Last updated Mar. 27, 2023, 3 pages.

Zhou, Kaiyu et al., "Nonlinear RED: A simple yet efficient active queue management scheme", http://www.sciencedirect.com/science/article/pii/S1389128606000879, ScienceDirect, vol. 50, Issue 18, Dec. 21, 2006, 8 pages.

Zhu, Jing and Kanugovi, Satish, "Generic Multi-Access (GMA) Convergence Encapsulation Protocols", Internet Draft, https://tools.ietf.org/html/draft-zhu-intarea-gma-05, Dec. 16, 2019, 12 pages.

Zhu, Jing and Kanugovi, Satish, RFC 9188, "Generic Multi-Access (GMA) Encapsulation Protocol", https://www.rfc-editor.org/rfc/rfc9188.txt, Feb. 2022, 13 pages.

Zhu, Jing and Zhang, Menglei, "UDP-based Generic Multi-Access (GMA) Control Protocol", Internet Draft, https://www.ietf.org/archive/id/draft-zhu-intarea-gma-control-00.txt, Oct. 13, 2021, 17 pages.

Zhu, Jing and Zhang, Menglei, "UDP-based Generic Multi-Access (GMA) Control Protocol", Internet Draft, https://www.ietf.org/archive/id/draft-zhu-intarea-gma-control-02.txt, Oct. 3, 2022, 16 pages.

Zhu, Xiaoqing et al., RFC 8698, "Network-Assisted Dynamic Adaptation (NADA): A Unified Congestion Control Scheme for Real-Time Media", https://www.rfc-editor.org/rfc/rfc8698.html, Feb. 2020, 22 pages.

Zhu, Jing., Kanugovi, Satish., RFC 9188, "Generic Multi-Access (GMA) Encapsulation Protocol", Published Feb. 2022, 15 pages.

U.S. Appl. No. 18/139,887, Figures 1A, 1B, 1C, 2 Known Prior Art, May 2022.

\* cited by examiner

FIG. 5

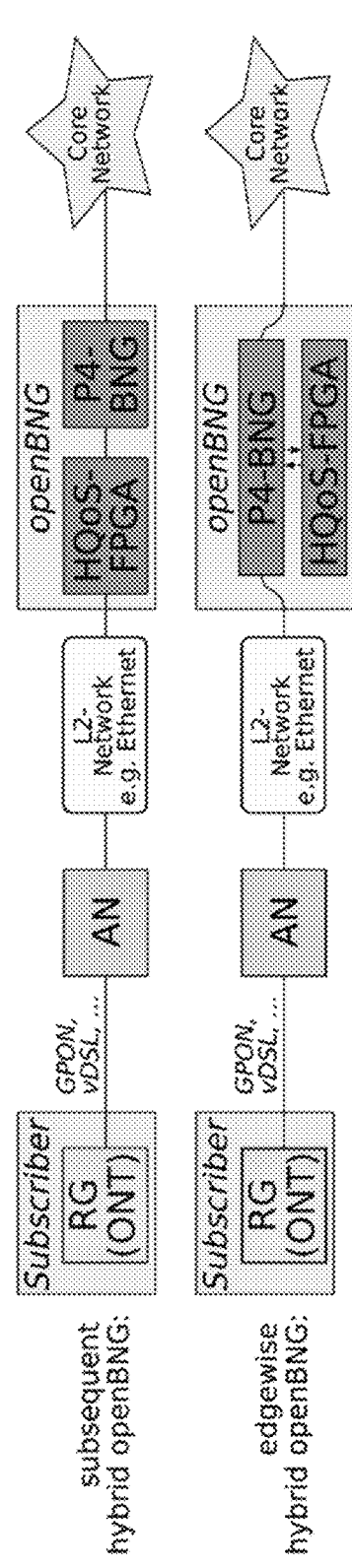
FIG. 13

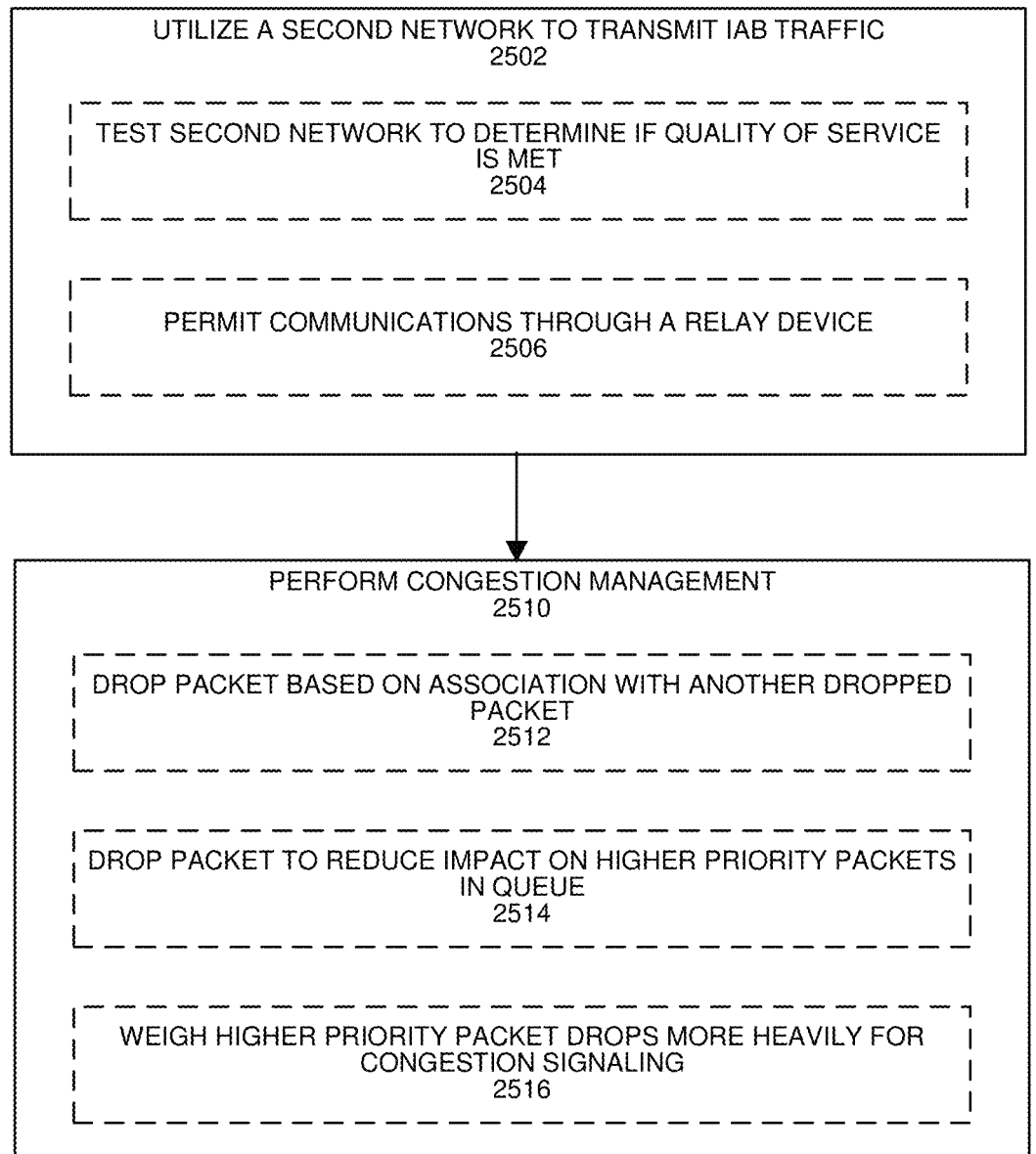

UTILIZE A SECOND NETWORK TO TRANSMIT IAB TRAFFIC
2502

TEST SECOND NETWORK TO DETERMINE IF QUALITY OF SERVICE IS MET
2504

PERMIT COMMUNICATIONS THROUGH A RELAY DEVICE
2506

PERFORM CONGESTION MANAGEMENT
2510

DROP PACKET BASED ON ASSOCIATION WITH ANOTHER DROPPED PACKET
2512

DROP PACKET TO REDUCE IMPACT ON HIGHER PRIORITY PACKETS IN QUEUE
2514

WEIGH HIGHER PRIORITY PACKET DROPS MORE HEAVILY FOR CONGESTION SIGNALING
2516

FIG. 25

MULTI-ACCESS TRAFFIC MANAGEMENT

RELATED APPLICATIONS

This application claims priority to U.S. Provisional Application No. 63/346,149, filed May 26, 2022 and U.S. Provisional Application No. 63/455,921, filed Mar. 30, 2023. The entire contents of those applications are incorporated by reference in their entirety.

BACKGROUND

A device (e.g., mobile stations, user equipment (UEs), etc.) can be simultaneously connected to multiple communication networks based on different technology implementations (including different Radio Access Technologies (RATs)) and network architectures. In such multi-connectivity scenarios, it may be desirable to combine multiple access networks or select the best one to improve quality of experience (QoE) for a user and improve overall network utilization and efficiency. An access network can include a segment in a network that delivers user data packets to a client via an access link such as a WiFi (e.g., IEEE 802.11) airlink, a cellular airlink, or digital subscriber link (DSL). QoE perceived by the end users as well as utilization of resources can be adjusted based on selection and combination of the paths used for the user plane (UP). In a solution, network paths can be dynamically selected based on knowledge of current conditions in the relevant access networks.

Multi Access Management Services (MAMS) provides a programmable framework for flexible selection of network paths in a multi-connection (access) communication environment, based on application needs. MAMS leverages network intelligence and policies to dynamically adapt traffic distribution across selected paths and user plane treatment to changing network/link conditions. The network path selection and configuration messages can be carried as user plane data between the functional elements in the network and the end-user device, and thus without any impact to the control plane signaling schemes of the individual access network. MAMS can improve user experience (e.g., higher throughput, lower latency, and higher reliability), by intelligently splitting, steering, or duplicating traffic over multiple connections.

The MAMS framework enables selection and flexible combination of access and core network paths based on defined policies. By use of up-to-date information from available access networks, network efficiency and end user QoE perception can be tuned based on application needs. The MAMS framework can be used to flexibly select the combination of uplink (UL) and downlink (DL) access and core network paths, and UP treatment for improving network utilization and efficiency and enhancing QoE for user applications (apps). With the MAMS framework, network paths can be selected on the UP level without impacting control plane signaling of underlying access networks. Various aspects of the MAMS framework are discussed at least in Kanugovi et al., Multi-Access Management Services (MAMS), Internet Engineering Task Force (IETF), Request for Comments (RFC) 8743 (March 2020) ("[RFC8743]").

Generic Multi-Access (GMA) Encapsulation Protocol (e.g., Zhu et al., Generic Multi-Access (GMA) Convergence Encapsulation Protocols, IETF, RFC 9188, ISSN: 2070-1721 (February 2022) ("[RFC9188]")) convergence protocol has been proposed to support multi-path management by adding additional control information for multi-path management (e.g., sequence number into internet protocol (IP) data packet).

BRIEF DESCRIPTION OF THE DRAWINGS

FIG. 5 shows an example MX-IAB Data-Plane and Control-Plane Protocol Stack.

FIG. 13 depicts an example Broadband Network Gateway (BNG) pipeline.

FIG. 25 depicts an example process.

DETAILED DESCRIPTION

Figure 1A:
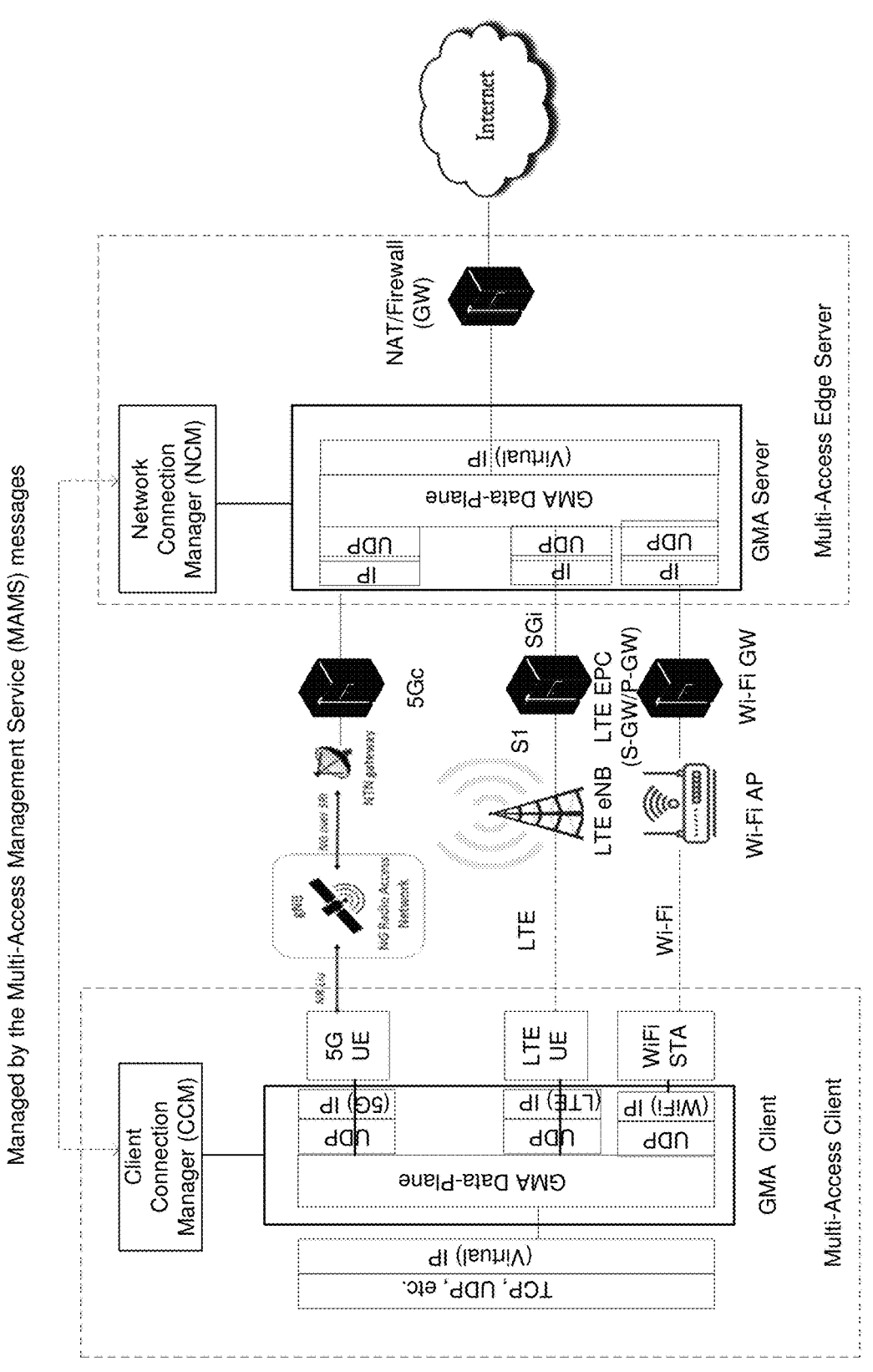
FIG. 1A depicts an example MAMS over GMA (MAMS/GMA) End-to-End Network Reference Architecture.

FIG. 1A depicts an example MAMS over GMA (MAMS/GMA) End-to-End Network Reference Architecture. In this example, a MAMS server runs in the edge and delivers traffic over multiple connections or paths, e.g., Wi-Fi, LTE/5G, cellular, Satellite, coaxial cable, fiber optics, and so forth. Integrated Access and Backhaul (IAB) (e.g., release 16 within technical specification TS 38.401 (2020)) can leverage spectral efficiencies of radio and the increased capacity afforded by higher bands available in 5G to deliver an alternative to optical cell site backhaul. This alleviates one of the primary issues surrounding the deployment of 5G and can be employed as an alternative to fiber or as a permanent option for more isolated antennas or those without right of way access. IAB has adopted Internet Protocol (IP) over a new Backhaul Adaption Protocol (BAP) layer defined within 3rd Generation Partnership Project (3GPP) TS 38.340 (2022). Note that any reference to a standard or proposal herein can apply to a prior version or subsequent version of the standard or proposal.

IAB utilizes a decomposed radio access network (RAN) model, which decouples the distributed unit (DU) from the central unit (CU). The DU is present in the IAB nodes and the doner system also includes a CU. A single gNodeB (gNB) can include a CU and DU and a single IAB system can include one or more IAB nodes and one or more IAB donors to isolate backhaul within a topologically constrained environment. Isolating backhaul can prevent routing changes or problems from being propagated into a 5G core (5GC) or other adjacent gNB s.

Figure 1B:
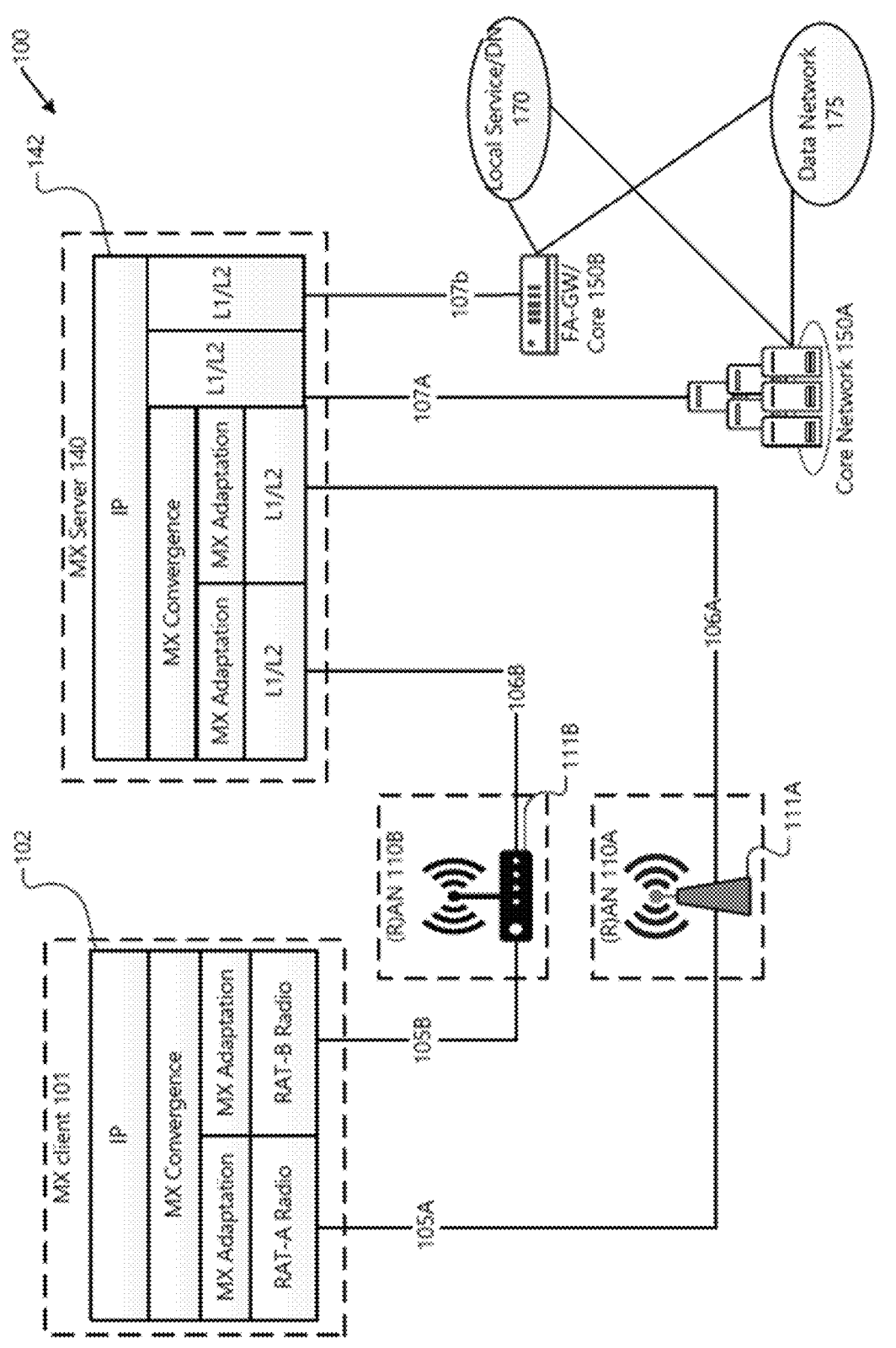
FIG. 1B depicts an example multi-access network 100 utilizing MAMS technology.

FIG. 1B depicts an example multi-access ("MX" or "MA") network 100 utilizing MAMS technology. In particular, FIG. 1B shows a MAMS e2e UP protocol stack in the MX network 100, which includes both WiFi and 3GPP-based access. In this example, an MX client 101 includes a UP protocol stack 102 and a server 140 includes a UP protocol stack 142.

MX client 101 can include an end-user device that supports connections with one or more access nodes, possibly over different access technologies (or RATs), and is also referred to as a user station, user device, user equipment (UE), or multi-radio UE 101. The client 101 may be a multi-connectivity client 101 that has, or supports, multiple network connections.

MX server 140 (or "MAMS server 140") can provide MAMS-related user-plane (UP) functionalities and/or optimizations in the network 100. MX server 140 can aggregate multiple network paths 105, 106, 107, and/or the forwarding of user data traffic across multiple network paths 105, 106, 107. The MX server 140 may also be referred to as an MX gateway and/or a Network Multi Access Data Proxy (N-MADP) (see e.g., N-MADP 237 of FIG. 1C). MX server 140 may be referred to as server 140, a MAMS server 140, MA server 140, edge node 140, Multi-access Edge Computing (MEC) host 140, MAMS-MEC system 140, or similar. When the client 101 transmits packets to server 140, client 101 may be referred to as a "MAMS transmitter," "MX transmitter," or the like, and server 140 may be referred to as a "MAMS receiver," "MX receiver," or the like. When client 101 receives packets from the server 140, the client 101 may be referred to as a "MAMS receiver," "MX receiver," or the like, and the server 140 may be referred to as a "MAMS transmitter," "MX transmitter," or the like.

In some examples, an MEC framework is discussed at least in ETSI GR MEC 001 v3.1.1 (2022-01), ETSI GS MEC 003 v3.1.1 (2022-03), ETSI GS MEC 009 v3.1.1 (2021-06), ETSI GS MEC 010-1 v1.1.1 (2017-10), ETSI GS MEC 010-2 v2.2.1 (2022-02), ETSI GS MEC 011 v2.2.1 (2020-12), ETSI GS MEC 012 V2.2.1 (2022-02), ETSI GS MEC 013 V2.2.1 (2022-01), ETSI GS MEC 014 v2.1.1 (2021-03), ETSI GS MEC 015 v2.1.1 (2020-06), ETSI GS MEC 016 v2.2.1 (2020-04), ETSI GS MEC 021 v2.2.1 (2022-02), ETSI GR MEC 024 v2.1.1 (2019-11), ETSI GS MEC 028 V2.2.1 (2021-07), ETSI GS MEC 029 v2.2.1 (2022-01), ETSI MEC GS 030 v2.1.1 (2020-04), ETSI GR MEC 031 v2.1.1 (2020-10), U.S. Provisional App. No. 63/003,834 filed Apr. 1, 2020 ("[US'834]"), and Int'l App. No. PCT/US2020/066969 filed on Dec. 23, 2020 ("[PCT'696]") (collectively referred to herein as "[MEC]").

In some examples, MAMS server 140 runs in an edge computing system/platform/network and/or a cloud computing system/service/platform, and can deliver traffic between client server over multiple connections or paths. In some examples, the edge compute nodes comprise(s) a MEC host (or MEC server). Additionally or alternatively, the MX server 140 may include one or more MEC applications (apps) operated by a MEC server/host (see e.g., "[MEC]"). Various aspects of MEC hosts and MAMS servers are discussed in more detail infra.

The MX UE 101 (or "multi-radio UE 101") accesses or otherwise communicates with a data network (DN) 175 or local service 170 (also referred to as a local DN 170) via one or more (radio) access networks ("(R)ANs") 110 and the server 140. Each (R)AN 110 is a segment in a network that delivers user data packets to the client 101 and/or server 140 via access link(s) 105, which may be a wired connection (e.g., Ethernet, DSL, Coax, USB, and/or the like) or a wireless (radio) connection (e.g., WiFi airlink, 5G/NR airlink, LTE airlink, and/or the like). One or more of the (R)ANs 110 implement an access technology ("AT"), which is the underlying mechanism(s) used to access a corresponding network.

In some examples, the AT is a fixed access (wired) technology such as Ethernet, digital subscriber line technologies (DSL or xDSL); G.hn; coaxial cable access ("coax") such as Multimedia over Coax Alliance (MoCA), Data Over Cable Service Interface Specification (DOCSIS), and/or the like; powerline communication ("PLC" or "powerline") such as high definition (HD)-PLC and/or the like; Fiber to the x (FTTX; also referred to as "fiber in the loop"); Passive Optical Network (PON); and/or the like. Here, (R)AN node 111 may be a broadband modem (e.g., cable modem, DSL modem, an Optical Network Terminal (ONT) or an Optical Network Unit (ONU), G.hn semiconductor device, etc.), which may be used in combination with customer premises equipment (e.g., home/enterpris router(s), residential/enterprise gateway(s), mesh network device(s), WiFi access point(s), etc.). Fixed AN node 111 can connect the client 101 to access network 110 via an access connection 105 that operates according to an access protocol (e.g., Ethernet, V.35, Universal Serial Bus (USB) and/or Ethernet over USB, Point-to-Point Protocol over Ethernet (PPPoE), Internet Protocol over Ethernet (IPoE), G.hn, DOCSIS, and/or the like). Here, the access connection 105 may include one or more wires (e.g., telephone wiring, coax, power lines, plastic and/or glass optical fibers, and/or the like), and the particular wires used may depend on the underlying AT and/or infrastructure.

In some examples, the AT may be a radio access technology (RAT) such as 3GPP Long Term Evolution (LTE), 3GPP Fifth Generation (5G)/New Radio (NR), MulteFire, ETSI Global System for Mobile Communications (GSM), WiFi®, Worldwide Interoperability for Microwave Access (WiMAX) (sometimes referred to as "wireless broadband" or "WiBro"), and/or the like. (R)ANs 110 could also encompass personal area network technologies such as Bluetooth® or Bluetooth Low Energy (BLE), IEEE 802.15.4 based protocols (e.g., 6LoWPAN, WirelessHART, MiWi, Thread, etc.), WiFi-direct, and/or the like. One or more of (R)AN 110 includes one or more (R)AN nodes 111, which may be macro cell base stations, remote radio heads (RRHs), small and/or micro cell base stations, access points (APs), home gateways (HGs), and/or other like network elements. A collection of (R)AN nodes 111 may also be referred to as an "access level edge network" or "access level edge." The (R)AN nodes 111 are configurable or operable to perform setup of transport resources, (e.g., for CDN services and/or other application level services) as well as scheduling signaling resources for providing network service of the underlying access network/RAT. Here, the access connection 105 may include wireless or air interfaces based on the underlying RAT (e.g., Uu-interface for LTE or 5G/NR RATs, PC5 interface for LTE or 5G/NR RATs, WiFi air interface for WLAN RATs, millimeter wave (mmWave) interface, Visible Light Communication (VLC) interface, and/or the like).

Each (R)AN 110*a*, 110*b* includes one or more respective network access nodes (NANs) 111*a*, 111*b*, which is/are communicatively coupled with/to a respective back-end network. One way to implement this service model is to use a multi-path Layer-4 (transport) solution such as Multi-Path Transmission Control Protocol (TCP) (e.g., IETF RFC 6824 (January 2013)("[RFC6824]")) or MultiPath QUIC (MPQUIC) (e.g., De Coninck et al., "Multipath Extensions for QUIC (MP-QUIC)," draft-deconinck-quic-multipath-07, IETA, QUIC Working Group (3 May 2021) ("[MPQUIC]")). A Layer-3 solution (see e.g., Zhu et al., "User-Plane Protocols for Multiple Access Management Service," draft-zhu-intarea-mams-user-protocol-09, IETA, INTAREA (4 Mar. 2020) ("[UPMAMS]")) has been proposed to support multi-path management without such limitations and drawback. In this implementation, the addition control information for multi-path management (e.g., sequence number, etc.) is appended as a trailer at the end of IP packet.

In the example of FIG. 1B, (R)AN 110A is a 3GPP-based access network such as an LTE E-UTRAN where one or more (R)AN nodes 111A are evolved NodeBs (eNBs) or a next generation RAN (NG-RAN) where the one or more (R)AN nodes 111 are Next Generation NodeBs (gNBs) and/or NG Evolved Node-Bs (NG-eNBs). Additionally, in the example of FIG. 1B, the (R)AN 110A is a WiFi-based access network where the (R)AN nodes 111B are WiFi Access Points (APs). APs may be, for example, wireless routers, roadside ITS stations or roadside units, gateway appliances, central hubs, or the like. The multi-radio UE 101 is capable of establishing a 3GPP access link 105A with eNB/gNB 111A (e.g., Uu interface or the like), and capable of establishing a WiFi access link 105B with AP 111B. eNB/gNB 111A communicates with the server 140 via a 3GPP backhaul link 106A and the AP 111B communicates with the server 140 via a WiFi backhaul link 106B. The 3GPP backhaul link 106A and the WiFi backhaul link 106B may be a suitable wired connection such as Ethernet, USB, Data Highway Plus (DH+), PROFINET, or the like. Furthermore, the MX server 140 is also communicatively coupled with a core network 150A via backhaul interface 107A and communicatively coupled with a Fixed Access (FA) gateway (GW) and/or FA-Core network 150B via backhaul link 107B. Core network 150A may be a 3GPP core network such as a 5G core network (5GC) or an LTE Evolved Packet Core (EPC). Additionally or alternatively, the FA-GW may be a broadband network gateway (BNG) and/or the FA-Core may be broadband core that provides transport, and various resources provide content (provider data center, video head end, and so on). Additionally or alternatively, the FA-GW/Core may be a residential gateway (RG), a 5G-RG, a Fixed Network (FN) RG (FN-RG), an FN Broadband RG (FN-BRG), an FN Cable RG (FN-CRG), a Wireline 5G Access Network (W-5GAN), a Wireline 5G Cable Access Network (W-5GCAN), a Wireline Access Gateway Function (W-AGF), and/or some other suitable element/entity.

Individual links 105, 106, or 107 may be referred to as access network connections (ANCs) or access network paths (ANPs). For example, an ANC or ANP may comprise a radio link 105 between client 101 and (R)AN node 111 in one or both directions. Additionally or alternatively, an ANC or ANP may refer to a combination of a link 105 and link 106 between client 101 and MX server 140 in one or both directions. Additionally or alternatively, an ANC or ANP may refer to a combination of a of links/paths 105, 106 and 107 between client 101 and local service 170 or data network 175 in one or both directions. Unless stated otherwise, the terms ANC, ANP, "link," "channel," "path," "connection," and the like may be used interchangeably throughout the present disclosure.

Additionally, client 101 is configured provide radio information to one or more NANs 111 and/or one or more other entities/elements (e.g., Edge server(s), (R)AN(s) 110, core network function(s) (NF(s)), application function(s) (AF(s)), app server(s), cloud service(s), and/or the like). The radio information may be in the form of one or more measurement reports, and/or may include, for example, signal strength measurements, signal quality measurements, and/or the like. Each measurement report is tagged with a timestamp and the location of the measurement (e.g., the current location of the client 101). As examples, the measurements collected by the client 101 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/ WiFi networks. Other measurements may be additionally or alternatively used, such as those discussed in 3GPP TS 36.214 v16.2.0 (2021-03-31) ("[TS36214]"), 3GPP TS 38.215 v16.4.0 (2020-12) ("[T S38215]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021-02-26) ("[IEEE80211]"), and/or the like. Additionally or alternatively, any of the aforementioned measurements (or combination of measurements) may be collected by one or more NANs 111.

Additionally or alternatively, any of the aforementioned measurements (or combination of measurements) may be collected by one or more NANs 111 and provided to a suitable entity/element (e.g., Edge server(s), (R)AN(s) 110, NF(s), AF(s), app server(s), cloud service(s), and/or the like). The radio information may be reported either at a low periodicity or a high periodicity depending on a data transfer that is to take place, and/or other information about the data transfer. Additionally or alternatively, the element/entity may request the measurements from the NANs 111 at low or high periodicity, or the NANs 111 may provide the measurements to the element/entity at low or high periodicity. Additionally or alternatively, the element/entity may obtain other relevant data (e.g., Key Performance Indicators (KPIs), Key Quality Indicators, (KQIs), and/or the like) from other same or similar elements/entities with the measurement reports or separately from the measurement reports.

MAMS is a programmable framework that provides mechanisms for the flexible selection of network paths in an MX communication environment 100, based on the application needs and/or requirements, as well as adapt to dynamic network conditions when multiple network connections serve a client device 101. The MAMS framework leverages network intelligence and policies to dynamically adapt traffic distribution across selected paths and UP treatments (e.g., encryption needed for transport over WiFi, or tunneling needed to overcome a network address translation (NAT) between client 101 and a multi-path proxy) to changing network/link conditions. Network path selection and configuration messages are carried as UP data between the functional elements in the MX network 100B and the client 101, and thus, with little or no impact on the control plane (CP) signaling schemes of the underlying access networks (e.g., WiFi and 3GPP access networks in FIG. 1B). For example, in MX network 100 with 3GPP and WiFi technologies existing LTE and WiFi signaling procedures will be used to set up the LTE and WiFi connections, respectively, and MAMS-specific CP messages are carried as LTE or WiFi UP data. The MAMS framework defined in this document provides the capability to make a smart selection of a flexible combination of access paths and core network paths, as well as to choose the UP treatment when the traffic is distributed across the selected paths. Thus, it is a broad programmable framework that provides functions beyond the simple sharing of network policies such as those provided by the Access Network Discovery and Selection Function (ANDSF) discussed in 3GPP TS 24.312 v15.0.0 (2018-06-21) ("[TS24312]"), which offers policies and rules for assisting 3GPP clients to discover and select available access networks. Further, it allows the choice and configuration of UP treatment for the traffic over the paths, depending on the application's needs.

The MAMS framework mechanisms may not be dependent on specific access network types or UP protocols (e.g., TCP, user datagram protocol (UDP), Generic Routing Encapsulation (GRE), quick UDP Internet Connections (QUIC), Multipath TCP (MPTCP), SCTP, MultiPath QUIC (MPQUIC), etc.). The MAMS framework coexists and complements the existing protocols by providing a way to negotiate and configure those protocols to match their use to a given MA scenario based on client and network capabilities, and the specific needs of each access network path. Further, the MAMS framework allows load balancing of the traffic flows across the selected access network paths, and the exchange of network state information to be used for network intelligence to optimize the performance of such protocols.

The MAMS framework is based on principles of UP interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

FIG. 1B also depicts a MAMS Data Plane Protocol Stack (DPPS) for transporting user payloads, for example, an IP Protocol Data Unit (PDU) carried via the IP layer and/or the like. The DPPS 102 and 142 includes the client-side MAMS DPPS 102 implemented by the client 101 and the server-side MAMS DPPS 142 implemented by the server 140. For devices equipped with multiple radio link technologies (or multiple RAT circuitries), such as 5G/NR, LTE, WiFi, etc., MAMS [RFC8743] provides a programmable framework to dynamically select and transmit data simultaneously over multiple radio links for high throughput, low latency, and improved reliability. The MAMS DPPS 102, 142 includes the following two (sub)layers: the convergence (sub)layer and the adaptation (sub)layer. The MX adaptation (sub)layer is added to (or on top of) each RAT circuitry, and the MX convergence (sub)layer connects the IP and MX adaptation (sub)layers.

The MX convergence layer is configurable or operable to perform MX-specific tasks in the UP. The MX convergence layer performs multi-access specific tasks/functions such as, for example, access (path) selection, multi-link (path) aggregation, splitting/reordering, lossless switching, keep-alive, probing, fragmentation, and/or concatenation. The MX convergence layer can be implemented by using existing UP protocols such MPTCP, Multipath QUIC (MPQUIC), or by adapting encapsulating header/trailer schemes such as GRE or Generic Multi-Access (GMA). In some implementations, the MX convergence supports GMA, MPTCP Proxy, GRE Aggregation Proxy, and MPQUIC. As discussed in more detail infra, the GMA protocol may be used to encode additional control information (e.g., Key, Sequence Number, Timestamp, etc.) at this (sub)layer.

The MX adaptation layer is configurable or operable to address and/or handle transport-network-related aspects such as, for example, tunneling, network-layer reachability and/or security, and NAT. The MX Adaptation Layer can be implemented using existing protocols (e.g., TCP, UDP, IPSec, QUIC, etc.). Additionally or alternatively, the MX Adaptation Layer can be implemented using UDP tunneling, IPsec, DTLS (see e.g., Rescorla et al., "Datagram Transport Layer Security Version 1.2", IETF, RFC 6347 (January 2012) and/or Moriarty et al., "Deprecating TLS 1.0 and TLS 1.1", IETF, RFC 8996 (March 2021) (collectively "[DTLS]"), or a Client NAT (e.g., a source NAT at the client with inverse mapping at the server 140 and/or Network Multi Access Data Proxy (N-MADP) 237 of FIG. 1C). Additionally or alternatively, the adaptation method of the MX Adaptation Layer is UDP without DTLS, UDP with DTLS, IPsec (see e.g., Huttunen et al., "UDP Encapsulation of IPsec ESP Packets", IETF, Network Working Group, RFC 3948 (January 2005) ("[RFC3948]")), or Client NAT.

The MX Adaptation Layer can be independently configured for one or more of the access links 105A and 105B. In particular, UP packets of the anchor connection can be encapsulated in a UDP tunnel of a delivery connection between the N-MADP and C-MADP (see e.g., N-MADP 237 and C-MADP 207 in FIG. 1C), an IPsec tunnel can be established between the N-MADP and C-MADP (see e.g., N-MADP 237 and C-MADP 207 in FIG. 1C) on the network path that is considered untrusted, and/or DTLS can be used if UDP tunneling is used on the network path that is considered "untrusted". For example, in FIG. 1B including 3GPP (R)AN 110A (assumed secure) and WiFi (R)AN 110B (assumed to not be secure), the MX adaptation layer can be omitted for the 3GPP link 105A, but is configured with IPsec to secure the WiFi link 105B.

The MX convergence layer operates on top of the MX adaptation sublayer in the protocol stack. From the transmitter (Tx) perspective, a user payload (e.g., IP PDU) is processed by the MX convergence layer first, and then by the MX adaptation layer before being transported over a delivery access connection, From the receiver (Rx) perspective, an IP packet received over a delivery connection is processed by the MX adaptation sublayer first, and then by the MX convergence sublayer.

Where GMA is used, the MX convergence layer may be replaced with a "GMA convergence layer" or "GMA convergence sublayer." Here, multiple access networks 110 are combined into a single IP connection. If the NCM (see e.g., NCM 236 of FIG. 1C) determines that N-MADP (see e.g., N-MADP 237 of FIG. 1C) is to be instantiated with GMA as the MX Convergence Protocol, it exchanges the support of GMA convergence capability in the discovery and capability exchange procedures.

Where MPTCP is used, the MX convergence layer may be replaced with an MPTCP layer on top of individual TCP layers, where each TCP layer is on top of a respective MX adaption layer. Here, MPTCP is reused as the "MX Convergence Sublayer" protocol, and multiple access networks are combined into a single MPTCP connection. Hence, no new UP protocol or PDU format is needed in this case. If the NCM 236 determines that the N-MADP is to be instantiated with MPTCP as the MX Convergence Protocol, it exchanges the support of MPTCP capability during discovery and capability exchange procedures. MPTCP proxy protocols may be used to manage traffic steering and aggregation over multiple delivery connection.

Where GRE is used, the MX convergence layer may be replaced with a GRE layer on top of a GRE Delivery Protocol (e.g., IP) layer. Here, GRE is reused as the "MX Convergence sub-layer" protocol, and multiple access networks are combined into a single GRE connection. Hence, no new UP protocol or PDU format is needed in this case. If the NCM 236 determines that N-MADP is to be instantiated with GRE as the MX Convergence Protocol, it exchanges the support of GRE capability in the discovery and capability exchange procedures.

The MAMS framework can be supported by an Edge computing system/network, such as ETSI Multi-access Edge Computing (MEC) (see e.g., [MEC]), which defines the technical requirements for the implementation of MEC platforms. MEC is a technology that allows applications to be instantiated at the Edge of an access network, and provides a low-latency and a close proximity environment to user equipment (UEs). As a result, vertical industries are expected to significantly benefit from the deployment of MEC infrastructure together with the deployment of (R)ANs 110. These RANs 110 may be operated by different mobile network operations (MNOs) and/or operate different RATs. MEC systems are access agnostic, and thus, can support MAMS. In some implementations, MAMS can be a MEC service which provides services to MEC applications over the Mp1 interface. Meanwhile, the MEC platform can consume services provided by NFs in 3GPP network via an NEF or PCF if the AF is in the trust domain. Moreover, the 3GPP 5G system architecture has been extended to support functionality similar to MAMS, which is referred to as ATSSS.

Figure 1C:
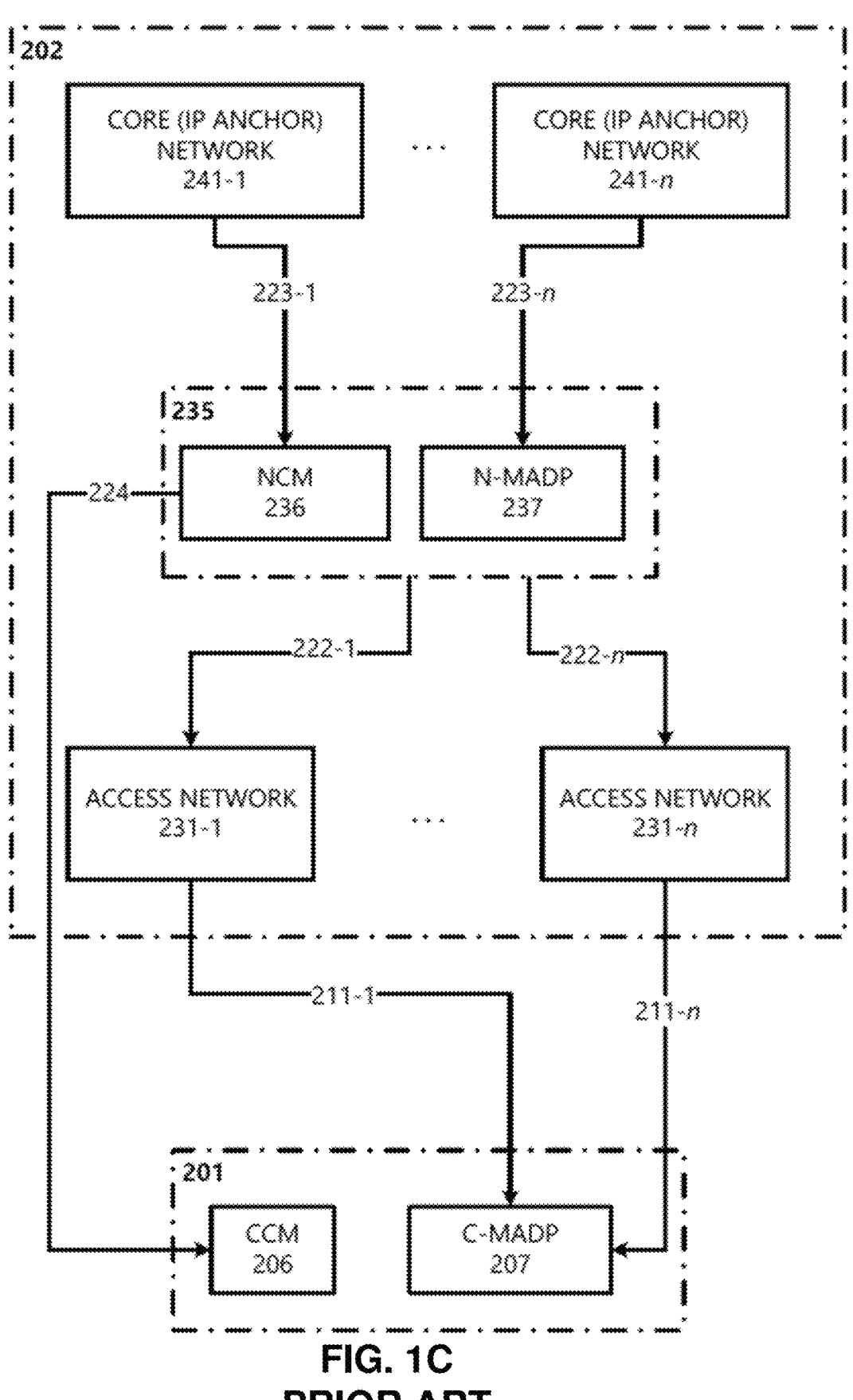
FIG. 1C illustrates an example MAMS reference architecture.

FIG. 1C illustrates an example MAMS reference architecture 200 for a scenario of a client served by n networks (where n is a number). The MAMS framework allows for dynamic selection and flexible combination of access and core network paths as UL and DL for a device connected to multiple communication networks. The multiple communication networks interwork at the UP. The architecture is extendable to combine any number of networks, as well as any choice of participating network/access types (e.g., LTE, WLAN, MuLTEfire, DSL, 5G/NR, etc.) and deployment architectures (e.g., with UP gateway function at the access Edge, and/or the like). FIG. 1C illustrates a scenario of a client 201 served by multiple (1 to n) core networks 241-1 to 241-*n* (where n is a number). The MAMS architecture 200 includes the following functional elements: a client 201 including a Client Connection Manager (CCM) 206 and a Client Multi Access Data Proxy (C-MADP) 207; multiple (1 to n) access networks (ANs) 231 (including AN 231-1 to AN 231-*n*); a MAMS system 235 including a Network Connection Manager (NCM) 236 and a Network Multi Access Data Proxy (N-MADP) 237; and the multiple (1 to n) core networks 241-1 to 241-*n*. The CCM 206 and NCM 236 handle CP aspects, and the C-MADP 207 and N-MADP 237 handle UP aspects. The core networks (or simply "cores") 241-1 to 241-*n* are elements that anchor the client's 201 network address (e.g., IP address or the like) used for communication with applications via the network. One or more of the cores 241-1 to 241-*n* may correspond to cloud computing service(s), 5G core network(s) (5GCs), LTE core network(s) (e.g., evolved packet core (EPC)), a DSL/FIXED core, WLAN core, data center(s), and/or other like back-end system.

The client 201 is an end-user device supporting connections with multiple access networks 231-1 to 231-*n* (which may be the same or similar to (R)ANs 110 and/or (R)AN nodes 111 in FIG. 1B), possibly over different access technologies. When the client 201 is capable of handling multiple network connections, the client 201 may be referred to as a "multiconnectivity client" or the like. The client 201 may be the same or similar as client 101 depicted by FIG. 1B.

The ANs 231 are network elements in the network that deliver user data packets to the client 201 via respective point-to-point access links 211-1 to 211-*n*, which may include, for example, WiFi links, LTE cellular links, 5G/NR cellular links, DSL (fixed access) connections, and/or the like. In some implementations, the point-to-point access links 211-1 to 211-n may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like. The ANs 231 may correspond to (R)ANs 110 and/or (R)AN nodes 111 of FIG. 1B.

A server manager (e.g., NCM 236) is a functional entity in a network 202 (e.g., network element, network appliance, gateway, Edge node(s), cloud node(s), etc.) that handles control messages from a client manager (e.g., CCM 206) and configures multi-access operations on the server side 202. Additionally or alternatively, the NCM 236 is a functional element in the network that handles MAMS control messages from the client 201 and configures the distribution of data packets over the available access and core network paths, and manages the UP treatment (e.g., tunneling, encryption, etc.) of the traffic flows. Additionally or alternatively, the NCM 236 provides the intelligence in the network to configure network paths and UP protocols based on client negotiation. The NCM 236 also acts as a common MA gateway for network policy input and interface to application platforms. One or more NCM 236 instances can be hosted at the access Edge (e.g., in one or more access networks 110, at individual access network nodes 111, and/or in one or more Edge compute nodes) and/or core network gateways.

The NCM 236 configures the network (N-MADP 237) and client (C-MADP 207) UP functions, such as negotiating with the client 201 for the use of available AN paths 221-1 to 221-n, protocols, and rules for processing the UP traffic, as well as link-monitoring procedures. The CP messages between the NCM 236 and the CCM 206 are transported as an overlay on the UP, without any impact on the underlying access networks. The NCM 236 handles MAMS CP messages from the client 201 and configures distribution of data packets over the multiple available access paths 221-1 to 221-n, delivery paths 222-1 to 222-n, and/or core network paths 223-1 to 223-n, as well as UP treatment of traffic flows. The CP messages exchanged between the NCM 236 and CCM 206 are transported as an overlay on the UP, without any impact to the underlying ANs 231.

The CP path 224 may be overlaid over any access UP path. A "path" may be a flow (e.g., an IP flow, UDP flow, etc.) between two hosts. An IP flow or UDP flow may be denoted by a 4-tuple (e.g., IP source address, IP destination address, source port, destination port). Additionally or alternatively, WebSocket is used for transporting management and control messages between the NCM 236 and CCM 206, wherein MX Control Message are carried over (or encapsulated in) a WebSocket, and the WebSocket is carried over (or encapsulated in) TCP/TLS.

A client manager (e.g., CCM 206) is a functional entity in the client device 201 (e.g. desktop, workstation, laptop, smartphone, smart appliance, IoT device, etc.) that exchanges control messages with a server manager (e.g., NCM 236) to configure multi-access operations on the client side 201. Additionally or alternatively, the CCM 206 is a functional entity in the client 201 that exchanges MAMS signaling messages with the NCM 236, and which configures the network paths at the client 201 for the transport of user data.

The CCM 206 is a peer functional element in the client 201 for handling MAMS CP procedures. The CCM 206 manages multiple network connections 221-1 to 221-n at the client 201, and configures the multiple network paths 221-1 to 221-n at the client 201 for transport of user data. The CCM 206 exchanges MAMS signaling with the NCM 236 to support such functions as the configuration of the UL and DL user network path for transporting user data packets and the adaptive selection of network path by the NCM 236 by reporting on the results of link probing. Link probing and reporting may be used to support adaptive network path selection by the NCM 236. In the DL for user data received by the client 201, the CCM 206 configures C-MADP 207 such that application data packet received over any of the accesses to reach the appropriate application on the client 201. In the UL for the data transmitted by the client 201, the CCM 206 configures the C-MADP 207 to determine the best access links 221 to be used for UL data based on a combination of local policy and network policy delivered by the NCM 236 over link 224.

The C-MADP 207 is a functional entity in the client 201 that handles user data traffic forwarding across multiple network paths. The C-MADP 207 is responsible for MAMS-specific UP functionalities in the client 201 such as encapsulation, fragmentation, concatenation, reordering, retransmissions, etc. The C-MADP 207 is configured by the CCM 206 based on signaling exchange with the NCM 236 and local policies at the client 201. The CCM 206 configures the selection of delivery connections 222-1 to 222-n and the UP protocols to be used for UL user data traffic based on the signaling exchanged with the NCM 236.

The N-MADP 237 is a functional entity in the network 202 that handles the forwarding of user data traffic across multiple network paths. The N-MADP 237 is responsible for MAMS-related UP functionalities in the network 202. Such as encapsulation, fragmentation, concatenation, reordering, retransmission, etc. The N-MADP 237 is the distribution node that routes the UL UP traffic to the appropriate anchor connection 223-1 to 223-n towards a respective core network 241-1 to 241-n, and the DL user traffic to the client 201 over the appropriate delivery connection(s) 222-1 to 222-n. The anchor connections 223-1 to 223-n are network paths from the N-MADP 237 to the UP gateway (IP anchor) that has assigned an network address to the client 201, and the delivery connections 222-1 to 222-n are network paths from the N-MADP 237 to the client 201. One or more of N-MADP 237 instances can be hosted at the Access Edge (e.g., in one or more access networks 110 and/or at individual access network nodes 111) and/or Core Gateways. The N-MADP 237 instances may be hosted with or separate from the NCM 236 instances.

In the DL, the NCM 236 configures the use of delivery connections 222-1 to 222-n, and UP protocols at the N-MADP 237 for transporting user data traffic. The N-MADP 237 may implement Equal-Cost Multi-Path routing (ECMP) support for the down link traffic. Additionally or alternatively, the N-MADP 237 may be connected to a router or other like network element (e.g., AP 2536 of FIG. 1C) with ECMP functionality. The NCM 236 configures the N-MADP 237 with a load balancing algorithm based on static and/or dynamic network policies. These network policies may include assigning access and core paths for specific user data traffic type, data volume based percentage distribution, link availability and feedback information from exchange of MAMS signaling with the CCM 206 at the client 201, and/or the like. The N-MADP 237 can be configured with appropriate UP protocols to support both per-flow and per-packet traffic distribution across the delivery connections.

In the UL, the N-MADP 237 selects the appropriate anchor connection 223-1 to **223-*n* over which to forward the user data traffic, received from the client 201 via one or more delivery connections 222-1 to 222-*n*. The forwarding rules in the UL at the N-MADP 237 are configured by the NCM 236 based on application requirements (e.g., enterprise hosted application flows via a LAN or WLAN anchor 241 (e.g., WiFi, cloud, and/or Edge network), Mobile Operator hosted applications via a cellular core network 241**, and/or the like).

The NCM 236 and the N-MADP 237 can be either collocated with one another or instantiated on different network nodes. The NCM 236 can set up multiple N-MADP 237 instances in the network. The NCM 236 controls the selection of an individual N-MADP 237 instance by the client and the rules for distribution of user traffic across the N-MADP 237 instances. In this way, different N-MADP 237 instances may be used to handle different sets of clients for load balancing across clients. Additionally, the different N-MADP 237 instances may be used for different address deployment topologies (e.g., N-MADP 237 hosted at the UP node at the access Edge or in the core network, while the NCM 236 hosted at the access edge node), as well as address access network technology architecture. For example, an N-MADP 237 instance at a CN node 241 may be used to manage traffic distribution across LTE and DSL networks, and another N-MADP 237 instance at a (R)AN node 231-1, **231-*n* may be used to manage traffic distribution across LTE and WiFi traffic. Furthermore, a single client 201 can be configured to use multiple N-MADP 237 instances, which may be used for addressing different application requirements. For example, individual N-MADP 237** instances may be used to handle TCP and UDP transport based traffic.

The CCM 206 and NCM 236 exchange signaling messages to configure the UP functions, C-MADP 207 and N-MADP 237, at the client and network respectively. The CCM 206 may obtain the NCM 236 credentials (FQDN or network address) for sending the initial discovery messages. As an example, the client 201 can obtain the NCM 236 credentials using methods like provisioning, DNS query. Once the discovery process is successful, the (initial) NCM 236 can update and assign additional NCM 236 addresses, for example, based on MCC/MNC tuple information received in the MX Discovery Message, for sending subsequent CP messages.

The CCM 206 discovers and exchanges capabilities with the NCM 236. The NCM 236 provides the credentials of the N-MADP 237 end-point and negotiates the parameters for UP with the CCM 206. CCM 206 configures C-MADP 207 to setup the UP path (e.g., MPTCP/UDP Proxy Connection) with the N-MADP 237 based on the credentials (e.g., (MPTCP/UDP) Proxy network address (e.g., IP address and port), Associated Core Network Path), and the parameters exchanged with the NCM 236. Further, NCM 236 and CCM 206 exchange link status information to adapt traffic steering and UP treatment with dynamic network conditions. The key procedures are described in detail in the following subsections.

A UDP (or QUIC) connection may be configured between the C-MADP 207 and the N-MADP 237 to exchange control messages. The control messages may be or include, for example, keep-alive, probe request (REQ)/acknowledgement (ACK), Packet Loss Report (PLR), First Sequence Number (FSN), Coded MX SDU (CMS), Traffic Splitting Update (TSU), Traffic Splitting ACK (TSA) messages, and/ or path quality estimation information. The N-MADP 237 end-point network address (e.g., IP address or the like) and port number (e.g., UDP port number of the UDP connection) is used to identify MX control PDUs.

The various elements depicted in the example of FIG. 1C may be implemented using a variety of different physical and/or virtualized components. For example, the elements within MAMS network 202 may be implemented using one or more components of an edge node, such as one or more LTE or 5G RANs, or the MEC system or the like. Additionally or alternatively, the MAMS system 235 may be implemented in or by an individual RAN node, such as one or more of the RAN nodes 111 in FIG. 1B. In one example, the MAMS system 235 is implemented as part of the layer 3 (L3) protocol stack (e.g., the RRC layer or the like). In another example, the MAMS system 235 is implemented as part of a layer above L3 such as the network layer (e.g., IP, UDP, QUIC, GPRS Tunnelling Protocol User Plane (GTP-U), etc.) data plane protocol stack of the RAN nodes. In another example, the MAMS system 235 may be implemented as a separate layer between the L3 and upper layers. In another example, the MAMS system 235 may be implemented in or by a gNB-CU of a CU/DU split architecture. In another example, the MAMS system 235 may be implemented in or by a vBBU pool, or a cloud RAN (C-RAN). Additionally or alternatively, the functional elements within MAMS network 202 may be implemented by one or more network functions (or as a VNF) of CN 150A in FIG. 1B. For example, the N-MADP 237 may run on an S-GW or P-GW when CN 150A is an EPC, or the N-MADP 237 may run on a User Plane Function (UPF) when CN 150A is a 5GC.

In MEC-based implementations (see e.g., [MEC]), the MAMS system 235 may be implemented in or by a MEC host/server (that is located in, or co-located with, a RAN 110 or RAN node 111. The functions that are located in the network side (e.g., the NCM 236 and N-MADP 237) can be hosted either at a centralized location or at the Edge cloud. They can be deployed either as MEC application (apps) or co-located with other functions (e.g., a MEC platform or the like). Additionally or alternatively, up-to-date information from the access networks may be provided to the NCM 236 for intelligent network path selection over APIs by the MEC platform (e.g., a MEC platform or the like) the same way as it exposes RNI over RNI API, TMS over a TMS API, and/or BWMS over BWM API. Additionally or alternatively, similar levels of information may be defined for 3GPP access networks as well as for WiFi, MulteFire, DSL, etc., either by amending the existing RNI/BWM APIs or by defining new APIs specific for the new access technologies.

In additional or alternative MEC-based implementations (see e.g., [MEC]), the NCM 236 can be hosted on a MEC cloud server (e.g., MEC host or the like) that is located in the UP path at the Edge of the multi-technology access network. The NCM 236 and CCM 206 can negotiate the network path combinations based on an application's needs and the necessary UP protocols to be used across the multiple paths. The network conditions reported by the CCM 206 to the NCM 236 can be complemented by a Radio Analytics application (see e.g., [MEC]) residing at the MEC cloud server to configure the UL and DL access paths according to changing radio and congestion conditions. Additionally or alternatively, the UP functional element (e.g., the N-MADP 237) can either be collocated with the NCM 236 at the MEC cloud server (e.g., MEC-hosted applications, etc.) or placed at a separate network element like a common UP gateway across the multiple networks. Also, even in scenarios where an N-MADP 237 is not deployed, the NCM 206 can be used to augment the traffic steering decisions at the client 201. These enhancements is to improve the end user's QoE by leveraging the best network path based on an application's needs and network conditions, and building on the advantages of significantly reduced latency and the dynamic and real-time exposure of radio network information available at the MEC.

As used herein a "GMA receiver" may be an N-MADP 237 instance or C-MADP 207 instance (e.g., FIG. 1C) instantiated with GMA as the convergence protocol that receives packets encapsulated or otherwise generated according to GMA procedures, and processes the received packets per the procedures discussed in Zhu et al., Generic Multi-Access (GMA) Convergence Encapsulation Protocols, IETF, RFC 9188, ISSN: 2070-1721 (February 2022) ("[RFC9188]"), which is hereby incorporated by reference in its entirety. Additionally, as used herein a "GMA transmitter" may be an N-MADP 237 instance or C-MADP 207 instance instantiated with GMA as the convergence protocol that processes and/or encapsulates or otherwise generates packets/PDUs according to GMA procedures discussed in [RFC9188].

As mentioned previously, MAMS is a programmable framework that provides mechanisms for flexible selection of network paths in a multi-connection (access) communication environment, based on application needs. It leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the individual access network. Today's MAMS solutions require deploying MAMS control and data plane network functions in the network [RFC8743]. The present disclosure extends the MAMS framework to support OTT MAMS (e.g., lossless switching, aggregation, etc.) without any change or dependency in network. The OTT MAMS can run as part of MAMS hosted on a cloud computing service/platform, an Edge computing platform/service (e.g., ETSI MEC, and/or the like), and/or using suitable Virtual Machines (VMs) and/or containers provided by such a cloud computing service/platform and/or Edge computing platform/service.

Furthermore, as the mobile and/or wireless access technologies and networks continue to evolve, it is becoming clear that no single radio technology will be able to meet the variety of requirements for human and machine communications. On the other hand, driving more data through a scarce and finite radio spectrum becomes a real challenge, and spectrum efficiency is approaching a plateau and will not deliver the needed increase in bandwidth improvement itself. For example, 3GPP 5G cellular technology is likely to utilize frequencies below 6 Gigahertz (GHz) as well as millimeter wave ("mmWave" or "MMW"), in both licensed and unlicensed bands. The present disclosure also provides a Software-Defined, Access-Agnostic, and High-Performance solution to such issues, which is referred to herein as Generic Multi-Access (GMA) to enable integration of multiple (heterogeneous or homogeneous) radio access networks and RATs at the Edge, without impacting existing RAT protocol stacks (e.g. PDCP, RRC, Ethernet, etc.) or existing network protocols (e.g., internet protocol (IP), transmission control protocol (TCP), user datagram protocol (UDP), Quick UDP Internet Connections (QUIC), etc.). GMA may be considered a Layer 2.5 protocol. The present disclosure describes various GMA e2e network architecture, protocols, procedures, algorithms, and system functionalities as well as deployment implementations.

Figure 2:
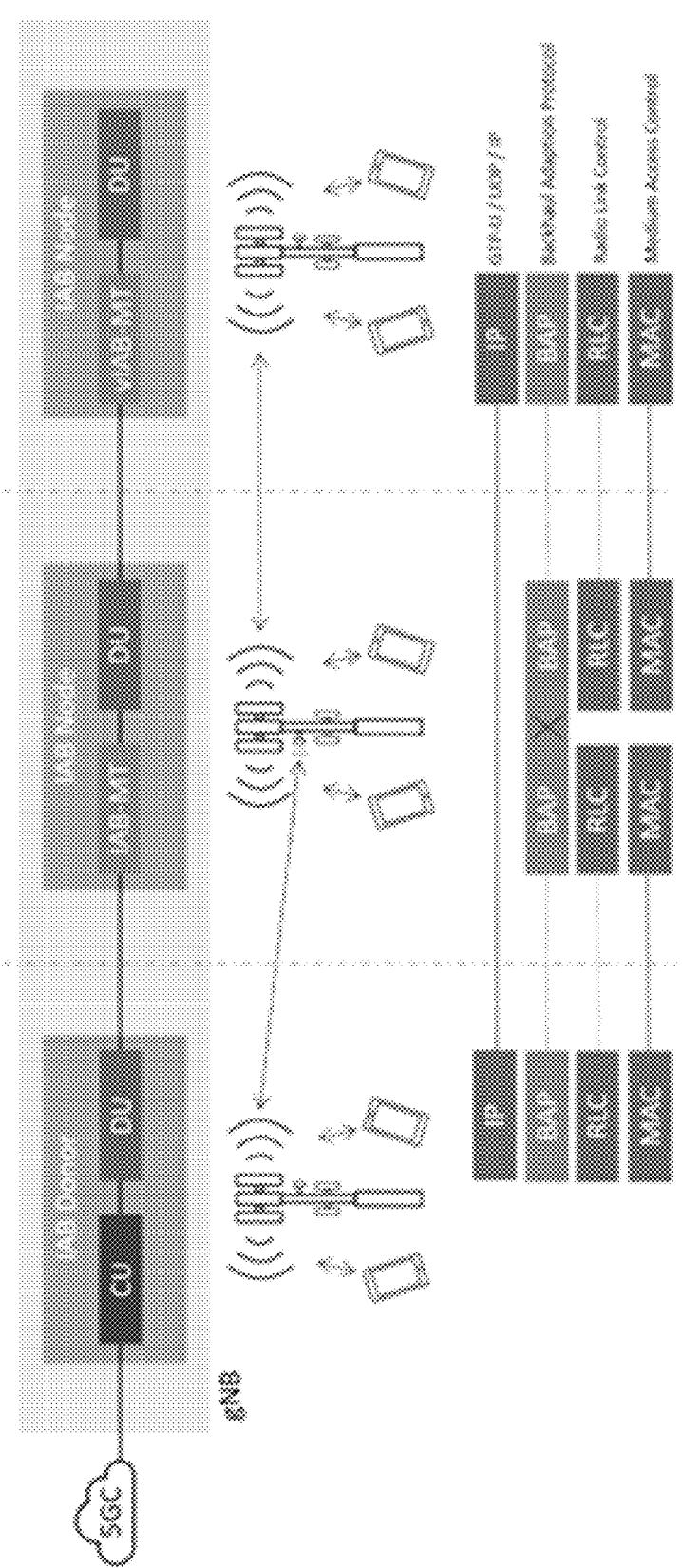
FIG. 2 depicts an Integrated Access Backhaul (IAB) end to end (E2E) Network Reference Architecture.

FIG. 2 depicts an Integrated Access Backhaul (IAB) end to end (E2E) Network Reference Architecture. The architecture can be based on FIG. 4.7.2-1 in 3GPP TS 38.300 V17.3.0 (2022). IAB allows for multi-hop backhauling using the same frequencies employed for user equipment (UE) access or a distinct, dedicated, frequency. The IAB Mobile Termination (MT) antenna can be an independent set of arrays (IAB-MT) or share antennas used for access and are referred to as virtual IAB-MTs (vIAB-MT).

Integrated Access and Backhaul specifications define antenna system types: an IAB node and an IAB donor. IAB donors can terminate backhaul traffic from distributed IAB nodes. IAB nodes can include backhaul endpoints or relays between those endpoints and the donor. IAB donors and nodes can serve mobile user equipments (UEs). IAB can utilize a decomposed radio access network (RAN), such as that employed in an Open RAN (O-RAN) architecture, which decouples the distributed unit (DU) from the central unit (CU). The DU can be present in the IAB nodes while the doner system can include a CU. As defined within 3GPP TS 38.401 standards as including a CU and DU, a single IAB system of one or more IAB nodes and the IAB doner can, together, be deemed a single gNodeB (gNB). A backhaul can be insulated within a topologically constrained environment, so routing changes or problems are not propagated into the 5G core (5GC) or other adjacent gNBs.

Figure 3:
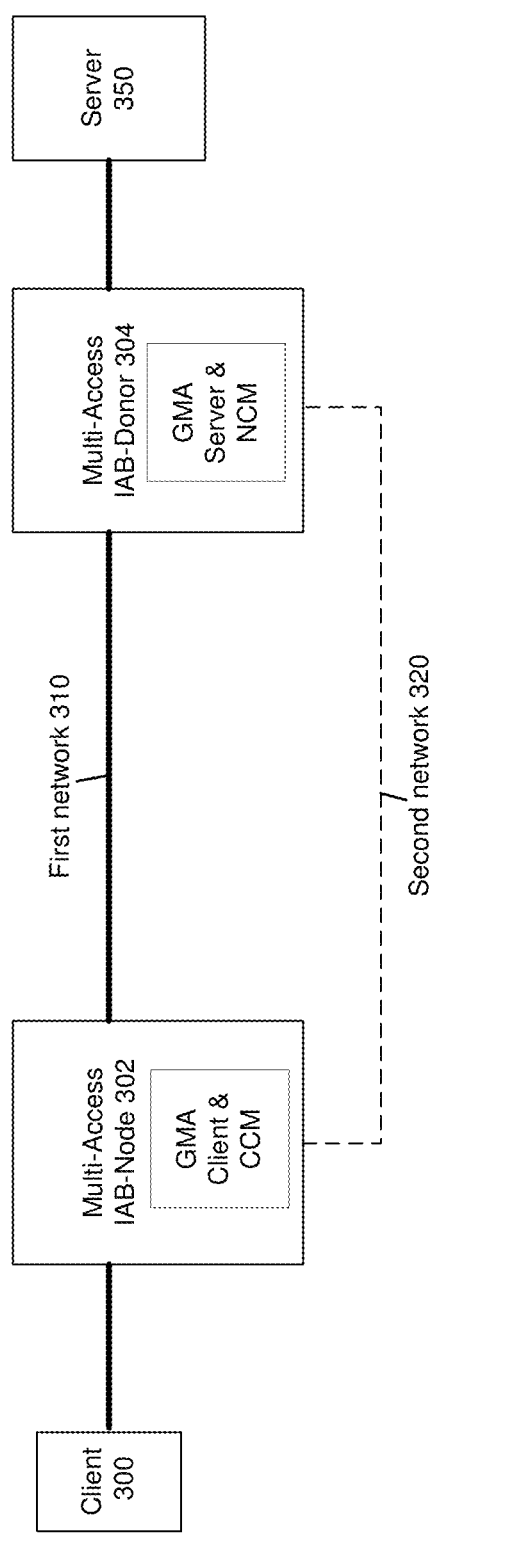
FIG. 3 depicts an example MAMS over GMA (MAMS/GMA-enhanced Multi-Access Integrated Access Backhaul (MX-IAB) Network.

Discussion next turns to various examples. Various examples described with respect to sub-titles (e.g., MULTI-ACCESS TRAFFIC MANAGEMENT IN INTEGRATED ACCESS BACKHAUL (IAB) NETWORK, MULTI-ACCESS TRAFFIC MANAGEMENT WITH RELAY, QOS-AWARE MULTI-ACCESS TRAFFIC STEERING, PACKET GROUP AND PRIORITY AWARE ACTIVE QUEUE MANAGEMENT (AQM) FOR MULTI-ACCESS EDGE NETWORK, PACKET PRIORITY AWARE CONGESTION CONTROL FOR MULTI-ACCESS EDGE NETWORK, PER-PACKET PRIORITY (PPP) ACTIVE QUEUE MANAGEMENT (AQM), EXAMPLE PROCESS, or EXAMPLE SYSTEM) can be combined with examples described with respect to one or more other sub-headings and vice versa (e.g., MULTI-ACCESS TRAFFIC MANAGEMENT IN INTEGRATED ACCESS BACKHAUL (IAB) NETWORK, MULTI-ACCESS TRAFFIC MANAGEMENT WITH RELAY, QOS-AWARE MULTI-ACCESS TRAFFIC STEERING, PACKET GROUP AND PRIORITY AWARE ACTIVE QUEUE MANAGEMENT (AQM) FOR MULTI-ACCESS EDGE NETWORK, PACKET PRIORITY AWARE CONGESTION CONTROL FOR MULTI-ACCESS EDGE NETWORK, PER-PACKET PRIORITY (PPP) ACTIVE QUEUE MANAGEMENT (AQM), EXAMPLE PROCESS, or EXAMPLE SYSTEM). Multi-Access Traffic Management in Integrated Access Backhaul (IAB) Network FIG. 3 depicts an example MAMS over GMA (MAMS/GMA)-enhanced Multi-Access Integrated Access Backhaul (MX-IAB) Network. Client 300 can communicate with server 350 using one or more relay nodes 302 and 304. Relay nodes 302 and 304 can communicate using first network 310 and/or second network 320 at least for backhaul traffic. IAB-node 302 can include a RAN node that supports new radio (NR) access links to UEs and NR backhaul links to parent nodes and child nodes. IAB-donor 304 can include a RAN node (e.g., a gNB) that provides network access to UEs via a network of backhaul and access links. First network 310 can provide cellular communications. First network 310 can provide a GMA connection as a default network for E2E IAB network. First network 310 can include IAB network (default) with one or more MX-IAB. Second network 320 can provide communication of traffic based on MAMS over GMA (MAMS/GMA) or non-3GPP Networks (Wi-Fi, Satellite, etc.). Client 300 can include a UE or a IAB-node. Server 350 can include a 5G Core, a IAB-donor, or a MEC server.

A GMA connection underlay network for an E2E IAB network (e.g., second network 320) can provide an alternative network to a legacy network (e.g., first network 310). Various examples can enhance Integrated Access and Backhaul (IAB) with use of MAMS over GMA to transmit traffic over multiple networks. IAB node 302 and/or IAB donor node 304 can include circuitry to change transmission of Integrated Access Backhaul (IAB) traffic from a 3rd Generation Partnership Project (3GPP)-consistent wireless network (e.g., first network 310) to Multi Access Management Services (MAMS) over Generic Multi-Access (GMA) over a second network (e.g., second network 320). For example, MAMS over GMA for first wireless network 310 and second network 320 are to utilize one or more of: IP virtual connection, GTP-U virtual connection, or F1-AP virtual connection. Reliability and resiliency of communications can be potentially improved by enhancing IAB with MAMS/GMA to deliver backhaul traffic over one or more networks (e.g., first network 310 and/or second network 320).

For example, some examples transmit packets by multiple hops using frequencies utilized by user equipment (UE) by access to a Third Generation Partnership Project (3GPP)-consistent network to a second network based on selection of network paths in a multi-access (MX) communication environment over a protocol specified to encode control information at a sublayer, wherein the control information includes key, sequence number, and time stamp.

For example, Integrated Access Backhaul (IAB) via a Third Generation Partnership Project (3GPP)-consistent wireless network can provide for packet transmission by multiple hops using frequencies utilized by a UE by access to a 3GPP-consistent network. For example, transmission of packets over a second network can occur based on selection of network paths in a MX communication environment over a protocol specified to encode control information at a sublayer, where the control information includes key, sequence number, and time stamp can include use of Multi Access Management Services (MAMS) over Generic Multi-Access (GMA).

In some examples, client 300 can include IAB node 302, whereas in some examples, client 300 is separate from IAB node 302. In some examples, server 350 can include IAB donor 304, whereas in some examples, server 350 is separate from IAB donor 304.

As shown in FIG. 1B, a client device 101 (e.g., a smartphone, laptop, IoT device, etc.) may connect to the Internet via multiple access network connections 105. One of these connections (e.g., connection 105A) may operate as an anchor connection, and another connection (e.g., connection 105B) may operate as a delivery connection. Alternatively, a virtual (e.g., IP) connection may operate as an anchor connection, and all physical connections operate as delivery connection. The anchor connection provides the network address (e.g., IP address or the like) and connectivity for end-to-end (e2e) Internet access, and the delivery connection provides additional path between the client 101 and the MX gateway (e.g., MX server 140) for multi-access optimizations. In some examples, when GMA is used, the anchor connection may be a virtual IP connection similar to what is used in a virtual private network (VPN), and there may be two delivery connections (e.g., 5G/NR, LTE, WiFi, etc.), one or more of which has a dedicated UDP tunnel established over for data transfer.

Figure 4:
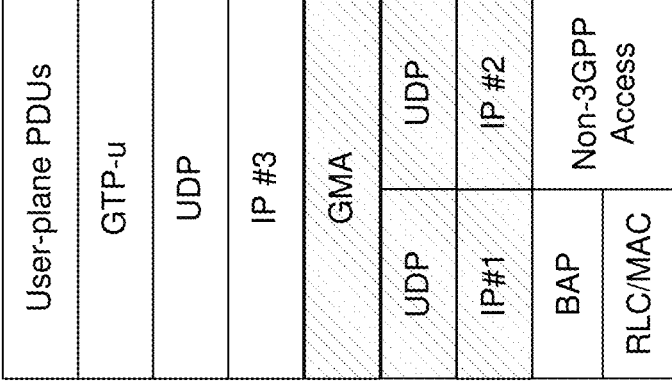
FIG. 4 depicts data plane and control plane protocol stacks for MAMS/GMA communications in a Multi-Access Integrated Access Backhaul (MX-IAB) Network.

FIG. 4 depicts data plane and control plane protocol stacks for MAMS/GMA communications in a Multi-Access Integrated Access Backhaul (MX-IAB) Network. Data plane and control plane protocol stacks can execute on node 302 and/or 304 and communicate traffic using a virtual IP connection. GMA stack processes can provide multi-access convergence to manage backhaul traffic over multiple connections between IAB-Node and IAB-Donor. A relay node (e.g., Multi-access IAB-Node or IAB-Donor Node) has an associated physical IP address. IP #1 address can represent an IP interface of a Cellular 3GPP user equipment (UE) relay node. IAB-Donor has IP #1 address and IAB-node has IP #1 address etc. IP #2 address can represent a non-3GPP (or other network, including a legacy 3GPP network) IP interface for a relay node. For example, communications between relay nodes (e.g., IAB-Node and IAB-Donor Node) can occur using UDP. IP #3 address can represent a virtual IP interface used for relay traffic node (e.g., IP address of a GMA client).

For example, MX-IAB node 302 can attach to MX-IAB Donor 304 using the following operations. At operation 1, IAB-MT attach procedure can be performed to acquire IP address #1 of the 3GPP connection, as described in 3GPP standard TS 38.401. At operation 2, non-3GPP access procedure can be performed to acquire IP address #2 of the non-3GPP connection, as described in [RFC 2131]. At operation 3, a MAMS/GMA session establishment procedure to acquire IP address #3 can be performed. For example, operation 3 can include operations described at least in [RFC8743], [RFC9188], or Zhu et al., "UDP-based Generic Multi-Access (GMA) Control Protocol," draft-zhu-intarea-gma-control-00, (Apr. 13, 2020)).

IAB-Node can be assigned three IP addresses for IP #1, #2, and #3, respectively. IAB-Donor can also be assigned three IP addresses for IP #1, #2, and #3, respectively. IAB-Node and IAB-Donor can be assigned different interfaces for IP #1 and IP #2 and a virtual interface for IP #3. For example, for communication between IAB-Node and IAB-Donor, UDP over IP (UDP/IP) tunnels can be utilized based on each of IP address #1 and IP address #2. IP address #3 can be used for backhaul traffic (e.g., Stream Control Transmission Protocol (SCTP), GPRS Tunnelling Protocol User Plane (GTP-U), etc.).

Figure 5:
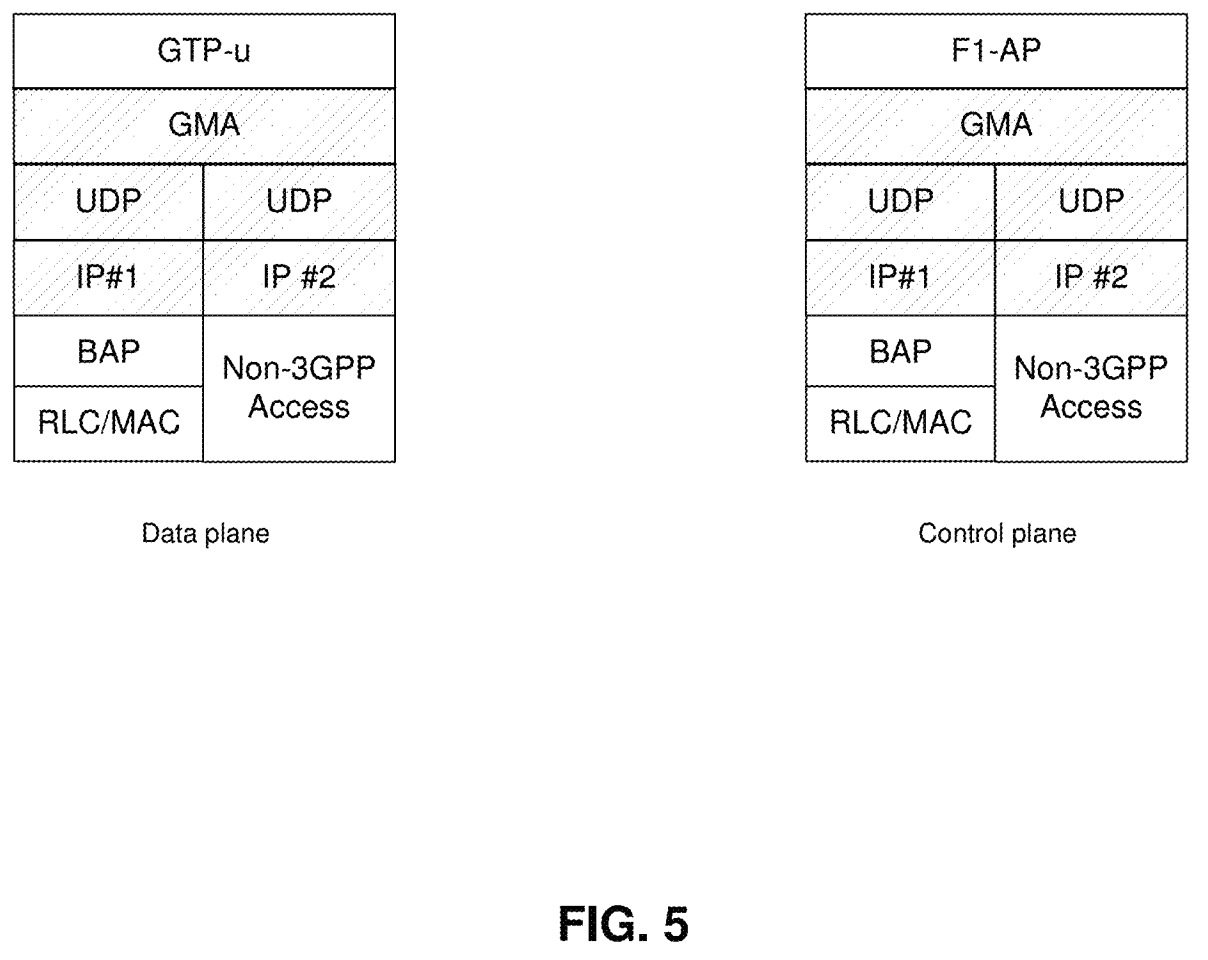

FIG. 5 shows an example MX-IAB Data-Plane and Control-Plane Protocol Stack. An anchor connection can be defined in MAMS/GMA to identify application traffic between GMA client and GMA server. In some examples, an anchor connection is to utilize one or more of: IP virtual connection, GTP-U virtual connection, or F1-AP virtual connection. Backhaul traffic can be transported over GMA without use of the UDP/IP (or SCTP/IP) protocol overhead to reduce tunneling overhead in an MX-IAB network. Examples of anchor connections are described at least in Appendix C.2.6 of Multi-Access Management Services (MAMS) RFC8743 (2020) and Generic Multi-Access (GMA) Encapsulation Protocol (2022). Where GTP-U or F1-AP virtual connections are used, IP #3 may not be used or communicated to potentially reduce a size of transmitted packet headers, increase an amount of transmitted data, and reduce header processing.

Figure 6:
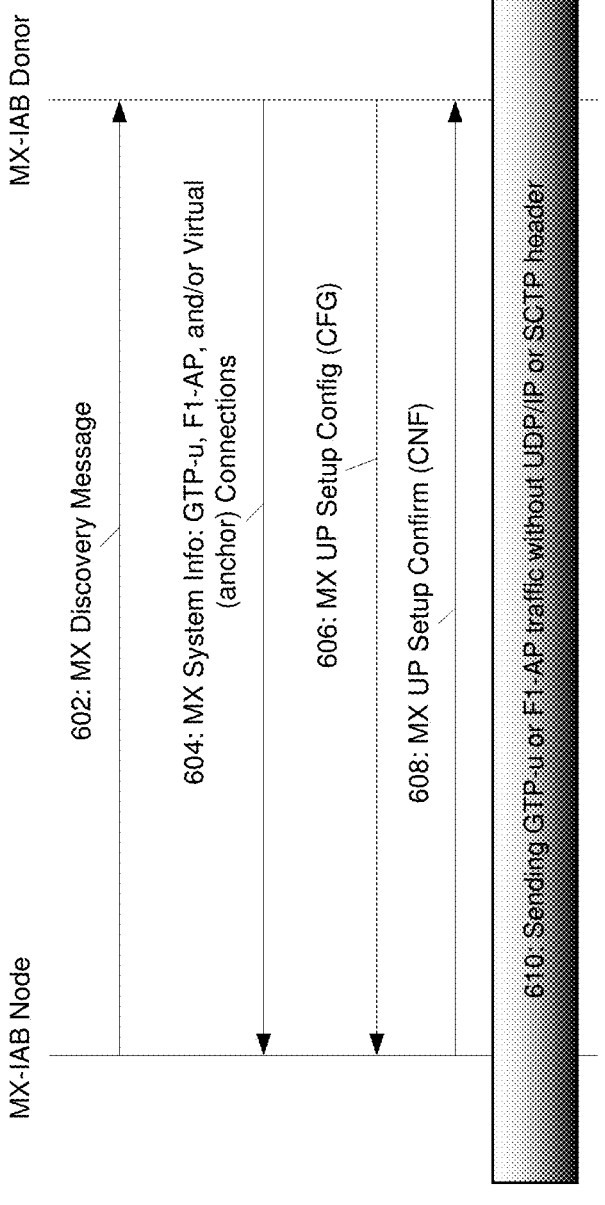
FIG. 6 shows an example MAMS management procedure.

FIG. 6 shows a MAMS management procedure that can be utilized with a MAMS framework. For example, the procedure can be used for MAMS Control Signaling. The procedure can be performed as operations of a process. At 602, an MX-IAB Node can send a Multi-Access (MX)

discovery message to a MX-IAB Donor. At 604, MX-IAB Donor can send MX System Information (Info) message to MX-IAB Node. An anchor connection can be configured by the following parameters: Connection ID or Connection Type (e.g., identify the type of the anchor connection (Wi-Fi, LTE, or others)). The MX System Info message can include the following information for each anchor connection: Connection ID (e.g., unique identifier for the anchor connection) or Connection Type (e.g., 0: Wi-Fi; 1: 5G NR; 2: MulteFire; 3: LTE; 4: virtual IP; 5: GTP-U; and 6: F1-AP). Connection type virtual IP (value 4) can be provided to identify that a connection type is a virtual IP connection for MAMS/GMA. MAMS/GMA can support multiple anchor connections simultaneously. Based on some examples, at least the following anchor connection types can also be utilized: (GTP-U (value 5) and F1-AP (value 6)) so that IAB backhaul traffic can be delivered over GMA directly (e.g., MAMS/GMA).

At 606, MX-IAB Donor can send a MX UP Setup Config message to MX-IAB Node. As a user plane, MX-IAB Donor can transmit MX UP Setup Config (e.g., [RFC8743]) to MX-IAB Node to configure MAMS/GMA data-plane operations. MX UP Setup Config can include the following parameters for an anchor connection: Anchor Connection ID and Convergence Method and parameters (e.g., F1 IP parameters in configuration file). MX UP Setup Config can include Information field F1 IP parameters, described herein.

After successful message exchange of MX UP Setup Config, at 608, MX-IAB node can send a MX UP Setup Confirm message to MX-IAB donor. An MX UP Setup Confirm message from MX-IAB Node to MX-IAB Donor may include the following information if the (anchor) Connection Type is GTP-U or F1-AP: IAB donor (node) IPv4 or v6 address (for the GTP-U or F1-AP connection); and IAB donor (node) UDP or SCTP port number (for the GTP-U or F1-AP connection).

At 610, MX-IAB donor can send GTP-U or/and F1-AP packets using GMA, and mark the Connection ID field in GMA header accordingly to identify the GMA payload type, e.g., IP, GTP-U, or F1-AP. An application can cause transmission of backhaul traffic, e.g., GTP-U or F1-AP, over a virtual IP anchor connection. In this case, GMA client/server can detect use of GTP-U or F1-AP based on the F1 IP parameters information in the MX UP Setup Config and Confirm message and remove the UDP/IP (or SCTP/IP) header in backhaul traffic before transmission over a physical connection.

As specified in TS 38.340 (2022) and TS 38.473 (2022), the UL (Uplink) UP (User-Plane) Transport Layer (TNL) information element (IE) can be used to identify F1-U packets at the BAP (Backhaul Adaptation Protocol) layer in IAB donor and node. The IE can include one or more of the following parameters: Transport Layer Address and GTP-TEID. Transport Layer Address and GTP-TEID can be used to identify F1-U packets at the BAP layer in IAB donor and node.

Figure 7:
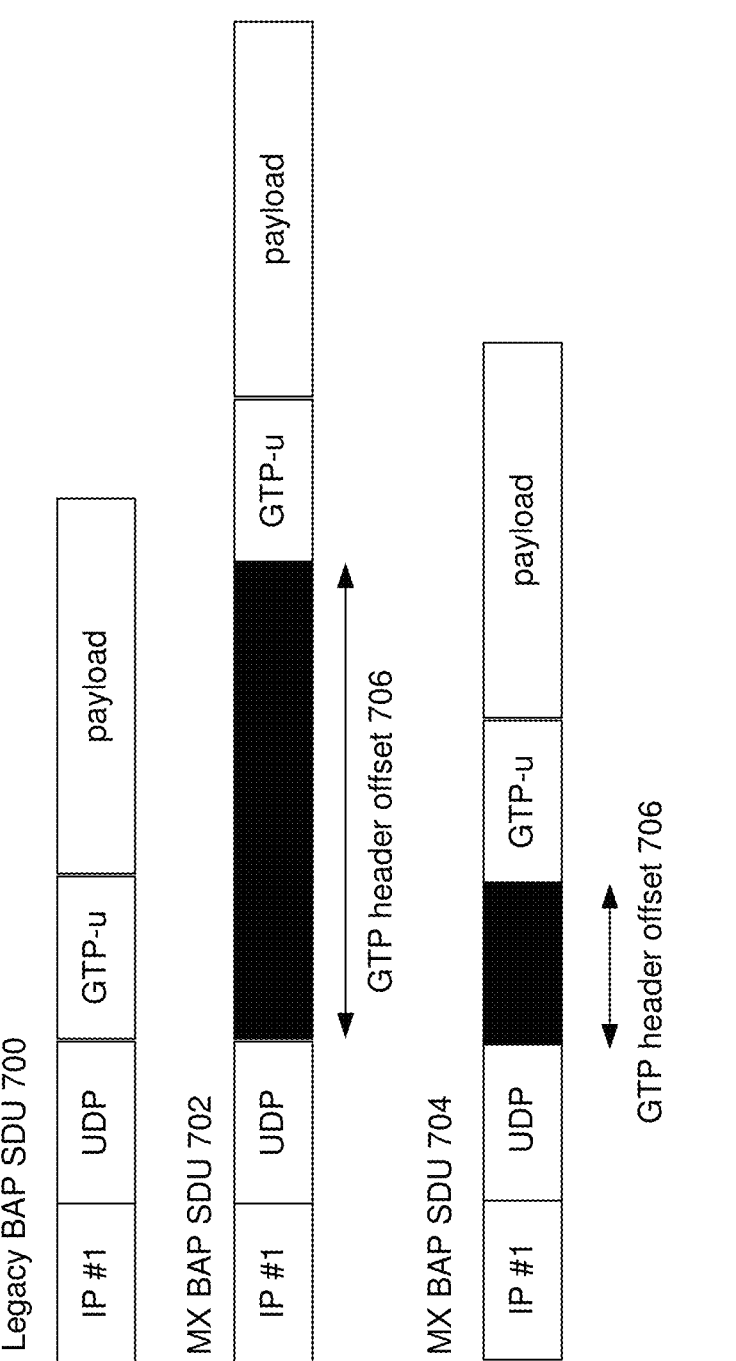
FIG. 7 depicts an example of Multi-Access (MX) Backhaul Adaptation Protocol (BAP) Service Data Unit (SDU) formats.

FIG. 7 depicts an example of Multi-Access (MX) BAP Service Data Unit (SDU) formats. In format 700, the GTP header offset is "0" for the legacy BAP SDU based on 3GPP standard TS 38.340 (2022). However, where a GMA header is inserted before a GTP-u header field, a location of a GTP tunnel endpoint ID in an SDU 700 may not be properly specified or determined by the receiver. In some examples, an enhanced MX UL UP TNL information element (IE) (not shown) can include parameter GTP header offset 706 that can indicate where the GTP-u header begins, after an end of the UDP header field. IAB Node (e.g., GMA client and CCM of FIG. 3) can send the IE to IAB Donor. An IE can send a GTP header offset out of band from SDU. Various examples of an IE can be consistent at least with TS 38.340 (2022) and TS 38.473 (2022).

In format 702, a starting position of GTP-u header field after an end of the UDP header field (e.g., the GTP header offset) can be based on GTP header offset 706 (e.g., a sum of UDP header length, IP header length, and GMA header length). In format 704, the GTP header offset from end of UDP header field to start of GTP-u header can be based on length of the GMA header specified by GTP header offset field 706.

Multi-Access Traffic Management with Relay

For a MAMS deployment, if a Multi-Access Edge server is configured with a local network address translation (NAT) and an IP address of the server is not on a same subnet as that of a Multi-Access client, the client may not be able to establish a UDP connection with the server. Moreover, the GMA server cannot be directly accessed or discoverable by a GMA client via gateways (GWs). Various examples described herein provide a GMA Relay to client establish a UDP connection with a server, where a NAT and an IP address of the server are not on the same subnet as that of the client. To provide the GMA relay, a protocol and control messages between GMA server and GMA relay can be utilized, as described herein.

Figure 8:
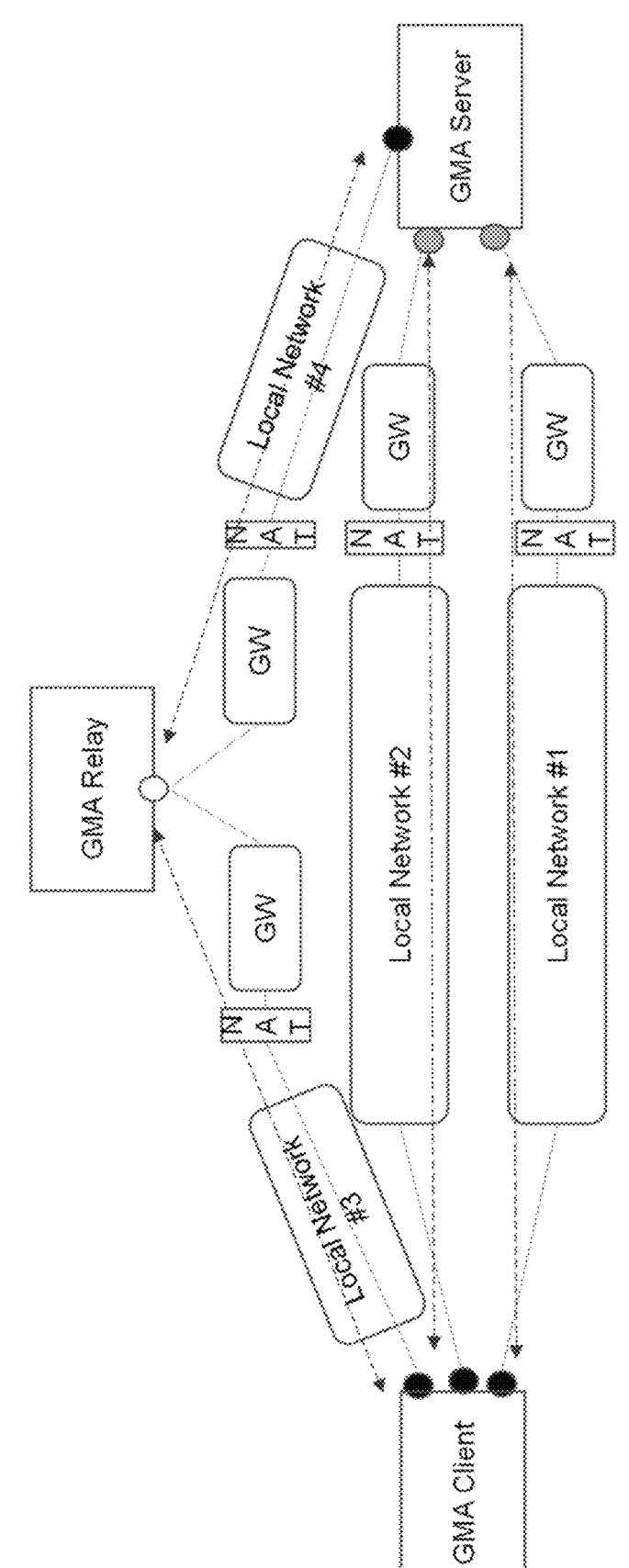
FIG. 8 depicts an End-to-End Network Reference Architecture that includes a GMA relay to provide communication between a GMA client and GMA server.

FIG. 8 depicts an End-to-End Network Reference Architecture that includes a GMA relay to provide communication between a GMA client and GMA server. For example, the GMA End-to-End Network Reference Architecture is described at least with respect to MAMS (RFC 8743). In this example, there are at least three paths between GMA client and GMA server: (1) Local Network #1, (2) Local Network #2, and (3) Local Network #3 to GMA Relay to Local Network #4. In some examples, a GMA Relay node can be assigned an IP address that can be directly assessed by both GMA client and GMA server. In some examples, GMA Relay node can establish a connection between GMA client and GMA server and forward data or control messages between GMA client and GMA server. A connection can be established between GMA client and GMA server via GMA Relay, even if GMA client and GMA server cannot communicate directly with each other.

Figure 9:
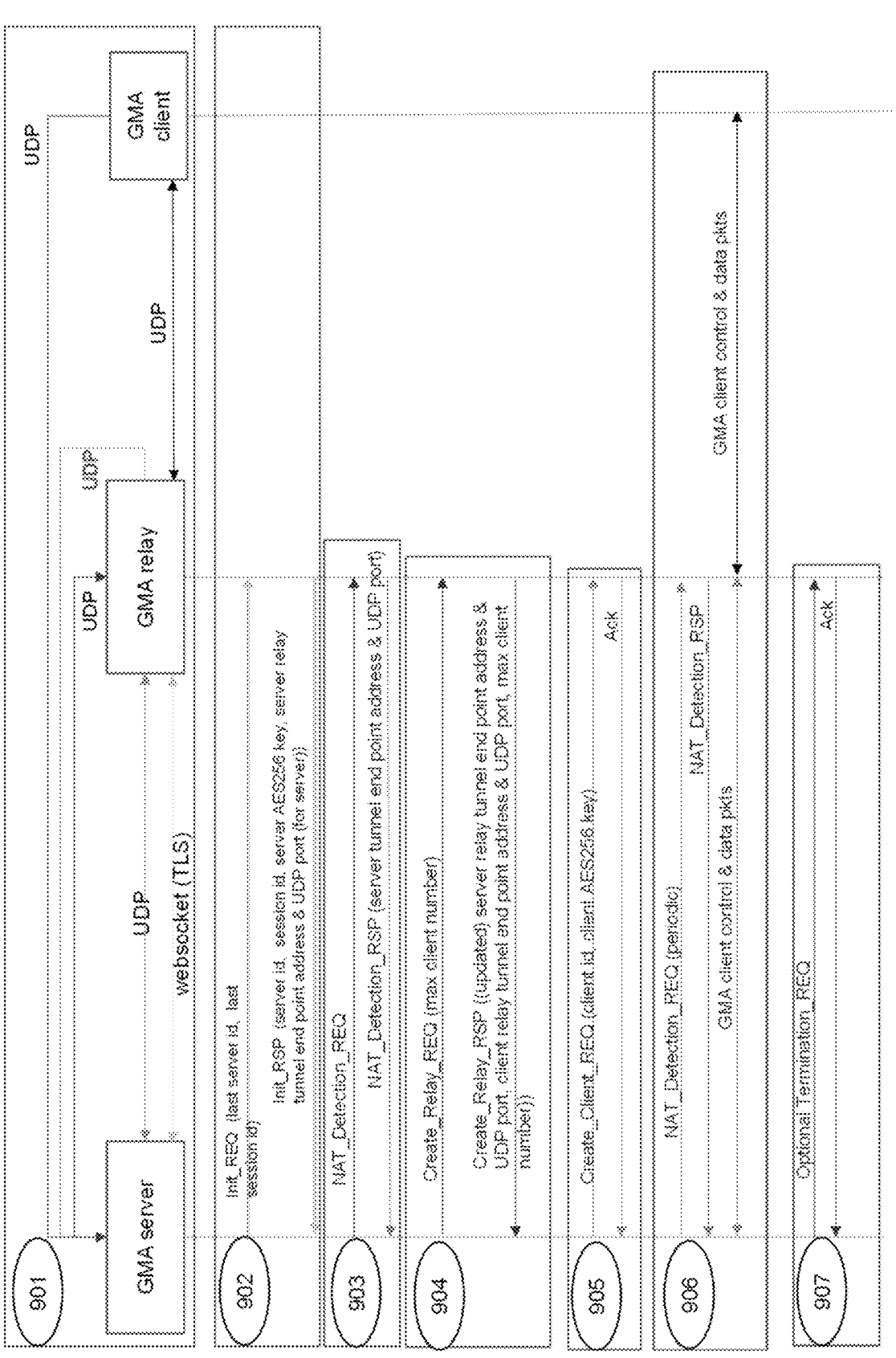
FIG. 9 shows an example GMA relay protocol in which a GMA relay can provide a proxy GMA server to GMA client.

FIG. 9 shows an example GMA relay protocol in which a GMA relay can provide a proxy GMA server to GMA client. GMA server can send GMA control messages to GMA relay to identify if the message is for GMA client or GMA relay. Likewise, GMA client can send GMA control messages to GMA relay to identify if the message is for GMA server or GMA relay. GMA control messages can be sent using UDP-based Generic Multi-Access (GMA) Control Protocol (e.g., J. Zhu and M. Zhang, "UDP-based Generic Multi-Access (GMA) Control Protocol," draft-zhu-intarea-gma-control-02 (Oct. 3, 2022)). As described herein, a GMA flag in a GMA header can identify if a destination of a message is a GMA client or a GMA relay. For example, Table 1 lists an example of fields in GMA control messages that can be used in a GMA relay protocol. Table 2 list two MAMS management messages (TCP-based) for the proposed GMA relay protocol.

TABLE 1

| | | Length | |
|---|---|---|---|
| Message | Type | (Bytes) | Control Fields |
| NAT Detection Request | 1 | 2 | Sequence Number (2B) |
| NAT Detection Response | 2 | 8 | Ack Number (2B), IP address (4B), UDP Port (2B) |
| Create Relay Request | 3 | 6 | Sequence Number (2B), Max Client Number (4B) |
| Create Relay Response | 4 | 18 | Ack Number (2B), Max Client Number (4B) Server Relay Tunnel End Point (6B) Server Relay Tunnel End Point (IP address + UDP Port Number): the UDP socket address of the GMA elay for receiving messages from GMA server Client Relay Tunnel End Point (6B) Client Relay Tunnel End Point (IP address + UDP Port Number): the UDP socket address at the GMA relay for receiving messages from GMA client |
| Create Client Request | 5 | 38 | Sequence Number (2B), Client ID (4B), Client AES256 Key (32B) |
| Termination Request | 6 | 2 | Sequence Number (2B) |
| Acknowl-edgement | 7 | 2 | Ack Number (2B) |

TABLE 2

| Message | Management Information Elements |
|---|---|
| INIT-REQ | Server ID (Unsigned Integer), Session ID (Unsigned Integer) |
| INIT-RSP | Server ID (Unsigned Integer), Session ID (Unsigned Integer) AES 256 Key (32 Bytes) Server Relay Tunnel End Point: IP address (32 Bytes), UDP Port (2 Bytes) |

In operation 901, a discovery operation can take place whereby a GMA Server can establish a secure TCP (e.g., TLS) connection with the GMA Relay, using a pre-configured IP address and port in a manner similar to the discovery procedure between Client Connection Manager (CCM) and Network Connection Manager (NCM) as specified in RFC 8743 (2020). If the connection is successful, operation 902 can be performed. If the connection is not successful, can retry after a timeout.

In operation 902, an initialization can be performed whereby the GMA server can send the INIT-REQ message over the secure TCP connection to GMA relay. The INIT-REQ message can include the following information: Last Server ID (e.g., the last GMA server ID that the GMA server was using) and Last Session ID (e.g., the last GMA session ID that the GMA server was using).

If the GMA relay finds context information of the last or prior session for the GMA server based on the provided Server ID and Session ID information, GMA Relay can resume a prior session. Otherwise, GMA relay can create a new session with a new Server ID and a new Session ID. GMA relay can send the INIT-RSP message over a secure TCP connection to GMA server. In some examples, the INIT-RSP message can include the following information: Server ID (e.g., the GMA Server ID that the GMA server will be using), Session ID (e.g., the GMA Session ID that the GMA server will be using), Server AES256 Key (e.g., the shared key to protect control messages between GMA server and GMA relay), Server Relay Tunnel End Point (e.g., the IP address and UDP port number that the GMA relay will be used for transporting data and control messages with GMA server), and Server Tunnel End Point (e.g., the IP address and UDP port number of a control message observed by the GMA relay where the control message is sent by a GMA server to the Server Relay Tunnel End Point). In some examples, GMA relay can set server ID and session ID to "0" if relay has reached its capacity, and cannot support any new servers.

In operation 903, a NAT detection can be performed whereby GMA server can establish a UDP connection with the GMA relay based on the Server Relay Tunnel End Point information and send the NAT Detection Request message to the GMA relay. In response, the GMA relay can send a NAT Detection Response message with an IP address and UDP port number different from the Server Relay Tunnel End Point to the GMA server. GMA server can detect the NAT type of its network connection. If the NAT type is "Full Cone" (e.g., [RFC 3489], Simple Traversal of UDP Through NATS (STUN)), outgoing packets from a same internal IP address and port can be mapped to a same external IP address and port, and an external host can send a packet to the internal host, by sending a packet to the mapped external address. A NAT Detection Response message can provide a Server Tunnel End Point that can identify a source IP address and source UDP port number of the NAT Detection Request message that the GMA relay receives. The source UDP port number can be used later by GMA clients for sending packets directly to the GMA server. In some examples, NAT Detection Response message can include a different IP address and port from what is used to receive NAT Detection Request.

Operations 904-907 and, potentially 908, can follow operation 903 if a request relay supported. However, if request relay supported and if NAT Detection Response is not received, indicating "Full Cone" is not supported, then GMA client cannot send messages to GMA server directly and instead send messages to GMA relay, which will then help forward them to GMA server. If GMA relay rejects the relay request, GMA relay can set the "Max Number of GMA Clients" field to "0" and the GMA server may send a Termination Request message to end the session (e.g., operation 907). A session can be terminated if relay tunnel end point address and port are "0."

In operation 904, a server relay establishment can be performed whereby if the GMA server does not receive the NAT Detection Response message, GMA server can send a Create Relay Request message to the GMA relay for relay establishment. In response, the GMA relay can send a Create Relay Response message to the GMA server. In a Create Relay Request message, the GMA server can include a Max Number of GMA Clients that can represent a maximum number of GMA clients that the GMA server can support or communicate with simultaneously.

GMA relay can transmit to GMA server a Create Relay Response message, which includes one or more of: Max Number of GMA Clients (e.g., maximum number of GMA clients that the GMA relay can support for this GMA server, which may be less than what the GMA server can support), Server Relay Tunnel End Point (e.g., the updated IP address and UDP port number that the GMA relay will be used for transporting data and control messages with GMA server, which may be different from what is provided in the INIT-RSP message), and Client Relay Tunnel End Point (e.g., IP address and UDP port number that the GMA relay will be used for transporting data and control messages with GMA client).

In operation 905, a client relay establishment can be performed. If a GMA client starts a connection with the GMA server, the GMA server can send the Create Client Request message to the GMA relay, providing the following information: Client ID (e.g., an unsigned number in the GMA header of a GMA packet to uniquely identify the client) and Client AES256 Key (e.g., a shared key to protect control messages between GMA server and GMA client). GMA relay can use the Client AES256 key to authenticate control messages received from a GMA client, before forwarding messages to the GMA server. Moreover, GMA relay can maintain the per-client Client Tunnel End Point configuration to store the destination IP address and UDP port number that the GMA relay can use for sending messages to a client. The GMA relay can update the Client Tunnel End Point configuration based on the received GMA control messages (e.g., Probe, etc.) from the client.

In operation 906, a client-server communication can occur through GMA relay. If NAT Detection Response message is received by GMA server from GMA relay, indicating "Full Cone" (e.g., [RFC 3489], Simple Traversal of UDP Through NATS (STUN)) is supported, GMA client can send control and data messages to GMA server directly and GMA server can send control and data messages to GMA client directly.

If the GMA server successfully receives the NAT Detection Response message, GMA server can periodically send the NAT Detection Request message (e.g., a period of 30 seconds or other amounts) to the GMA relay. In response to receipt of NAT Detection Request, the GMA relay can send a NAT Detection Response message to the GMA server.

In operation 907, a termination of GMA server to GMA relay session can occur. The GMA server may send the Termination Request message to the GMA relay at any time to end the session.

Figure 10:
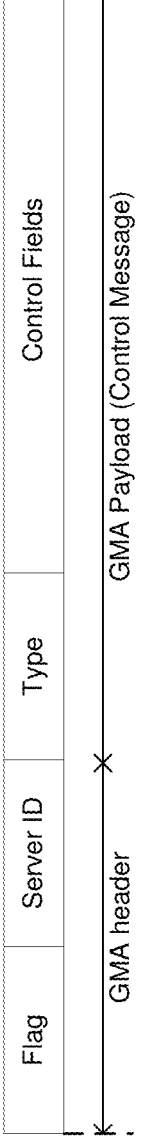
FIG. 10 shows an example GMA relay control message format that can be sent from GMA server to GMA relay or GMA client.

FIG. 10 shows an example GMA relay control message format that can be sent from GMA server to GMA relay. A GMA relay may provide a relay for multiple GMA servers. A GMA server can be considered a client of a GMA relay. One or more bits in a Flag header field (e.g., 2 bytes) of a GMA relay control message can indicate if the GMA message is sent to GMA relay ("1") that can indicate a Server ID is conveyed. The Server ID field can be 2 bytes, in some examples. Note that the flag field in a GMA client control message can be set to "0" to indicate the message is a GMA client message.

In some examples, messages used for communications between GMA server and GMA client can be consistent with J. Zhu and M. Zhang, "UDP-based Generic Multi-Access (GMA) Control Protocol," draft-zhu-intarea-gma-control-02 (Oct. 3, 2022). For control message communications between GMA client and GMA server, the GMA Flag can be set to "0" to identify a control message.

QOS-Aware Multi-Access Traffic Steering

In scenarios where multiple wireless or wireline networks (e.g., coaxial, fiber, cable, wired) are available, it may be desirable to distribute traffic over multiple networks. However, a second network may not provide a sufficient level of quality of service (QoS) for the traffic. If transmission of a flow using one network to a second network is to occur, a determination can be made as to whether a QoS for a flow is expected to be met where traffic is transmitted over the second network. For example, a QoS for the flow can specify a 100 milliseconds delay or $10^{-3}$ loss rate. If packets of the flow are sent over a cellular (e.g., 5G network) and a Wi-Fi network (e.g., IEEE 802.11) or other network is available, before moving packets of the flow to the Wi-Fi network or other network, a determination can be made of whether the Wi-Fi network or other network can meet the QoS for the flow. Various examples provide multi-access traffic steering with a check to determine if QoS requirements of the traffic flow are met prior to changing to use of the second network.

For example, various examples of QoS testing can apply at least to changing from transmitting one or more packets for Integrated Access Backhaul (IAB) via a 3rd Generation Partnership Project (3GPP)-consistent wireless network to transmitting one or more other packets for IAB to Multi Access Management Services (MAMS) over Generic Multi-Access (GMA) over a second network. For example, various examples of QoS testing can apply at least to changing from transmitting via a network between GMA client and GMA server to use of a GMA relay or changing from use of a GMA relay to transmitting via a network between GMA client and GMA server.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be differentiated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Reference to flows can instead or in addition refer to tunnels (e.g., Multiprotocol Label Switching (MPLS) Label Distribution Protocol (LDP), Segment Routing over IPv6 dataplane (SRv6) source routing, VXLAN tunneled traffic, GENEVE tunneled traffic, virtual local area network (VLAN)-based network slices, technologies described in Mudigonda, Jayaram, et al., "Spain: Cots data-center ethernet for multipathing over arbitrary topologies," NSDI. Vol. 10. 2010 (hereafter "SPAIN"), and so forth.

Figure 11:
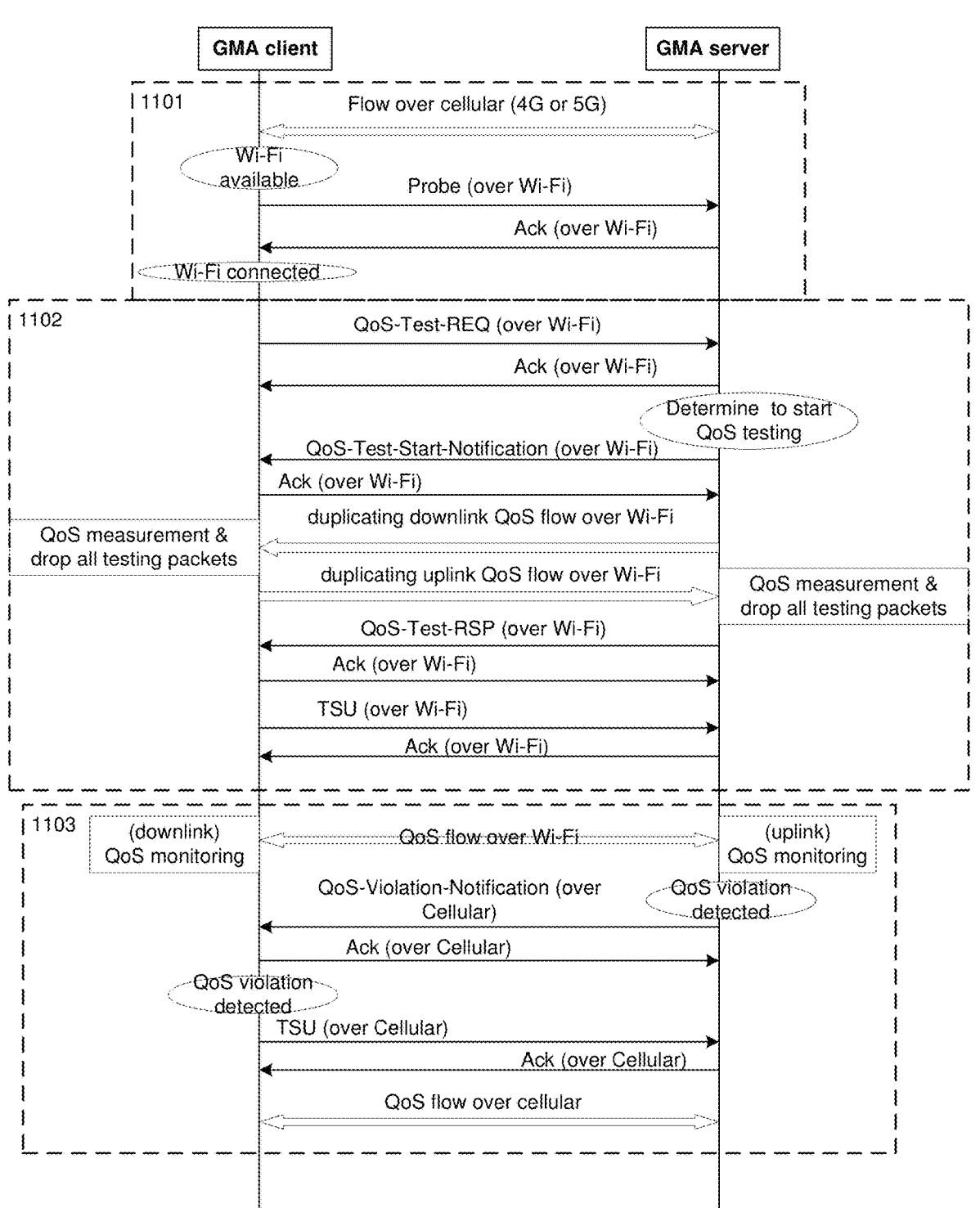
FIG. 11 shows a QoS-aware (Multi-Access) Traffic Steering protocol.

FIG. 11 shows a QoS-aware (Multi-Access) Traffic Steering protocol. The protocol can be used at least by client and server of systems of FIG. 1A, 1B, 1C, 2, or 3. QoS requirements (e.g., delay, loss, etc.) can be pre-defined or negotiated by MAMS management messages as defined in RFC 8743 in advance of partial or full migration of transmission of a flow from a GMA client and GMA server or from GMA server to GMA client.

Operation 1101 can include transmitting a flow with an associated QoS over a pre-configured default connection that can meet its QoS requirements, e.g. Cellular (4G or 5G). When a second connection (e.g., wired or wireless) becomes available, a GMA client can send a probe to test end-to-end connectivity of the second connection. While the second connection is shown as Wi-Fi in this example, another other wireless or wired protocol can be used. A probe can include a GMA control message. GMA control messages (e.g., J. Zhu and M. Zhang, "UDP-based Generic Multi-Access (GMA) Control Protocol," draft-zhu-intarea-gma-control-02 (Oct. 3, 2022)) can convey one or more of the following fields: QoS Testing Request (e.g., request QoS testing for a particular traffic flow), QoS Testing Start Notification (e.g., a control message sent by GMA server to start QoS testing for a particular flow), QoS Testing Response (e.g., a control message sent by GMA server to indicate if (uplink) QoS testing for a particular traffic flow is successful or not), and QoS Violation Notification (e.g., a control message sent by GMA server to indicate that QoS violation has been detected for a particular traffic flow).

Operation 1102 can include QoS testing whereby the GMA client can send a QoS Testing Request message to request QoS measurement for the flow on downlink, uplink, or both directions. A QoS Testing Request message can include one or more of the following fields: Flow ID (e.g., 1 byte (1B)) (e.g., an unsigned integer to identify a traffic flow for QoS testing), Traffic Direction (e.g., 1B) (e.g., an unsigned integer to indicate the direction of flow (0: downlink, 1: uplink, 2: both)), Connection ID (e.g., 1B) (e.g., an unsigned integer to identify a connection used for QoS testing), or Test Duration (e.g., 1B) (e.g., an unsigned integer to indicate the testing duration (unit: seconds)).

GMA server can determine when to start QoS testing and can send a QoS Testing Start Notification message to GMA client. QoS Testing Start Notification message can include one or more of the following fields: Flow ID (e.g., 1B), Traffic Direction (e.g., 1B), Connection ID (e.g., 1B), or Test Duration (e.g., 1B). Alternatively, the GMA server may send an unsolicited QoS Testing Start Notification message to start QoS testing without the QoS Testing Request message from GMA client. In response, the GMA client can transmit duplicated uplink traffic of the flow over the second connection. Duplicated packets can be used for testing, and can be discarded by the receiver side.

If uplink testing is performed and the GMA server collects measurements and GMA client decides whether to change to use of another network, the GMA server can send a QoS Testing Response message to provide the result of uplink testing. QoS Testing Response message can include one or more of the following fields: Flow ID (e.g., an unsigned integer to identify a traffic flow for QoS testing), status (e.g., an unsigned integer to indicate the result of QoS testing (0: success; 1: failure)), or Notice that QoS Testing Response is only needed for uplink QoS testing.

If downlink testing is performed and the GMA client collects measurements and GMA server decides whether to change to use of another network, the GMA client can send a QoS Testing Response message to provide the result of uplink testing. However, a QoS Testing Response message may or may not be sent for downlink testing. QoS Testing Response message can include one or more of the following fields: Flow ID (e.g., an unsigned integer to identify a traffic flow for QoS testing), status (e.g., an unsigned integer to indicate the result of QoS testing (0: success; 1: failure)), or Notice that QoS Testing Response is only needed for uplink QoS testing.

If GMA server is to determine whether to change to use of a second network, GMA server can test a downlink and GMA client can send QoS Testing Response to GMA server. If GMA client is to determine whether to change to use of a second network, GMA server can test uplink and GMA server can send QoS Testing Response to GMA client.

In some examples, one or more of QoS Testing Start Notification message, QoS Testing Response, or duplicated traffic can be marked as lower priority to reduce impact to other user traffic on the second network. For example, lower priority can be indicated in a Differentiated Services Field Codepoints (DSCP) field (e.g., T. Szigeti et al., Internet Engineering Task Force (IETF), "Mapping Diffsery to IEEE 802.11," RFC 8325 (February 2018).

If QoS testing is successful and QoS can be met on the second connection, operations can continue to operation 1103. If QoS testing fails or QoS was not met on the second connection, operations can wait a pre-configured time period (Minimum QoS Testing Interval) and then some or an entirety of 1102 can be repeated. If the second becomes unavailable, go back to operation 1101.

Operation 1103 can include QoS monitoring and violation detection whereby the GMA client can send a TSU message (e.g., J. Zhu and M. Zhang, "UDP-based Generic Multi-Access (GMA) Control Protocol," draft-zhu-intarea-gma-control-02 (Oct. 3, 2022)) to steer the flow from the default connection to the second connection. In some examples, packets of the flow can be sent over the default connection and also the second connection. In the meantime, the GMA client and/or GMA server can monitor QoS (loss rate, latency, etc.) for the downlink and/or uplink traffic of the flow. If the GMA server detects QoS violation, it can send the QoS Violation Notification message to the GMA client. If the GMA client detects QoS violation, it can send the QoS Violation Notification message to the GMA server. QoS Violation Notification message can include one or more of the following fields: Number of QoS Flows (e.g., 1B), Flow ID (e.g., 1B×N) (e.g., an unsigned integer to identify a traffic flow with QoS violation) or Traffic Direction (e.g., 1B×N) (e.g., an unsigned integer to indicate the direction of flow (0: downlink, 1: uplink, 2: both)).

In response, the GMA client or GMA server can send the TSU message to steer the flow back to the default connection. The GMA client or GMA server may also detect QoS violation and trigger steering the flow back to the default connection. Afterwards, the GMA client can wait for a pre-configured time period (Minimum QoS Testing Interval), and go back to operation 1102.

APPENDIX 1 provides an example of communications and processes that can be used to determine QoS of a second connection.

Figure 12:
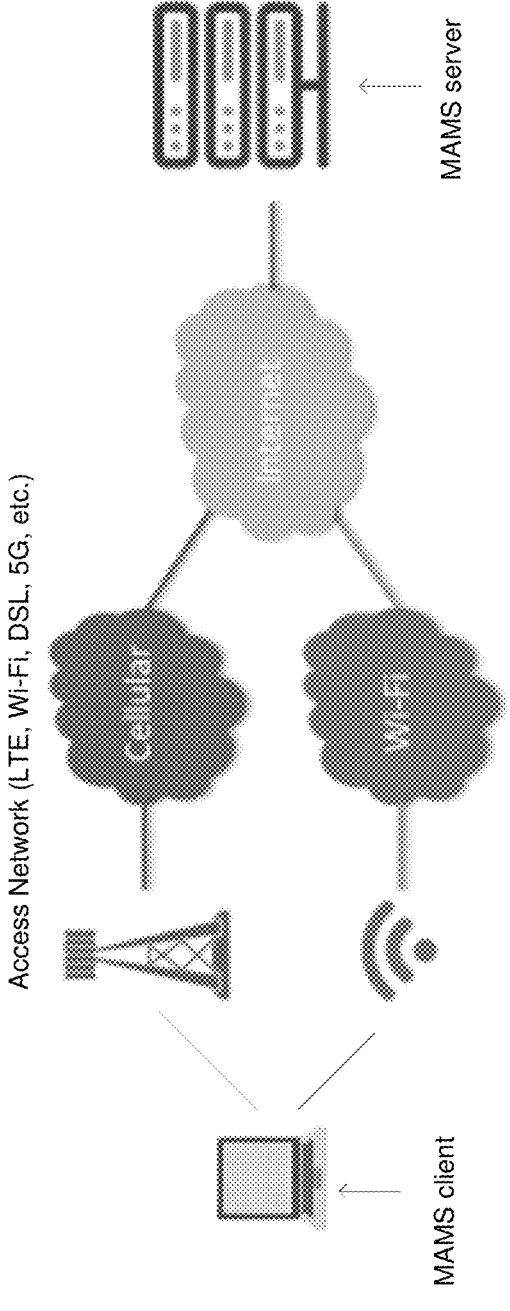
FIG. 12 depicts a cloud or edge-based MAMS service system.

Packet Group and Priority Aware Active Queue Management (AQM) for Multi-Access Edge Network FIG. 12 depicts a cloud or edge-based MAMS service system. MAMS client can communicate with a MAMS server via an access network that can utilize one or more manners of communication. For example, an access network can utilize one or more of: 5G, LTE, Wi-Fi, DSL, or other manners of communication. In the access network, Active Queue Management (AQM) solutions (e.g., Random Early Detection (RED), Controlled Delay Active Queue Management (CoDel), or others) can be deployed in a router, access point, base station, switch, and other devices, to mitigate network congestion by proactively dropping packets.

Applications and transport protocols, such as quick UDP Internet Connections (QUIC), can encapsulate multiple traffic streams into a flow. For example, voice and video streams may be multiplexed into a video conference flow. In network devices, traffic management can be used to manage network traffic and provide Quality of Service (QoS). However, traffic management, such as IP differentiated services based on the DSCP, operates on the flow level, and may fulfill different QoS requirements of individual streams that are multiplexed into one flow. Packet level QoS metrics can provide per packet priority. The QoS metrics can be carried in the DSCP field, or control header such as convergence protocol GMA (e.g., J. Zhu et al., "Generic Multi-Access (GMA) Encapsulation Protocol," RFC 9188 (February 2022)).

Various examples can perform (1) packet group and priority marking at a MAMS client or server and (2) proactive packet dropping at a network device in an access network.

FIG. 13 depicts an example BNG (Broadband Network Gateway) pipeline. BNG operations are described at least by several technical reports of the Broadband Forum (e.g., TR-101, TR-145, and TR-178). According to IETF, a BNG is defined as a server which routes traffic to and from broadband access devices, e.g., DSLAMs, on an ISP network. A BNG can also be referred to as a Network Access Server (NAS) and/or a Broadband Remote Access Server (BRAS).

Various packet processing pipeline languages can be employed to program a packet processing pipeline. In an FPGA-based QoS traffic shaping processor 1500, packets enter the FPGA on the INPUT side after being processed by the P4-BNG pipeline 1400. The enqueue manager decides, supported by a classifier and an optional Active Queue Management (AQM) module, if and in which queue a packet should be inserted. While being queued, packets are stored in external DRAM. The dequeue manager decides which packet should be sent next and if packets should be dropped from a queue by an AQM algorithm. Parameter configuration can be done via PCIe.

The FPGA-based QoS traffic shaping processor 1500 may operate as follows: first, incoming packets are classified by the FPGA and enqueued in one of the FIFO queues. A packet classifier classifies the incoming packets, which can be either implemented within the FPGA only or within a preceding P4 switch. In the latter case, the queue ID (e.g., a 32-bit value) is committed to the FPGA as an additional header in front of the existing outer Ethernet header. The FPGA extracts this queue ID and removes the leading ID bits of the packet. The advantage of this approach is that a queue and QoS class classification can be done with ease inside a P4 pipeline which is made exactly for such lookups.

Approaches for hierarchical and oversubscribed access networks exist in related work as well. Laki et al. proposed a per packet value approach which allows a QoS aware drop policy in oversubscribed access network. Due to the accounting accuracy reasons and inter customer separation, this approach cannot be applied one by one at the moment. However, this per packet value approach may simplify the HQoS scheduling in some points and could be realized within the openBNG design as well.

FIG. 13 shows an example BNG pipeline. BNGs can perform physical network functions that provide residential network access. Residential network access functions in the central office are integrated in the BNG, mostly implemented on purpose-built hardware. The BNG function has been specified by several technical reports of the Broadband Forum (e.g., TR-101, TR-145, and TR-178). According to IETF, a BNG is defined as a server which routes traffic to and from broadband access devices, e.g., DSLAMs, on an ISP network. A BNG can also be referred to as a Network Access Server (NAS) and/or a Broadband Remote Access Server (BRAS).

The P4 pipeline description language is used to describe packet header processing, but is not designed for describing packet queueing and scheduling behavior which is needed at ISP service edges in downstream direction. An FPGA can be either subsequently or edgewise added to a P4-BNG pipeline. By that, hardware (e.g., a P4 programmable switch), can perform packet header processing and table lookups. In addition, FPGAs can be used to implement the needed queueing behavior.

Figure 14:
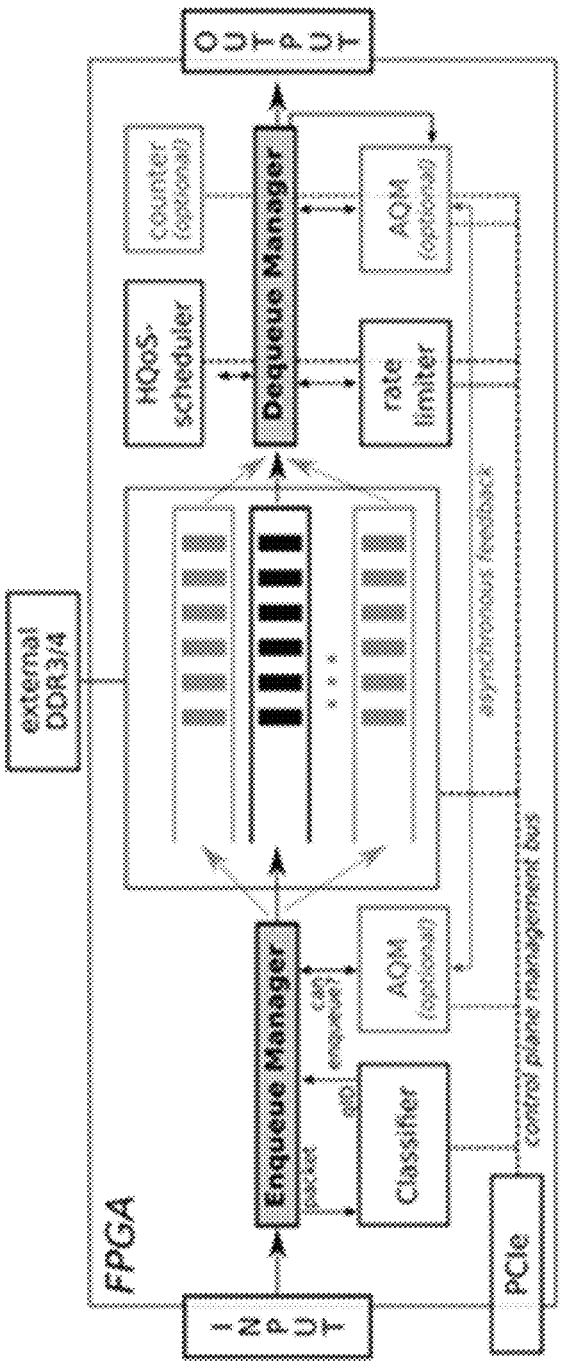
FIG. 14 depicts an example system.

FIG. 14 depicts an example system. The FPGA-based QoS traffic shaping processor may operate as follows: first, incoming packets are classified by the FPGA and enqueued in one of the FIFO queues. A packet classifier classifies the incoming packets, which can be either implemented within the FPGA or within a preceding P4 switch. In the latter case, the queue ID (e.g., a 32-bit value) is committed to the FPGA as an additional header in front of the existing outer Ethernet header. The FPGA extracts this queue ID and removes the leading ID bits of the packet. The advantage of this approach is that a queue and QoS class classification can be done with ease inside a P4 pipeline which is made exactly for such lookups.

In some examples, packets can be dropped starting from lower priorities when congestion is detected. Per-Packet Priority (PPP) AQM methods that can be deployed at network nodes, e.g., router, switch, Access Point, and Base Station, etc. PPP AQM schemes can be applied to other queue management systems (e.g., per-class or per-UE) and/or scheduling systems. In various examples, when congestion occurs, PPP AQM drops packets starting from lower priorities. Techniques to estimate the number of bytes that will be dropped due to delay violation during congestion events, and techniques to proactively drop the same number of bytes but with lower priorities are discussed infra. Parameters for enhanced PPP AQM includes shared or per-flow control parameters and per-flow queue state variables.

The shared control parameters (e.g., shared by some or all flows) and/or per-flow control parameters include: L which is a number of priority levels (e.g., 8); T which is a packet queuing delay bound (deadline) (e.g., if D>T, the dequeued packet is dropped); $f(D,T,Q)$ which is a configurable/adaptive function that computes the predicted number of Bytes to be dropped from the queue. Examples of $f$ (D, T, Q) include:

$$f(D,T,Q)=Q$$

where $\beta$ and $\alpha$ are configurable parameters (e.g., $\beta=1$ and/or $$\alpha = \times\left(\beta\frac{D}{T} - \alpha\right)$$

0.3 as a default)

$$f(D, T, Q) = Q\times\left(\frac{D}{T}\right)^{\lambda}$$

where $\lambda$ is a configurable parameter (e.g., $\lambda=3$ as a default)

The per-flow queue state variables include Q which is a queue length (e.g., in Bytes); K which is an estimated number of Bytes to be dropped from the queue (e.g., may be in the range of [0, Q]); S which is a packet size (e.g., in Bytes); D which is a queuing delay of the dequeued packet; P which is a per packet priority within the range of [0, L−1] where a smaller value of P indicates a higher priority (e.g., where P=0 is a highest priority, and P=L−1 is a lowest priority); x(i) which is the number of queued data items (e.g., Bytes) with priority P=i (e.g., i=0, . . . , or L−1), or is a buffered number of bytes for priority i; T1 is the arrival timestamp of the first (front) packet in the queue; and T2 is a current time.

Figure 17:
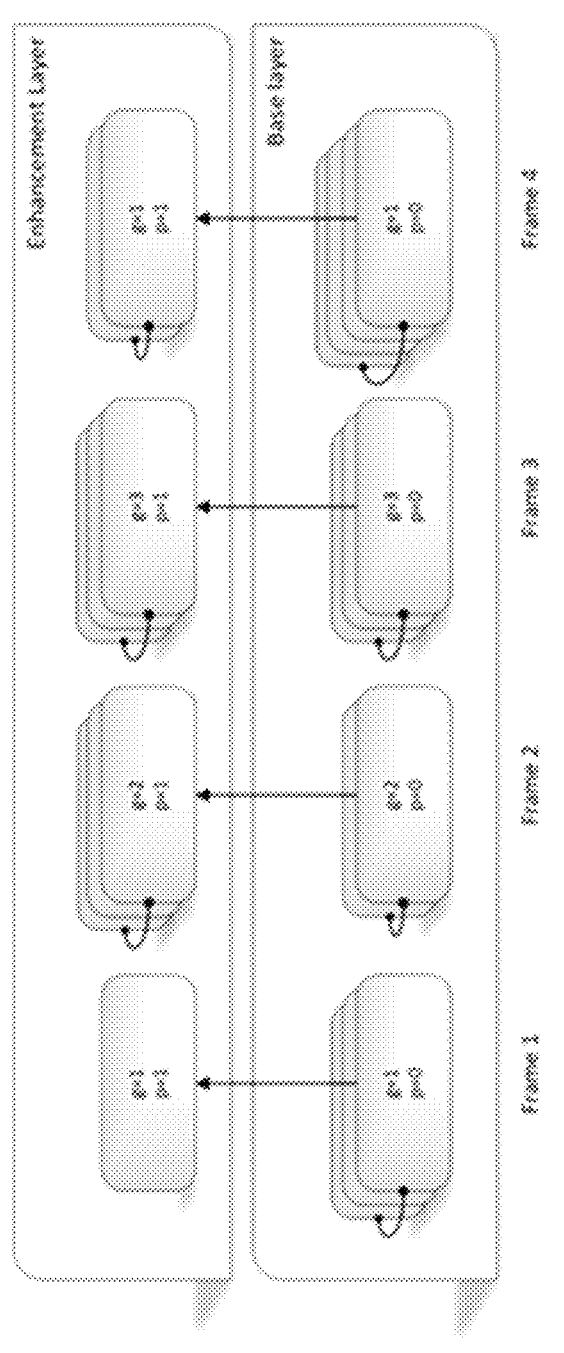
FIG. 17 depicts an example of SVC with multiple layers.

For the two-layer example in FIG. 17, if a packet marked with p=0 (base layer) is lost, all packets and layer (e.g., base layer) belonging to the same group are to be dropped. However, if a packet marked with p=1 (enhancement layer) is lost, packets from the enhancement layer of the same group are to be dropped, and the base layer packets is to be transmitted.

Based on a decision to drop a packet, PPP AQM can select other packets to drop based on group identifier or priority. A decision to drop a packet can be based on buffer being full or prior to the buffer being full. For example, a group of packets with dependency (e.g., belongs to the same frame) using a group identifier. A method to identify a group of packets with dependency and priority, using 3 bits group ID (or dependency timer) and 5 bits priority in the header, respectively. Where packet drop is triggered by AQM, such as PPP AQM (e.g., OpenBNG: Central office network functions on programmable data plane hardware (2020)), packets in the buffer can be discarded or dropped prior to buffering where the packets have a dependency to dropped packets based on group ID and priority. Packets in the buffer with dependency to the dropped packets can be dropped based on dependency timer expiration and priority, where packet drop is triggered by AQM, such as PPP AQM.

Figure 15:
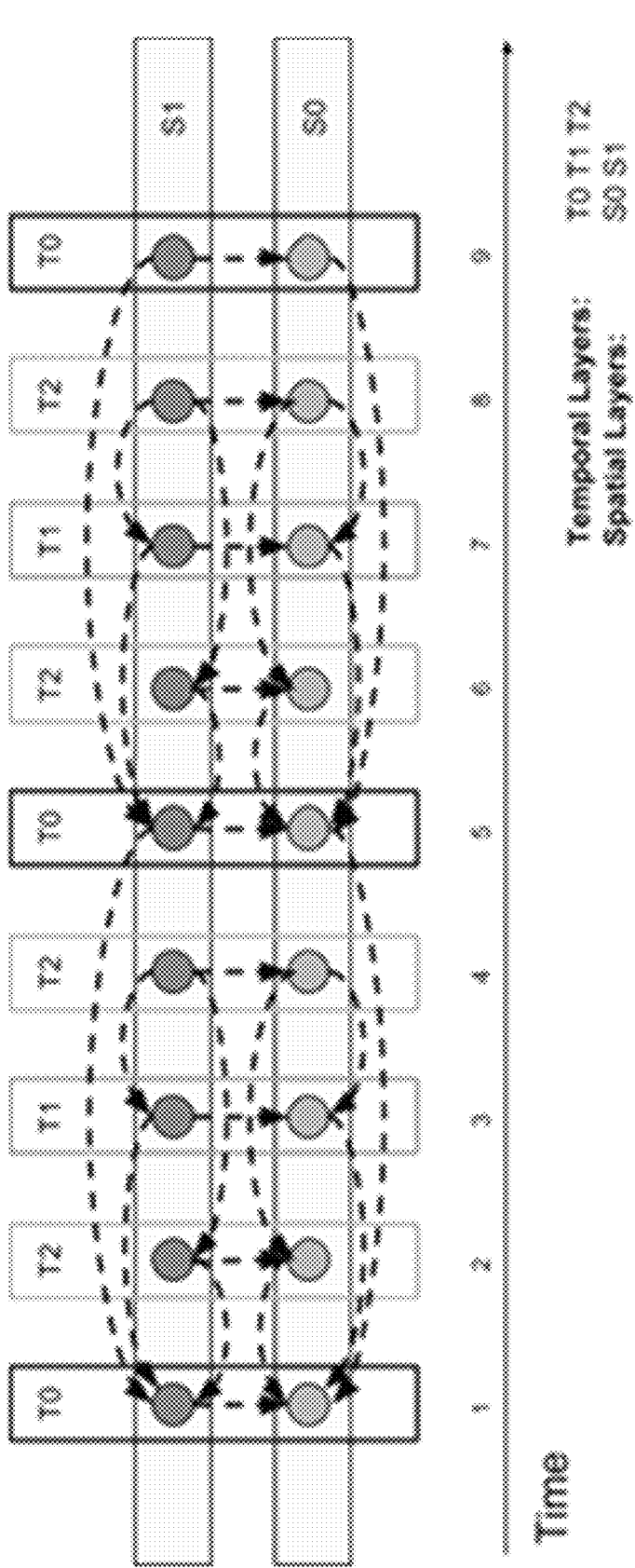
FIG. 15 depicts spatial and temporal layer dependency of Scalable Video Coding (SVC).

FIG. 15 depicts spatial and temporal layer dependency of Scalable Video Coding (SVC). Various examples of SVC are described for example with respect to Chrome's WebRTC VP9 SVC Layer Cake, or others. For real-time traffic, such as streaming media, packet retransmission can be disabled and in cases where packets contain data that is dependent on other data of other packets, such as packets that are from a same frame, or from the frames that depend on each other in the (video) encoding/decoding process, when a packet is dropped, packets that depend on the dropped packet can be discarded at the receiver even though they are successfully delivered by the network. As a result, packets can be over-dropped at the receiver, and waste network resources.

Some examples described herein mark dependency among packets using one or more of: a packet group and/or priority. In some examples, the packet group marking field (e.g., 3 bits) and priority marking field (e.g., 5 bits) may be added to an existing Generic Multi-Access encapsulation header (e.g., [RFC9188]). Packet group ID (e.g., 3 bits) to mark packets that belong to the same group (or a frame). For packets belonging to the same group but with different importance, a priority marking (5 bits) can differentiate packet priority. A group identifier can be based on base or enhancement frame. A packet priority can be based on spatial rate or frame rate.

Figure 16:
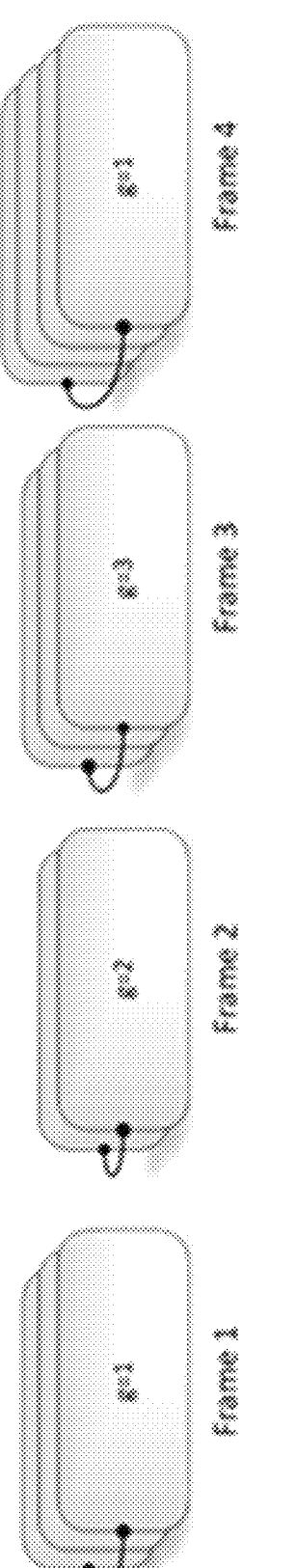
FIG. 16 shows an SVC example with 2 spatial layers and 3 temporal layers.

For example, packets that transmit Scalable Video Coding (SVC) with spatial and temporal layer dependency content can be assigned a packet group and/or priority. FIG. 16 shows an SVC example with 2 spatial layers and 3 temporal layers. In this example, a packet group includes 4 frames in the time domain, which starts from TO, and followed by T2, T1, and T2. The dashed arrow line shows the dependency of the layers. For example, S1 layer depends on S0 layer; T1 layer depends on TO; and T2 layer depends on TO and T1 layer. Consequently, the most important base layer SOTO contains a low quality and low frame rate version of the video. As more layers are received, video quality improves and frame rate increases.

Based on packet group and priority marking, a network device (router, switch, etc.), can proactively drop packets taking consideration of packet priority and/or dependency (e.g., group). When a packet is dropped (and retransmission is disabled), other buffered packets that are in the same packet group, and with equal or lower priority, can also be dropped. At a switch or endpoint receiver, AQM packet dropping can be applied to determine whether to drop a packet based on per-packet dependency markings of packet priority and/or group. Various examples selectively drop packets from frames that depend on each other. Moreover, packets that depend on a dropped packet/frame can also be dropped to save network bandwidth and network resources. Congestion in network devices can be reduced and energy consumption at the receiver can be reduced where the receiver does not attempt to decode the partially received data.

A frame can be divided into packets and packets can be associated with a frame ID. A packet group marking (g) can be used to identify dependency or dependencies among packets, e.g., packets belong to the same frame. For example, N bit information in a packet header, such as 3 bits or other number of bits, can indicate a packet group ID range from 0 to 7, or other ranges. For example, packet group ID=0 can indicate no dependency marking. For example, when a packet with group ID=0 is dropped, no other buffered packet will be dropped. When dependency marking is enabled, a group ID starts from 1 and can be increased by 1 per frame and can reset to 1 after reaching a value of 7.

FIG. 16 shows an example of the packet group marking of N=2 with a frame fragmented into multiple packets. A first frame can be fragmented into 3 packets and share a group ID=1. A following frame can be fragmented into 2 packets and share a group ID=2. A group ID for a next frame can be 3. For frame 4, the fragmented packets' group ID can be reset to 1. Packet group information can be obtained from an RTP header's start of a frame and end of a frame bit as described in section 4.3 of J. Uberti, "RTP Payload Format for VP9 Video," AVTCore Working Group draft-ietf-payload-vp9-16 (Jun. 10, 2021). A frame (or packet group) can begin with a packet with a start of a frame flag set and end with a packet with end of a frame flag set.

Packet group marking and dropping techniques can be applied to packet fragmentation processes at various network layers, such as IP fragmentation. A fragmentation process can assign a unique ID to fragmented packets of a single datagram. For IP fragmentation, this unique ID can be carried in an Identification field in a IPV4/IPV6 header, and IP packets with the same Identification value can be marked as the same packet group. A frame may be fragmented to multiple smaller packets before transmitting over the internet due to the constraint of Maximum Transmission Unit (MTU). For example, a 6 kilobyte (KB) frame may be fragmented to 4 packets of 1.5 KB size. Consequently, reconstructing the original frame includes re-assembling packet fragments at the receiver.

FIG. 17 depicts a frame that includes two layers, where a base layer carries the critical video information and enhancement layer carries optional information that is decodable based on a received base layer. A video frame may be divided into layers, and a layer can include multiple fragmented packets. For example, a Scalable Video Coding (SVC) stream may divide video frames into S spatial layers and T temporal layers (for a total of S×T layers), which scales a video stream to different resolution and frame rate, respectively. In this case, a packet group may include more than one frame. A temporal layer can include 1 frame per packet group, whereas 2 temporal layers can include 2 frames per packet group and 3 temporal layers can include 4 frames per packet group. Packets belonging to a same frame can be identified from the start of a frame and end of a frame bit. Spatial and temporal layer information of a packet can be obtained from the RTP header's TID (temporal layer ID) and SID (spatial layer ID) as described in section 4.2 of J. Uberti, "RTP Payload Format for VP9 Video," AVTCore Working Group draft-ietf-payload-vp9-16 (Jun. 10, 2021). Priority of a packet can be based on the SID and TID in the SVC RTP header (e.g., S. Floyd, AT&T Center for Internet Research at ICSI, "Adaptive RED: An Algorithm for Increasing the Robustness of RED's Active Queue Management" (2001) Packet group ID can be marked based on the SVC RTP header. Packet group ID can be marked based on the unique ID for a group of fragments of a single datagram, such as the Identification field in IPV4/IPV6 header for IP fragmentation.

When some of the enhancement layers are lost during a congestion event, the receiver can still reconstruct a low-quality video using the received layers. The more layers the receiver receives, the higher the perceived video quality (e.g., higher resolution or frame rate).

A packet group ID marking can occur for N=2, where a frame is divided to 2 layers and an enhancement layer depends on base layer and each layer is fragmented into multiple packets. Packets from a same frame share the same group ID, and those from a same layer of the same frame share the same priority (p=0 indicates the highest priority). Packets of a base layer can be marked with priority p=0 and enhancement layer packets can be marked with priority p=1. Packets that carry a base layer can be associated with a higher priority than packets that carry a portion of an enhancement layer because base layer packets can be used to decode enhancement layer packets.

If a number of layers is smaller than a maximum level of priority, each layer can be assigned a unique priority (p) value as shown in FIG. 17. However, if the number of layers is larger than max level of priority, some layers need to be marked as the same priority. For example, if 3 priority levels are used to mark 6 layers, various manners of assigning priority levels to a layer can be applied. For example, a number of layers can be assigned to a priority level. For example, 2 layers can be assigned to a priority level and priority can be assigned as follows: [0, 0, 1, 1, 2, 2]. For example, a same priority level can to a least important 4 layers as following: [0, 1, 2, 2, 2, 2].

For SVC, priority of spatial and temporal layers can be ranked. First, as all layers depend on the base layer (S0T0), the base layer has the highest priority. However, depending on the preference, either resolution (S1T0) or frame rate (S0T1) can be prioritized for priority marking. A layer (S1T2 in the following example) can be assigned lowest priority if no other layers depend on it. An example of priority marking for SVC with 2 spatial layers and 3 temporal layers is given below. In this example, packets from 6 (spatial and temporal) layers can share a same (packet) group ID. An enhancement layer can have a higher resolution (more pixels per frame) or higher frame rate (more frames per second). Packets that carry base layer content can be assigned a higher priority than packets that carry enhancement layer content.

| Preference | Priority (high to low) |
|---|---|
| High Resolution | S0T0, S1T0, S0T1, S1T1, S0T2, S1T2 |
| High Frame Rate | S0T0, S0T1, S0T2, S1T0, S1T1, S1T2 |

Figure 18:
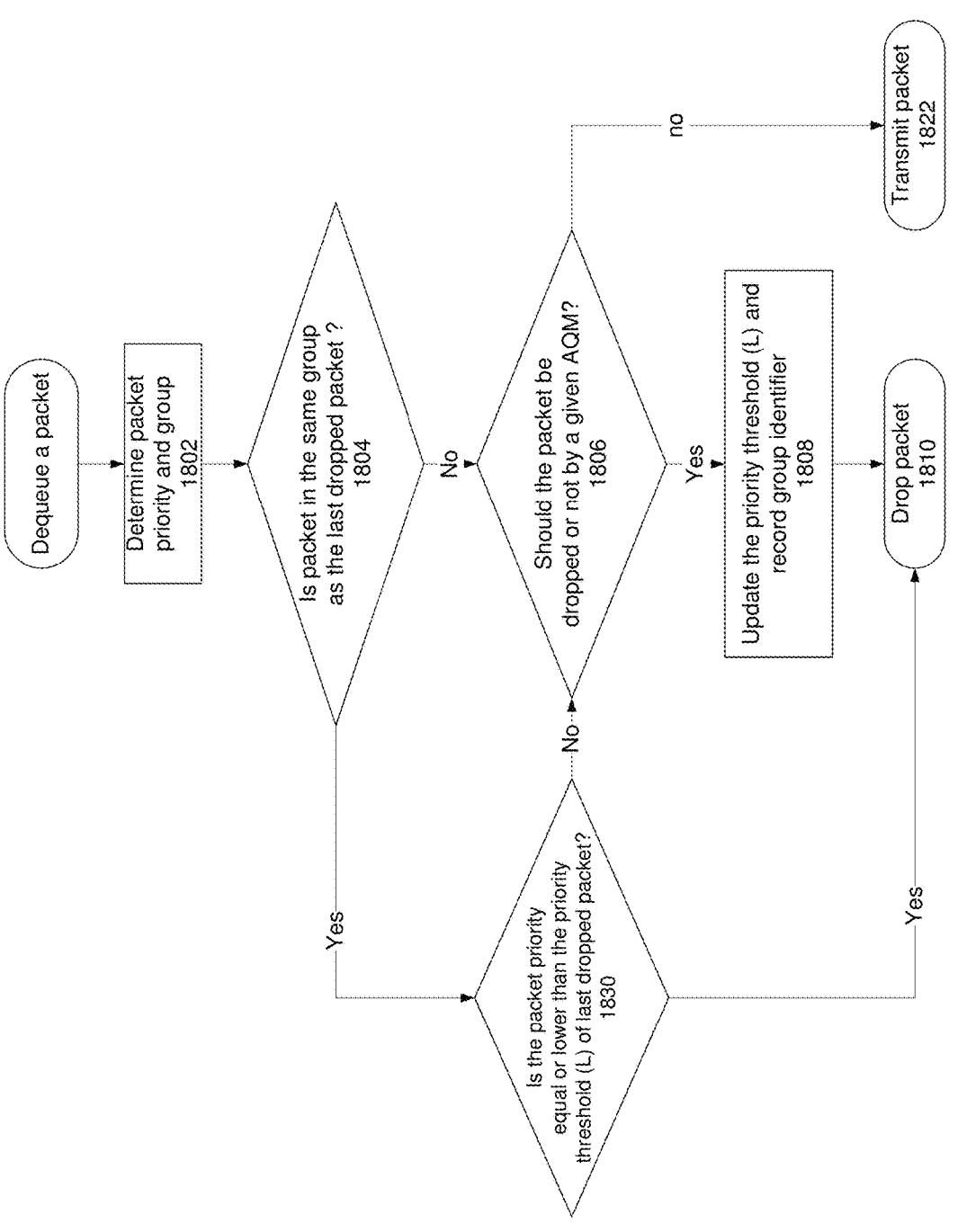
FIG. 18 depicts an example process for packet dropping based on packet group (g) and/or priority (p).

FIG. 18 depicts an example process for packet dropping based on packet group (g) and/or priority (p). The process can be performed by AQM at a network device (e.g., switch, access point, base station, or other devices) between endpoint transmitter and endpoint receiver. AQM can include a packet queue management. Parameter g can represent a group ID of a dequeued packet. Parameter p can represent a priority of a dequeued packet. In some cases, a lower value of p can represent a higher priority.

At 1802, based on dequeue of a packet, packet priority p and group id g of the packet can be accessed. At 1804, a determination can be made if packet is in the same group as the last or previously dropped packet. If the packet is in the same group as that of a last or previously dropped packet, the process can proceed to 1830. If the packet belongs to a different group as that of the last or previously dropped packet, the process can proceed to 1806.

At 1806, a determination can be made as to whether application of AQM per-packet priority determines to drop this packet. A selected AQM procedure (e.g., Random Early Detection (RED), Controlled Delay Active Queue Management (CoDel), or others) can be used to determine to drop the packet based on queueing delay or current queue size. At 1806, based on determination not to drop the packet, the process proceeds to 1822 and the packet is transmitted and not dropped. Based on determination to drop the packet, at 1808, the group and priority threshold (L) can be updated to that of the packet determined to be dropped. At 1810, the packet is dropped from a queue.

At 1830, a determination can be made as to whether the packet has a priority equal to or lower than a priority threshold (L) of the last or previously dropped packet in a same group. Based on the packet having a priority that is higher than the threshold L, then the process can proceed to 1806. Based on the packet having a priority equal or lower than a threshold (L), then the packet is to be dropped at 1810.

In some scenarios, packet group information is not transmitted. Packets received within a time interval are assumed to be part of a same packet group, even if out of order in terms of sequence number. A dependency timer T can be used to infer packet group information after packet drops, and discard packets based on the priority (p). Dequeued packets in the next T time interval depend on the dropped packet. Parameter T can be based on frame rate. So, if frame rate=30 frames/second, then T=$\frac{1}{30}$ seconds per frame. For example, when a packet is dropped by AQM, a timer can be started that lasts for T seconds (or smaller interval) and packets with the same or lower priority can be dropped until the timer T expires.

Figure 19:
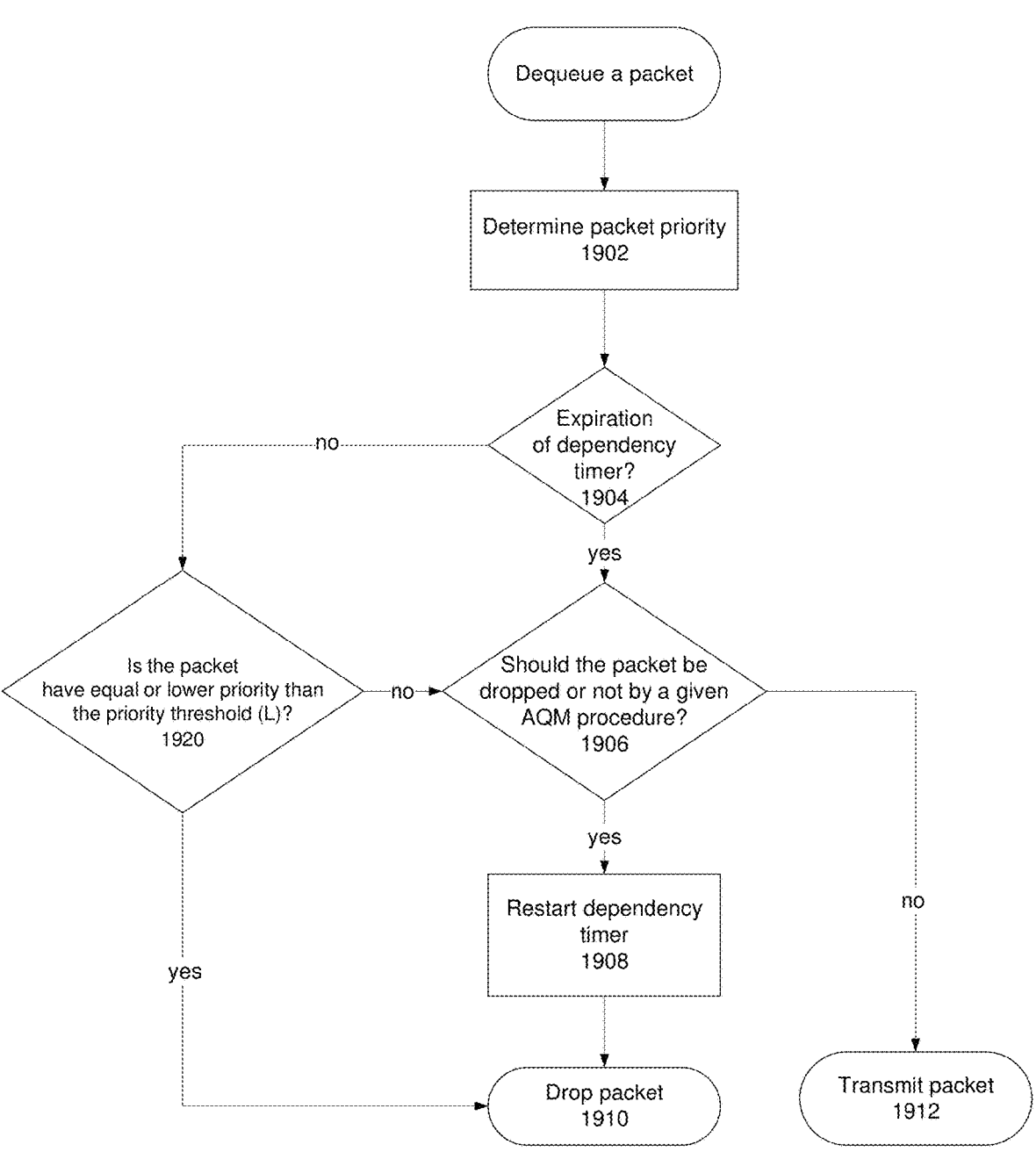
FIG. 19 depicts a process for timer-based dependency and priority (p) aware AQM.

FIG. 19 depicts a process for timer-based dependency and priority (p) aware AQM. At 1902, based on dequeue of a packet, packet priority p of the packet can be accessed. At 1904, a determination can be made if dependency timer expired. For example, if ts_now≥ts_drop+T, a dependency timer can be determined to have expired. Parameter ts_drop can represent timestamp of the last packet dropped by AQM. Parameter ts_drop can be initialized to (ts_now−T−1). Parameter ts_now can represent timestamp of current time. Parameter T can represent a configurable dependency timer for a packet group, e.g., 50 ms or other duration. Based on expiration of dependency timer, at 1906, a determination can be made as to whether to drop the packet based on a selected AQM scheme. The packet can be dropped based on a current queue size or queueing delay. At 1908, based on a determination to drop the packet, the dependency timer can be restarted. Parameter L can represent a priority threshold for dropping the packets in the same group. Parameter p can represent a priority of dequeued packet. For example, parameter ts_drop can be set to ts_now and parameter L can be set to p. At 1910, the packet can be dropped. However, based on the packet not having been dropped, the packet can be identified to be transmitted at 1912.

Based on non-expiration of dependency timer, at 1920, a determination can be made as to whether the packet is to be dropped based on its priority level. For example, if a priority of the packet is lower or a same as the priority threshold L (e.g., p≥L), then the packet can be identified to be dropped at 1910. However, based on a priority of the packet being higher than threshold L, the process can proceed to 1906.

APPENDIX 2 provides an example of communications and processes that can be used to identify packet group and/or priority.

Packet Priority Aware Congestion Control for Multi-Access Edge Network

Congestion control regulates network traffic, such as video streaming and file transfers. Due to feedback delay of approximately one round-trip time to reach a sender, the sender reacts to congestion feedback at least one round-trip time after congestion is detected. Various congestion control schemes attempt to provide high throughput or short latency. Some QoS-aware edge networks that support per-packet priority-aware active queue management.

Applications can mix various traffic with different priorities into one flow. For example, Scalable Video Coding (SVC) divides a video fame into temporal and spatial layers and the video quality depends on a number of decoded layers. In the decoding process, enhancement layers rely on the base layer and packets that convey base layer content can be assigned higher priority than that of packets that convey enhancement layer content.

RFC 8312 (2018), "CUBIC for Fast Long-Distance Networks" [RFC 8312] considers packet loss event to network congestion and can reduce packet transmission rate. RFC 8698 (2020), "Network-Assisted Dynamic Adaptation (NADA): A Unified Congestion Control Scheme for Real-Time Media" [RFC 8698] treats packets equally and does not consider relative priority among them. NADA is one of the emerging congestion control algorithms for real-time applications, such as WebRTC. NADA considers queueing delay as a congestion signal to reduce latency. NADA performs loss calculation on packets with equal weights, despite packets having different priorities. Congestion control schemes detect congestion based on the packet loss ratio (e.g., NADA) or a packet loss event (e.g., CUBIC) but may not differentiate packet loss between high and low-priority packets in a flow and may reduce sending rate even if losses are only from low-priority traffic in the flow.

Various examples provide congestion detection based on packet loss to weigh loss of high-priority packets than the loss of low-priority packets. For example, SVC's base layer packets can be assigned a higher priority than a priority of packets that transmit enhancement layers. In some examples, low-priority packet loss can be weighed less than that of high-priority packet loss in packet loss rate measurement. In some examples, different weights can be used for computing the packet loss of each priority to obtain a (priority-based) weighted packet loss rate. Loss of high-priority traffic can be considered more than the loss of low-priority traffic. Weighted loss can be computed to ignore the packet loss of low-priority traffic, and only measure the loss from high-priority traffic. Alternatively, different weights can be allocated for computing loss of packet of different priorities. The higher the packet priority, the heavier the weight in loss calculation. For example, an application can consider high priority packet drops weighted more in determining congestion signaling based on NADA.

Some examples can modify packet loss measurement for loss rate based congestion control algorithms, such as NADA. Congestion detection can be more biased toward reducing loss high-priority packets. A higher the packet priority, the heavier the weight in a loss calculation and congestion detection and mitigation can be more biased toward reducing congestion for high-priority packets. Congestion detection can be more biased towards high-priority packets and reduce rate reduction based on low-priority packet loss. On the other hand, when there is no congestion, rate can be increased more aggressively if the network supports per-packet priority-based AQM.

Weighted packet loss can be based on multiple options. In some examples, packet loss can be weighted by priority at a transmitter. In some examples, weighted packet loss ratio can be determined at a receiver side. Determining weighted packet loss ratio at a receiver can have lower feedback overhead.

By application of congestion control, in response to loss of a packet, transmit rate of a flow can be reduced by an application or OS executed by a network device (e.g., router, access point, base station, switch, network interface device, and other devices). Various examples can determine per-packet priority from SID and TID fields of an RTP packet header. Various examples can compute weighted loss ratio based on the loss of high-priority packets (priority ≤L). Various examples can compute the weighted loss ratio based on the loss per priority and a weight vector. Various examples can probe network bandwidth by duplicating packets or applying network coding in application-limited cases, where redundant packets can be marked as low priority. Various examples can detect whether the underlying infrastructure supports per-packet priority by comparing the loss ratio of high-priority traffic against loss ratio of packets of various priorities. Various examples can detect congestion level based on the priority of lost packets and traffic volume per priority. Various examples can dynamically adjust the multiplicative decrease factor based on congestion level for loss rate based congestion control, such as NADA, Cubic, New Reno, A Google Congestion Control Algorithm for Real-Time Communication (e.g., draft-ietf-rmcat-gcc-02) (2016), or others. Various examples can increase the additive increase factor for loss-based congestion control when the per-packet priority is active. Various examples can apply priority-based AQM and maintain a packet transmit rate as high as possible for a mixture of high and low priority packets.

Figure 20:
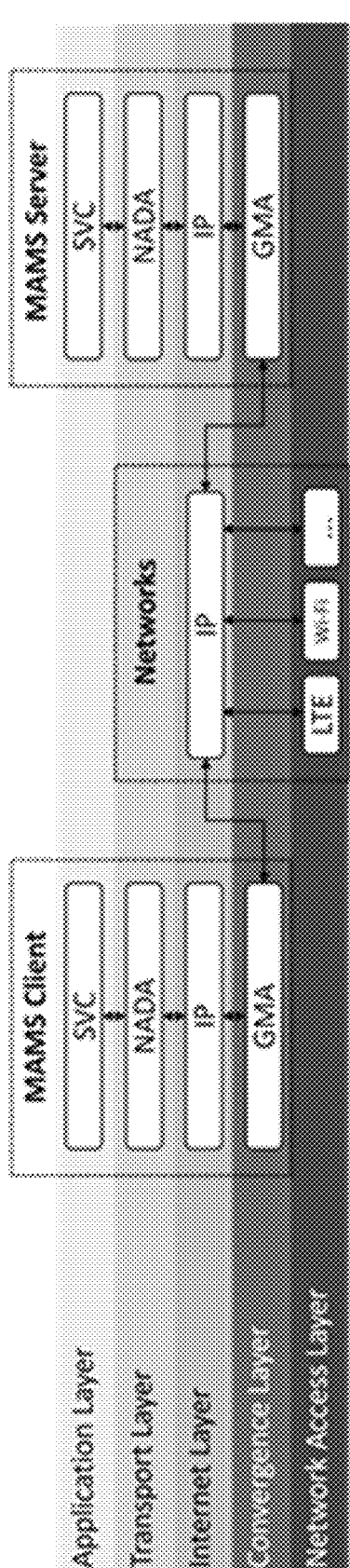
FIG. 20 depicts a network layer diagram of a cloud or edge-based service model with an SVC encoder.

FIG. 20 depicts a network layer diagram of a cloud or edge-based service model with an SVC encoder. SVC divides a video frame into layers, and each layer has a unique SID and TID. A video layer may also be fragmented into smaller packets. The SVC encoder marks the SID and TID in an RTP header of a packet. For example, transport layers, Internet layers, convergence layers, and network access layers can be performed by an operating system (OS) or kernel executing on a network device.

GMA protocol can be used to manage traffic steering, splitting, and duplicating across multiple connections and per-packet priority marking. GMA protocol can be used to determine packet priority based on the SID and/or TID from the RTP header, and store packet priority in a GMA header. GMA sends encapsulated IP packets to a target network and an underlying access network (e.g., LTE, Wi-Fi, etc.) manages traffic based on the priority value in the GMA header. An access network can include LTE, 5G, Wi-Fi, DSL, and/or other networks. In some examples, an access network supports per-packet priority-based traffic management (e.g., based on packet priority marking).

In some examples, a transmitter (e.g., MAMS server) can infer the priority of the packet for transmission. The transmitter can save per-packet priority for the transmitted packet until the packet is acknowledged. The receiver (e.g., MAMS client) can send ACK batches to the transmitter. The transmitter computes per-priority packet loss based on ACKs. The transmitter can also delete the saved per-packet priority for acknowledged packets. The transmitter computes the weighed loss ratio based on the per-priority loss and weights.

In some examples, a receiver (e.g., MAMS client) can determine the priority of the packet for transmission. The transmitter (e.g., MAMS server) can determine the priority of the packet for transmission. The transmitter can include fields in the RTP header: per-packet priority and per-priority sequence number fields. The receiver can compute the per-priority packet loss ratio on the RTP header fields. The receiver can compute the weighted loss ratio based on per-priority loss and weights. The receiver feedbacks the weighted loss to the transmitter periodically, e.g., after 100 ms or other interval.

An SVC encoder application can mark the SID and TID in the RTP header based on the video spatial and temporal layer ID. NADA can be used by a network device (e.g., router, access point, base station, switch, network interface device, and other devices) to determine per-packet priority based on the SID and TID. The GMA protocol layer can determine and mark per-packet priority based on the SID and TID. The network devices in the network can manage traffic based on per-packet priority. For example, priority marking rules for SVC can include: (1) priority=TID+SID× TL, or (2) priority*=TID×SL+SID, where the SL and TL stands for the number for spatial and temporal layers. The following table shows an example of the priority marking for a TID=3 and SID=3. The marking rule in the third row prefers higher frame rates, and the fourth row prioritizes video resolution.

TABLE 1

Priority marking policies based on SID and TID.

| | SID | | | | | | | | |
|---|---|---|---|---|---|---|---|---|---|
| | 0 | | | 1 | | | 2 | | |
| TID | 0 | 1 | 2 | 0 | 1 | 2 | 0 | 1 | 2 |
| Priority (high frame rate) | 0 | 1 | 2 | 3 | 4 | 5 | 6 | 7 | 8 |
| Priority* (high resolution) | 0 | 3 | 6 | 1 | 4 | 7 | 2 | 5 | 8 |

The GMA protocol layer can select one of the above priority marking rules to mark per-packet priority. In cases where NADA is utilized for congestion control, NADA can handle S0T0 layer as highest priority, the S2T2 layer as lowest priority, and the middle layers as a same middle priority level. In some examples, NADA may compare loss distribution for priority marking rules and select a priority marking rule based on the rule that yields higher priority producing fewer packet losses.

The transport layer can derive per-packet priority based on content of RPT header. If an application supports per-packet priority (PPP) marking, PPP can be determined from the marking in the payload and applied using NADA. However, if an application does not mark the PPP in the payload, GMA can add PPP to a GMA header and NADA may derive PPP based on predefined marking rules based at least on packet priority marking, described herein.

Some congestion control algorithms consider the packet loss ratio as a congestion signal, where the congestion signal affects the sender's control of transmission rate of a flow. The sender can reduce sending rate under heavy congestion conditions. For example, NADA combines delay and loss to compute an aggregated congestion signal:

$$x_{curr} = \tilde{d} + DMARK \times \left(\frac{p\_mark}{PMREF}\right)^2 + DLOSS \times \left(\frac{p\_loss}{PLRREF}\right)^2,$$

where the first two components are delay-based signals, and the last component is a loss-based signal. PLRREF (default=0.01) is the reference packet loss ratio. DLOSS (default=10 ms) represent the reference delay penalty for loss when the packet loss ratio is at PLRREF. p_loss represents estimated packet loss ratio. As described herein, congestion signal can be computed using a weighted packet loss ratio (p_loss*/PLRREF) in place of (p_loss/PLRREF).

Some examples can apply weighted packet loss for a high-priority region. A high-priority region [0, L] can be defined, where L is the priority threshold. The p_loss* can represent packet loss ratio of high-priority traffic. Table 2A shows an example of packet loss without the per-packet priority. As packet loss is random, the weighted packet loss ratio of the high-priority traffic (0.014) equals the packet loss ratio computed from all packets (0.014). Table 2B shows that fewer high-priority packets are dropped after applying per-packet priority traffic control. The weighted packet loss ratio of high-priority traffic (0.003) is much smaller than the loss ratio computed from all priorities (0.014).

TABLE 2

Packet loss measurement example

| Priority Region (L = 1) | High | | Low | | |
|---|---|---|---|---|---|
| Priority | 0 | 1 | 2 | 3 | All |
| A: without per-packet priority | | | | | |
| Loss Count | 14 | 28 | 42 | 56 | 140 |
| Packet Count | 1000 | 2000 | 3000 | 4000 | 10000 |
| Packet Loss Ratio | 0.014 | | 0.014 | | 0.014 |
| B: with per-packet priority | | | | | |
| Loss Count | 2 | 8 | 30 | 100 | 140 |
| Packet Count | 1000 | 2000 | 3000 | 4000 | 10000 |
| Packet Loss Ratio | 0.003 | | 0.0186 | | 0.014 |

Loss (e.g., packet not received by receiver) is more concentrated in low priority packets using per-packet priority. The examples of Table 2 show that the weighted packet loss adapts to the networks with or without per-packet priority support. Weighted packet loss can be reduced if per-packet priority is supported. Consequently, the sender observes lighter congestion (for high-priority traffic) and may not reduce packet transmission rate.

Weighted priority can be based on per-priority packet loss ratio. For example, NADA can compute the per-priority packet loss count based on packet sequence number and calculate per-priority loss ratio $P_i$ as the loss count of priority i divided by the total packet for priority i. NADA can sum over the $P_i$ with a configurable weight vector $W_i$:$p_{loss}$*=$\Sigma_i W_i P_i$, where the weight vector satisfies $\Sigma_i W_i$=1. Same as in the previous section, Table 3A shows an example of packet loss without per-packet priority. The weighted packet loss ratio can be computed as 0.014×(0.7+0.25+0.4+0.1)=0.014. For Table 3B the weighted loss ratio p_loss*=0.002×0.7+0.004×0.25+0.01×0.04+0.025× 0.01=0.003, which is much smaller than the original packet loss ratio 0.014. Again, the weighted packet loss adapts to the networks with or without the per-packet priority support. Loss (packet not received by receiver) is more concentrated in low priority packets (priority 3) using per-packet priority.

TABLE 3

| Priority | Packet loss measurement | | | | |
| | 0 | 1 | 2 | 3 | all |
|---|---|---|---|---|---|
| A: without per-packet priority | | | | | |
| Loss Count | 14 | 28 | 42 | 56 | 140 |
| Packet Count | 1000 | 2000 | 3000 | 4000 | 10000 |
| $P_i$ | 0.014 | 0.014 | 0.014 | 0.014 | 0.014 |
| $W_i$ | 0.70 | 0.25 | 0.04 | 0.01 | |
| B: with per-packet priority | | | | | |
| Loss Count | 2 | 8 | 30 | 100 | 140 |
| Packet Count | 1000 | 2000 | 3000 | 4000 | 10000 |
| $P_i$ | 0.002 | 0.004 | 0.01 | 0.025 | 0.014 |
| $W_i$ | 0.70 | 0.25 | 0.04 | 0.01 | |

Various examples can apply congestion control use per-packet priority for bandwidth probing. If the sending rate is application-limited (e.g., a video streaming application sending with max bit rate that deliveries the highest video quality), congestion control schemes may cause duplication of packets or insert redundant packets by applying network coding. These packets can be marked as low priority. When congestion occurs, the underlying network drops the low-priority packets first, and does not affect the original data.

Various examples detect whether an infrastructure supports per-packet priority. For example, for P number of priority levels for the traffic (e.g., P=8). A high-priority region [0, L] can be defined such that the high-priority traffic volume is almost half of the total traffic. In some examples, L=0 if high-priority packets are enough to deliver critical information. The receiver can measure the loss ratio of high-priority packets (p_h_loss) and the loss ratio of all packets (p_loss). If the per-packet priority is not supported, packet drops are random and p_h_loss and p_loss are approximately equal. However, if per-packet priority is active, p_h_loss can be smaller than p_loss.

Figure 21:
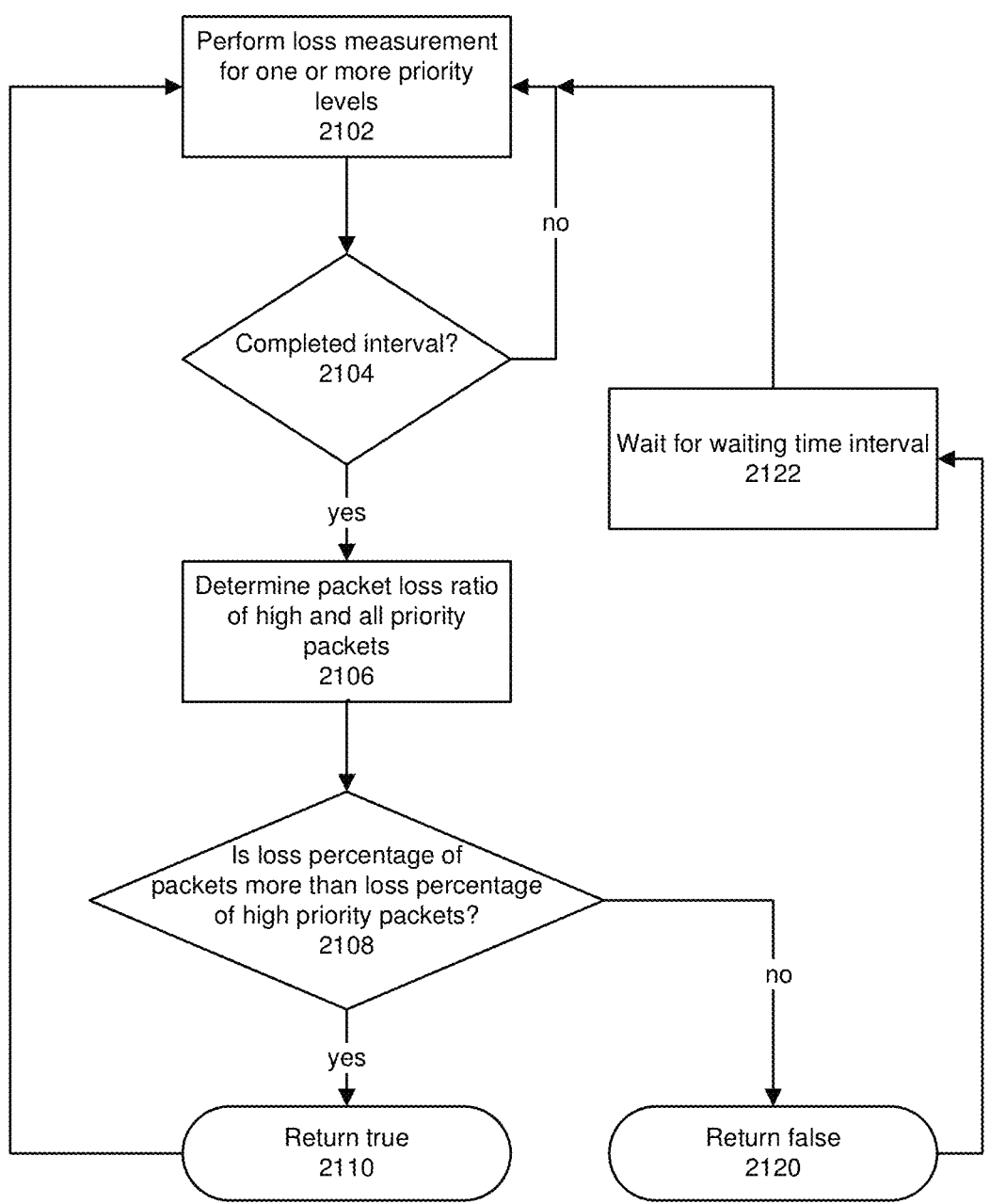
FIG. 21 depicts a process for per-packet priority AQM detection.

FIG. 21 depicts a process for detection of use of per-packet priority AQM. The process can be performed by a network device for a packet queue. At 2102-2106, a loss percentage for high and low priority packets can be measured in an interval. Parameter p_h_loss can represent a loss ratio of high-priority packets over a time interval. Parameter p_loss can represent a packet loss ratio of packets of all priorities over a time interval. For example, p_h_loss and p_loss can be measured in a last time interval U. U can represent a measurement interval for packet loss (e.g., 1 second or other interval). While two priority levels are described, more than two priority levels can be utilized and packet loss percentages for more than two priority levels can be determined.

At 2108, a determination can be made of a loss percentage of packets (including all priorities) stored in a queue relative to a multiple of percentage of high priority packets. For example, operation 2108 can determine if p_loss>S× p_h_loss, where parameter S can represent a configurable scalar for comparing loss ratio (e.g., 2 or other multiple). Based on a loss percentage of all packets (including all priorities) exceeding a multiple of percentage of high priority packets, the flow can be identified as being transmitted over a network that supports priority-based traffic control and the process can proceed to 2110 to mark the flow as being transmitted through a network that utilizes priority-based traffic control. For example, a value of true can be assigned to a flow that priority-based traffic control is supported and the process can return to 2102.

Based on a loss percentage of all packets not meeting or not exceeding a multiple of percentage of high priority packets, the process can identify the flow is not transmitted using a network that applies priority-based traffic control. For example, in 2120, a value of false can be assigned to a flow that priority-based traffic control is supported by the underlying network. The process can continue to 2122, where an interval of a waiting time is monitored. For example, a waiting time W before the next measurement, e.g., 1 min, can be determined to be elapsed before proceeding to 2102 to avoid excessive testing of whether a network supports priority-based traffic control.

Various examples can be applied as an enhancement for the (legacy) loss event-based algorithms, such as CUBIC (e.g., I. Rhee et al., "CUBIC for Fast Long-Distance Networks," RFC 8312 (February 2018).

Various examples provide a manner to compute or determine congestion level of a network. A congestion level can be represented by a number within [0, 1], where 0 stands for no congestion and 1 stands for heavy congestion. After the transmitter receives the Acknowledgement or Selective Acknowledgement of the received packets from the receiver, the transmitter computes the packet loss. Transmitter can compute congestion level based on the priority of the lost packet (i_loss) and traffic volume. If the transmitter detects multiple packet losses in one feedback, transmitter uses the highest priority value of the lost packets (min(i_loss)), where smaller i_loss value stands for higher priority. Finally, transmitter computes the congestion level X as follows:

$$X = \sum_{i=min(i\_loss)}^{i=P-1} V_i,$$

where $V_i$ is the traffic volume ratio of priority i.
Table 4 provides an example of congestion level calculation.

TABLE 4

| Congestion level calculation | | | | |
| Priority | 0 | 1 | 2 | 3 |
|---|---|---|---|---|
| Traffic Volume (%) | 20% | 25% | 15% | 40% |
| Congestion Level | 1.0 | 0.8 | 0.55 | 0.4 |

A transmitter can compute congestion level after receiving receiver feedback of received packets. For example, congestion level can be based on packet loss. If packet loss equals zero, congestion level equals zero. If min(i_loss)=3, light congestion is detected and the congestion level $V_3$=0.4. If multiple packets are lost and min(i_loss)=1, this packet loss impacts priority 1, 2, and 3. Therefore, the congestion level equals $V_1$+$V_2$+$V_3$=0.8.

The transmitter can reduce packet transmission rate after detecting packet losses. The rate can be reduced to the current rate multiplied by a multiplicative decrease factor β to provide dynamic multiplicative decrease based on congestion level.

For example, CUBIC sets β as 0.7, and New Reno sets β as 0.5. Dynamic $β_x$ can be based on β and the congestion level X: $β_x$=1−(1−β)×X. Table 5 shows an example where β is set to 0.7 (fourth row) and 0.5 (fifth row). In the fourth row, if min(i_loss)=3, the affected traffic volume ratio and congestion level equals 0.4. So the dynamic $β_x$=1−0.3× 0.4=0.88. If min(i_loss)=3 and X=1.0, the dynamic $β_x$ can be computed as 1−0.3×1=0.7.

TABLE 5

| Dynamic multiplicative decrease factor calculation | | | | |
|---|---|---|---|---|
| Min Priority of Loss | 0 | 1 | 2 | 3 |
| Traffic Volume (%) | 20% | 25% | 15% | 40% |
| Congestion Level | 1.0 | 0.8 | 0.55 | 0.4 |
| Dynamic Decrease factor (default = 0.7) | 1 − 0.3 = 0.7 | 1 − 0.3 × 0.8 = 0.76 | 1 − 0.3 × 0.55 = 0.835 | 1 − 0.3 × 0.4 = 0.88 |
| Dynamic Decrease factor (default = 0.5) | 1 − 0.5 = 0.5 | 1 − 0.5 × 0.8 = 0.6 | 1 − 0.5 × 0.55 = 0.725 | 1 − 0.5 × 0.4 = 0.8 |

TCP Cubic uses a scaling constant C, default=0.4, to control the speed of sending rate increment. A large C ramps up, sending rate faster after packet losses. If Cubic detects that the per-packet priority is active, it may switch to a more aggressive sending mode by increasing C to provide a dynamic scaling factor for bandwidth increase. For other Additive increase/multiplicative decrease (AIMD) algorithms, such as New Reno, modified behaviors can be summarized as described in Table 6.

TABLE 6

| Modified Behaviors for CUBIC and AIMD (such as New Reno), where X is the congestion signal and Q is a configurable parameter (e.g., 1.5) | | | | |
|---|---|---|---|---|
| | Per-Packet Priority | | | |
| | Active | | Not Active | |
| Algorithms | Cubic | AIMD | Cubic | AIMD |
| Bandwidth Decrease | βx = 1 − 0.3 × X | βx = 1 − 0.5 × X | β = 0.7 | β = 0.5 |
| Bandwidth Increase | C = 0.4 × Q | Q packet per RTT | C = 0.4 | 1 packet per RTT |

Per-Packet Priority (PPP) Active Queue Management (AQM)

Figure 22A:
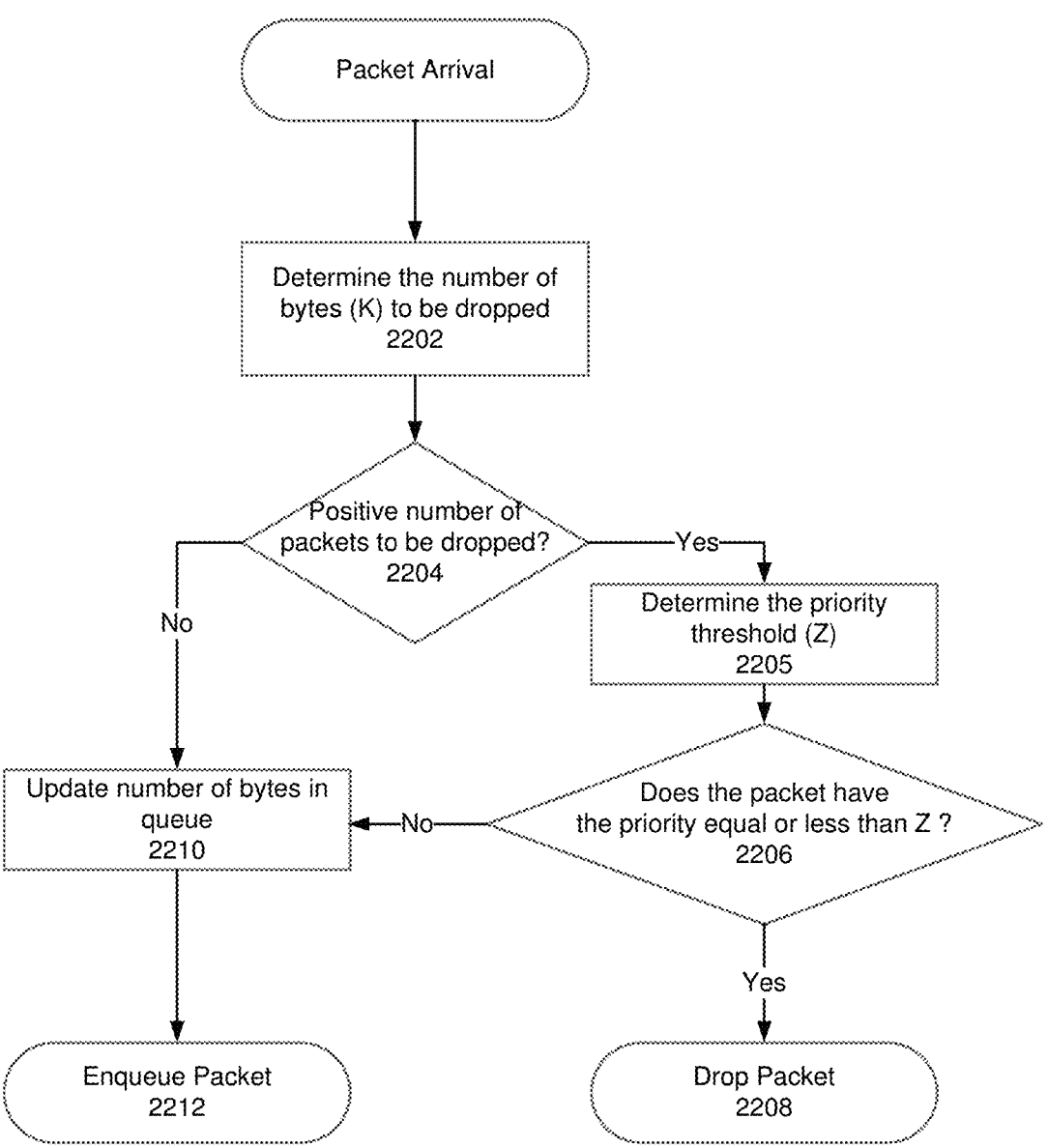
FIGS. 22A and 22B depict examples of per-packet process (PPP) AQM processes that can be performed.
Figure 22B:
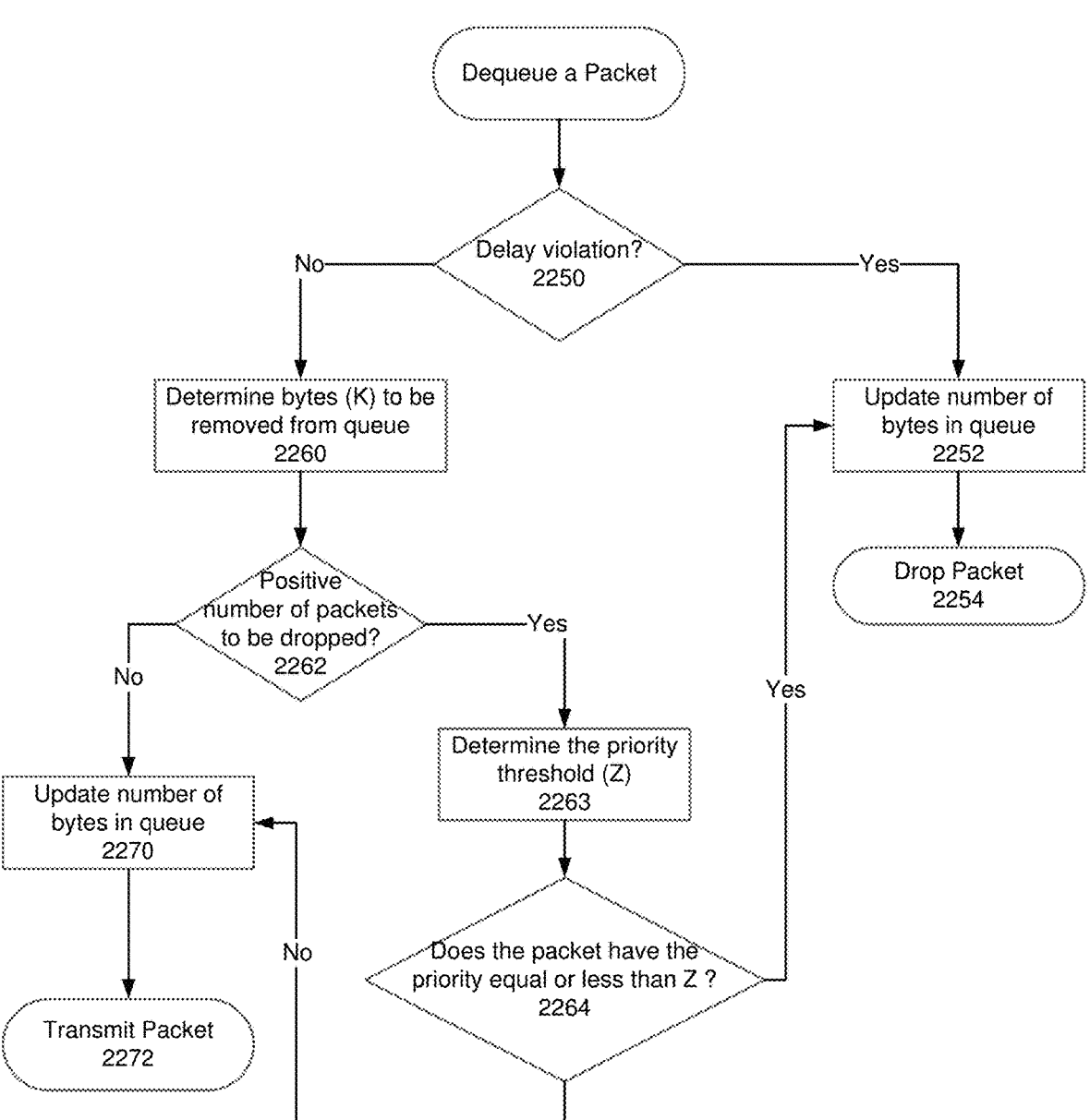

FIGS. 22A and 22B depict examples of per-packet process (PPP) AQM processes that can be performed. FIG. 22A shows a process that can be performed at packet ingress whereas FIG. 22B shows a process that can be performed at packet egress. The processes of FIGS. 22A and 22B can be performed at least by the system, described with respect to FIG. 14, or a network device (e.g., router, access point, base station, switch, network interface device, and other devices).

Variable T can represent packet queuing delay bound (deadline). For example, if D>T, the dequeued packet can be dropped. f(D, T, Q) can represent a configurable/adaptive function that computes the predicted number of bytes to be dropped from the queue (K). For example, $$f(D, T, Q) = Q \times \left( \beta \frac{D}{T} - \alpha \right),$$

where β and α are configurable parameters (by default β=1 and α=0.3). In another example, $$f(D, T, Q) = Q \times \left( \frac{D}{T} \right)^\lambda,$$

where λ is a configurable parameter (by default Δ=3). D can represent queuing delay of a dequeued packet, which could be the delay of current AQM entity or network device or accumulated delay in multi-hop scenario. T can represent per-packet delay bound. In some examples, an application can set T=0 as a default if the delay limit is disabled. If T equals zero or is greater than the AQM entity or network device's queuing delay bound T_DEV, then T=T_DEV. Q can represent a queue length (in bytes) and can include the received packet that is to be inserted to the end of the queue.

Referring to FIG. 22A, upon enqueuing a received packet with priority P (e.g., after a packet arrival), the ingress (enqueuing) process begins by determining and/or setting a number of bytes to be dropped from a queue. However, in some examples, dropping of ingress packets is not performed. For example, at 2202, K=f(T2−T1,T,Q) can be determined. As D is not measured at the enqueue process, the measure T2-T1 can be used as the waiting time of the first (front) packet in the queue. T1 can represent an arrival timestamp of the first (front) packet in the queue and T2 can represent a current time.

At 2204, a determination can be made as to whether the number of bytes to be dropped is positive. A number of bytes of packets per priority level in a queue can be examined to determine a number of bytes per priority level. Based on a number of bytes of packets per priority level in a queue being positive (e.g., K>0), the process can proceed to 2205. At 2205, a priority threshold Z can be determined. Assuming K bytes are dropped starting with low priority and proceeding to high priority (if not all K bytes are dropped), Z can represent a highest priority of packets to be dropped based on K bytes determined to be dropped or the lowest priority of the remaining packets after dropping K bytes. At 2206, a determination can be made to whether the new arrival packet has an equal or lower priority than Z. For example, at 2206, a determination can be made as to whether $$\left( \sum_{i=0}^{i=P} x(i) > Q - K \right).$$

Based on this ingress packet's priority P is lower than or equal to Z, the process can proceed to 2208, where the packet can be marked to be dropped. P can represent a priority value within the range of [0,L−1] and a smaller P represents a higher priority. L can represent a number of priority levels (e.g., 8 or other number). In some examples, the PPP value may correspond to a value of P. An attempt to drop lowest priority packets can be made regardless of packet position in a queue.

At 2206, based on the packet having a higher priority than the threshold Z, the process can proceed to 2210. At 2210, a number of bytes in the queue can be updated to reflect the addition of the received packet. For example, x(P)=x(P)+S and Q=Q+S. At 2212, the packet is inserted into the queue. S can represent a packet size (bytes) of the received packet. x(i) can represent a number of queued bytes with priority P=i (i=0, . . . , or L−1).

Referring to FIG. 22B, at 2250, a determination of whether a delay violation has occurred for a packet to be dequeued from a queue next. A delay violation can indicate an amount of time D that the packet was stored in a queue and whether D violates an enqueue time bound, T. For example, a determination can be made if D>T. Based on a delay violation occurring, the process can proceed to 2252. At 2252, a number of bytes in the queue can be updated to reflect that the packet to be dequeued is to be dropped. For example, x(P)=x(P)−S and Q=Q−S, where x(i) can represent a number of queued bytes with priority P=i (i=0, . . . , or L−1), Q can represent a queue length (in bytes), and S can represent a packet size (bytes) of the packet to be dequeued. At 2254, the packet can be marked to be dropped.

Based on a delay violation not occurring, the process can proceed to 2260. At 2260, a predicted number of bytes to be removed from the queue can be determined. For example, at 2260, a determination can be made of K=f(D, T, Q). At 2262, a determination can be made as to whether the number of bytes to be dropped is positive. Based on a positive number of bytes are to be removed from the queue, at 2263, a priority threshold Z can be determined for K bytes being dropped from low to high priority and Z representing a highest priority of dropped packets or the lowest priority of the remaining packets after dropping K bytes. For example, at 2264, a determination can be made as to whether $$\left( \sum\nolimits_{i=0}^{i=P} x(i) > Q - K \right).$$

Based on this egress packet's priority P is lower or equal to Z, the process can proceed to 2252.

Based on the packet priority being higher than threshold Z, the process can proceed to 2270. At 2270, a number of bytes in the queue can be updated to reflect that the packet to be dequeued is to be dropped. For example, x(P) can be set to x(P)−S and Q can be set to Q−S, where x(i) can represent a number of queued bytes with priority P=i (i=0, . . . , or L−1), Q can represent a queue length (in bytes), and S can represent a packet size (bytes) of the packet to be dequeued. At 2272, the packet can be selected for transmission.

Figure 23:
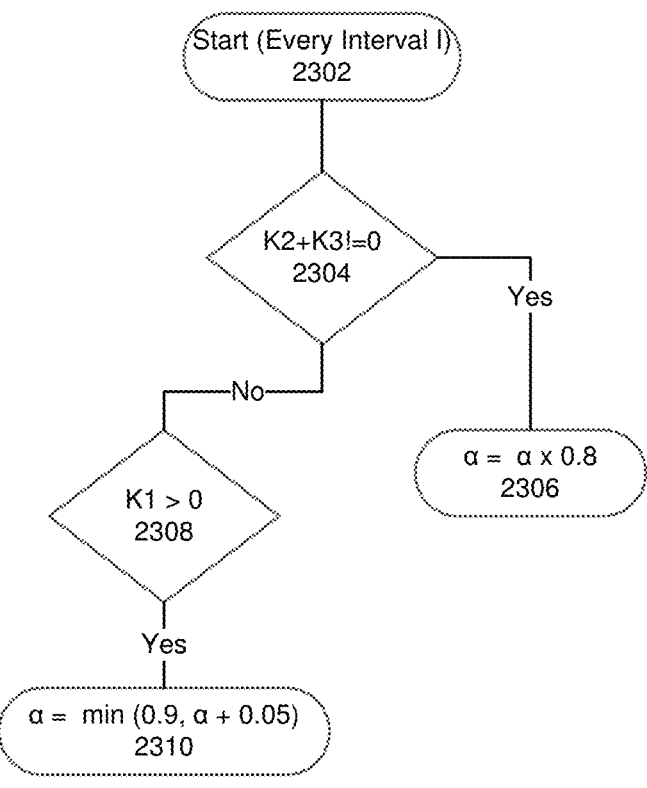
FIG. 23 depicts an example process for adapting a control parameter.

FIG. 23 depicts an example process for adapting control parameter a that can be used to determine a ratio of a number of bytes to remove from a queue. Here, the control parameter "a" controls how aggressively the PPP AQM algorithm is to drop low-priority packets proactively to mitigate congestion. In some implementations, the control parameter a is configured to have a value in the range of [0, 1]. In some cases, if the control parameter a is set too high, a sufficient amount of low-priority packets may not be proactively dropped leading to loss of high-priority packets due to delay violation. On the other hand, if the control parameter a is set to low, too many low-priority packets may be unnecessarily dropped. The process of FIG. 23 is to adaptively adjust the control parameter a to avoid setting the control parameter a too high or too low.

A flow (e.g., individual queue) can be associated with a drop prediction function shown by f(D,T,Q)=Q×(β D/T−α), where β is fixed (e.g., (3=1) and a will be adjusted dynamically according to the adaptive process of FIG. 23.

Prior to, or during the adaptive process, the following state variables are maintained: I is a time interval (e.g., 1=100 milliseconds (ms)); K1 is the total number of early dropped packets in last interval I (e.g., dropped packets did not violate delay deadline (e.g., D≤T)); K2 is the total number of dropped packets due to delay violation in last interval I (e.g., dropped packets violate delay deadline (e.g., D>T)); and K3 is the total number of delivered packets with high delay in last interval I (e.g., delivered packets with high delay (e.g., D>0.5×T)).

The adaptive process may operate as follows. First, the control parameter a can be initialized as α=0 at the beginning. At 2302, for an Interval I, if K2+K3>0 (2304), then more packets can be dropped proactively to mitigate congestion such as by setting α=α×0.8 (2306). Else there is little to no congestion (e.g., if K2+K3<0), and if K1>0 (2308), then reduce packet loss due to unnecessary early drop such as by setting α=min (0.9, α+0.05) (2310) which slowly reduces packet drops. Various values to adjust a are exemplary and other values can be used.

Some AQMs proposed drop probability-based algorithms. For example, at enqueue process, random early detection (RED) randomly drops packets based on probability p_RED (see e.g., Random early detection [RED]). Since the probability-based packet drop is random, it does not consider the priorities of packets.

Existing drop probability-based algorithms can be converted to PPP AQM. Examples of the existing drop probability-based algorithms include RED (see e.g., [RED]), Adaptive RED (ARED) (see e.g., Floyd et al., Adaptive RED: An Algorithm for Increasing the Robustness of RED's Active Queue Management, Technical Report, ACIRI, pages 518-522 (2001), http://www.icir.org/floyd/papers/adaptiveRed.pdf ("[ARED]") and Feng et al., A Self-Configuring RED Gateway, CONFERENCE ON COMPUTER COMMUNICATIONS, EIGHTEENTH ANNUAL JOINT CONFERENCE OF THE IEEE COMPUTER AND COMMUNICATIONS SOCIETIES. THE FUTURE IS NOW (IEEE INFOCOM '99) (Cat. No.99CH36320), vol. 3, pages 1320-1328 (21 Mar. 1999), https://ieeexplore.ieee.org/document/752150 ("[Feng]")), Nonlinear RED (NLRED) (see e.g., Kaiyu Zhou et al., Nonlinear RED: A simple yet efficient active queue management scheme, COMPUTER NETWORKS, vol. 50, issue 18, pages 3784-3794 (21 Dec. 2006), http://www.sciencedirect.com/science/article/pii/S1389128606000879 ("[NLRED]")), BLUE (see e.g., Feng et al., BLUE: A New Class of Active Queue Management Algorithms, Technical Report, UM CSE-TR-387-99, (April 1999), http://www.eecs.umich.edu/techreports/cse/99/CSE-TR-387-99.pdf ("[BLUE]")), PIE (see e.g., Pan et al., PIE: A Lightweight Control Scheme To Address the Bufferbloat Problem, IETF RFC 8033 (February 2017), https://datatracker.ietf.org/doc/html/rfc8033 ("[RFC8033]")), and/or variants thereof.

Figure 24:
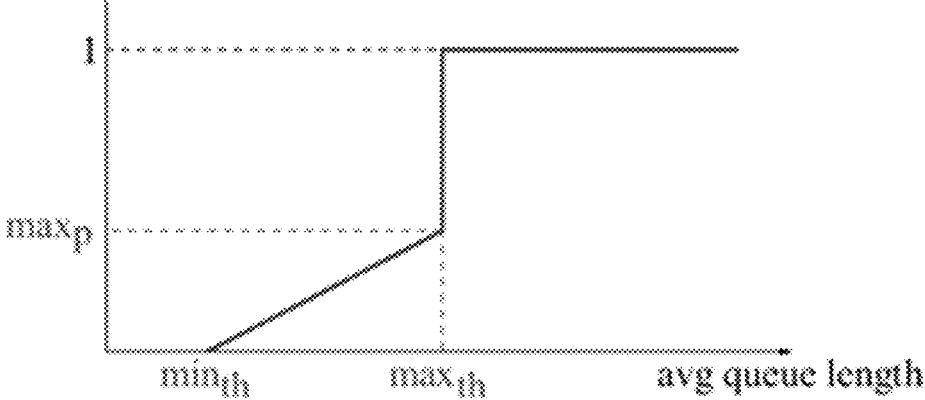
FIG. 24 depicts an example of PPP AQM conversion.

FIG. 24 depicts an example of PPP AQM conversion. The operations can be performed by a network device. In operation 1, the AQM' s drop probability $P_{AQM}$ can be determined. For example, drop probability for RED can be applied as follows:

if Q>max$_{th,PRED}$ (Q)=1, //if queue size Q is greater than max queue size (max$_{th}$), drop probability equals 1

$$\text{else } p_{RED}(Q) = \max\left(0, \max_P \times \frac{Q - \min_{th}}{\max_{th} - \min_{th}}\right),$$

where max$_p$ is the maximum drop probability, min$_{th}$ and max$_{th}$ are configurable parameters.

In operation 2, compute the dropped bytes function $f$(D, T, Q)=P$_{AQM}$×Q.

In operation 3, the packet can be processed using ingress/egress process (described with respect to FIGS. 22A and 22B) using the $f$(D, T, Q) function in operation 2. In an example, if the AQM algorithm computes a drop probability=0.1, and current queue size is 10 KB, the dropped bytes function $f$(D, T, Q) returns a value of 0.1×10 KB=1 KB. Hence, instead of randomly dropping 10% of the packets at ingress process, the priority-based drop process drops 10% of the packets in the queue with the lowest priorities.

In some examples, packets with highest priority (P=0) are not dropped. In this case, the PPP AQM can transmit the packet with P=0 and the drop policy can apply to packets with P>0.

Example Process

FIG. 25 depicts an example process. The process can be performed by a network device. Various examples of network devices are described herein. At 2502, Integrated Access Backhaul (IAB) traffic transmitted using a first network can be, in addition, or alternatively, transmitted using a second network. At 2502, for example, traffic for IAB transmitted via a 3rd Generation Partnership Project (3GPP)-consistent wireless network can be, in addition, or alternatively, transmitted using Multi Access Management Services (MAMS) over Generic Multi-Access (GMA) over the second network. The MAMS over GMA for the wireless network and the second network can utilize one or more of: IP virtual connection, GTP-U virtual connection, or F1-AP virtual connection. For example, one or more of 2504 or 2506 can be performed for 2502. In some examples, before transmission of the IAB traffic using the second network, at 2504, the second network can be tested using one or more probe packets to determine if QoS for the IAB traffic can be met. The one or more probe packets can be assigned a low priority. In some examples, transmission using the second network can occur using a relay device. For example, at 2506, the relay device can provide a relay between a first device (e.g., GMA client) and a second device (e.g., GMA server). Various examples of discovery of the relay device are described herein.

At 2510, congestion management can be performed at the network device. For example, a network device can determine whether to drop a packet, reduce a size of a queue, and/or indicate occurrence of congestion to a sender. For example, one or more of 2512, 2514, or 2516 can be performed for 2510. For example, at 2512, one or more packets can be dropped based on sharing a group identifier and/or being a lower priority than at least one other packet that was dropped. For example, at 2514, data can be dropped from a FIFO queue to reduce a number of higher priority data from being dropped from the FIFO queue. For example, at 2516, utilization of a congestion control scheme can weigh higher priority packet drops more heavily in determining to signal congestion to one or more sender device. For example, a congestion control scheme can include NADA, CUBIC, or others.

Example System

Figure 26:
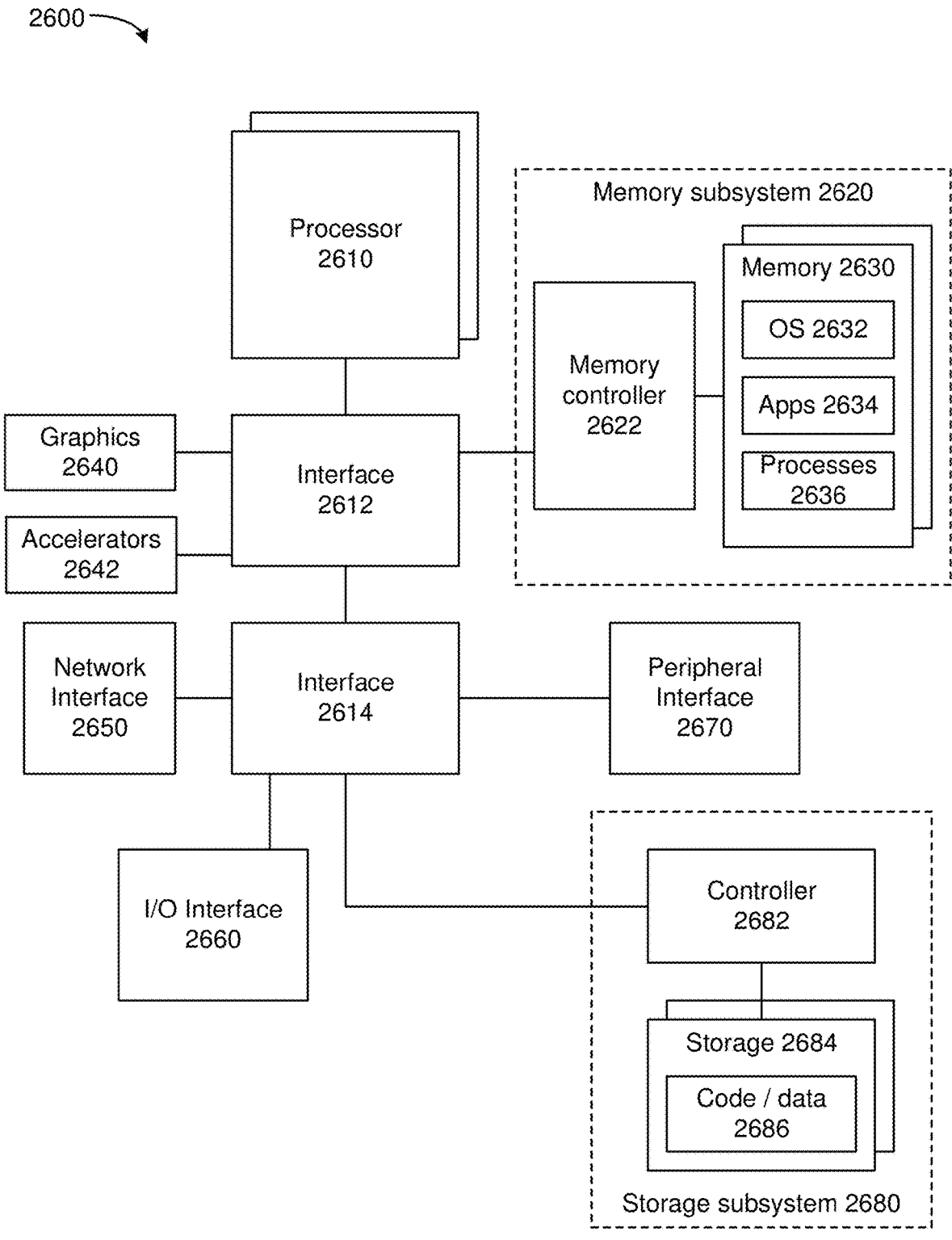
FIG. 26 depicts an example system.

FIG. 26 depicts an example system. Components of system 2600 (e.g., processor 2610, accelerators 2642, network interface 2650, memory 2630, storage 2684, and so forth) can be configured to transmit IAB traffic using one or more networks (e.g., relay device), test QoS of another network, or perform congestion management and congestion signaling, as described herein. System 2600 includes processor 2610, which provides processing, operation management, and execution of instructions for system 2600. Processor 2610 can include any type of microprocessor, central processing unit (CPU), graphics processing unit (GPU), processing core, or other processing hardware to provide processing for system 2600, or a combination of processors. Processor 2610 controls the overall operation of system 2600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2600 includes interface 2612 coupled to processor 2610, which can represent a higher speed interface or a high throughput interface for system components that needs higher bandwidth connections, such as memory subsystem 2620 or graphics interface components 2640, or accelerators 2642. Interface 2612 represents an interface circuit, which can be a standalone component or integrated onto a processor die. Where present, graphics interface 2640 interfaces to graphics components for providing a visual display to a user of system 2600.

Accelerators 2642 can be a fixed function or programmable offload engine that can be accessed or used by a processor 2610. For example, an accelerator among accelerators 2642 can provide compression (DC) capability, cryptography services such as public key encryption (PKE), cipher, hash/authentication capabilities, decryption, or other capabilities or services. In some cases, accelerators 2642 can be integrated into a CPU socket (e.g., a connector to a motherboard or circuit board that includes a CPU and provides an electrical interface with the CPU). For example, accelerators 2642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 2642 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2620 represents the main memory of system 2600 and provides storage for code to be executed by processor 2610, or data values to be used in executing a routine. Memory subsystem 2620 can include one or more memory devices 2630 such as read-only memory (ROM), flash memory, one or more varieties of random access memory (RAM) such as DRAM, or other memory devices, or a combination of such devices. Memory 2630 stores and hosts, among other things, operating system (OS) 2632 to provide a software platform for execution of instructions in system 2600. Additionally, applications 2634 can execute on the software platform of OS 2632 from memory 2630. Applications 2634 represent programs that have their own operational logic to perform execution of one or more functions. Processes 2636 represent agents or routines that provide auxiliary functions to OS 2632 or one or more applications 2634 or a combination. OS 2632, applications 2634, and processes 2636 provide software logic to provide functions for system 2600. In one example, memory subsystem 2620 includes memory controller 2622, which is a memory controller to generate and issue commands to memory 2630. It will be understood that memory controller 2622 could be a physical part of processor 2610 or a physical part of interface 2612. For example, memory controller 2622 can be an integrated memory controller, integrated onto a circuit with processor 2610.

While not specifically illustrated, it will be understood that system 2600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 2600 includes interface 2614, which can be coupled to interface 2612. In one example, interface 2614 represents an interface circuit, which can include standalone components and integrated circuitry. In one example, multiple user interface components or peripheral components, or both, couple to interface 2614. Network interface 2650 provides system 2600 the ability to communicate with remote devices (e.g., servers or other computing devices) over one or more networks. Network interface 2650 can include an Ethernet adapter, wireless interconnection components, cellular network interconnection components, USB (universal serial bus), or other wired or wireless standards-based or proprietary interfaces. Network interface 2650 can transmit data to a device that is in the same data center or rack or a remote device, which can include sending data stored in memory.

Network interface 2650 can include one or more of: a network interface controller (NIC), a remote direct memory access (RDMA)-enabled NIC, SmartNIC, router, switch, or network-attached appliance. Some examples of network interface 2650 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU.

For example, network interface 2650 can include Media Access Control (MAC) circuitry, a reconciliation sublayer circuitry, and physical layer interface (PHY) circuitry. The PHY circuitry can include a physical medium attachment (PMA) sublayer circuitry, Physical Medium Dependent (PMD) circuitry, a forward error correction (FEC) circuitry, and a physical coding sublayer (PCS) circuitry. In some examples, the PHY can provide an interface that includes or use a serializer de-serializer (SerDes). In some examples, at least where network interface 2650 is a router or switch, the router or switch can include interface circuitry that includes a SerDes. Various examples of network interface 2650 can transmit IAB traffic using one or more networks (e.g., relay device), test QoS of another network, or perform congestion management and congestion signaling.

In one example, system 2600 includes one or more input/output (I/O) interface(s) 2660. I/O interface 2660 can include one or more interface components through which a user interacts with system 2600 (e.g., audio, alphanumeric, tactile/touch, or other interfacing). Peripheral interface 2670 can include any hardware interface not specifically mentioned above. Peripherals refer generally to devices that connect dependently to system 2600. A dependent connection is one where system 2600 provides the software platform or hardware platform or both on which the operation executes, and with which a user interacts.

In one example, system 2600 includes storage subsystem 2680 to store data in a nonvolatile manner. In one example, in certain system implementations, at least certain components of storage 2680 can overlap with components of memory subsystem 2620. Storage subsystem 2680 includes storage device(s) 2684, which can be or include any conventional medium for storing large amounts of data in a nonvolatile manner, such as one or more magnetic, solid state, or optical based disks, or a combination. A volatile memory is memory whose state (and therefore the data stored in it) is indeterminate if power is interrupted to the device. A non-volatile memory (NVM) device is a memory whose state is determinate even if power is interrupted to the device. Storage 2684 holds code or instructions and data 2686 in a persistent state (e.g., the value is retained despite interruption of power to system 2600). Storage 2684 can be generically considered to be a "memory," although memory 2630 is typically the executing or operating memory to provide instructions to processor 2610. Whereas storage 2684 is nonvolatile, memory 2630 can include volatile memory (e.g., the value or state of the data is indeterminate if power is interrupted to system 2600). In one example, storage subsystem 2680 includes controller 2682 to interface with storage 2684. In one example controller 2682 is a physical part of interface 2614 or processor 2610 or can include circuits or logic in both processor 2610 and interface 2614.

In an example, system 2600 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), Universal Chiplet Interconnect Express (UCIe), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) (e.g., NVMe-oF specification, version 1.0 (2016) as well as variations, extensions, and derivatives thereof) or NVMe (e.g., Non-Volatile Memory Express (NVMe) Specification, revision 1.3c, published on May 24, 2018 ("NVMe specification") as well as variations, extensions, and derivatives thereof).

Communications between devices can take place using a network that provides die-to-die communications; chip-to-chip communications; circuit board-to-circuit board communications; and/or package-to-package communications.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus that includes: a network device comprising: at least one network interface and circuitry to transmit one or more packets for Integrated Access Backhaul (IAB) via a 3rd Generation Partnership Project (3GPP)-consistent wireless network and transmit one or more other packets for IAB to Multi Access Management Services (MAMS) over Generic Multi-Access (GMA) over a second network.

Example 2 includes one or more examples, wherein the MAMS over GMA for the network and the second network are to utilize one or more of: IP virtual connection, GTP-U virtual connection, or F1-AP virtual connection.

Example 3 includes one or more examples, wherein the second network is consistent with one or more of: IEEE 802.11, 3GPP LTE/5G, wireline, or satellite.

Example 4 includes one or more examples, wherein the traffic transmitted over the second network comprises a multi-access (MX) uplink (UL) user-plane (UP) Transport Layer (TNL) information element (IE) for the IAB BAP layer specifies offset from end of UDP field to beginning of GTP-u header field.

Example 5 includes one or more examples, wherein the network device comprise an IAB node or IAB donor node.

Example 6 includes one or more examples, wherein the second network comprises a network whereby a client connects to server through a relay device.

Example 7 includes one or more examples, wherein the circuitry is to: cause transmission of a probe packet on the second network, wherein the probe packet is associated with a low priority, determine a latency and congestion level of the second network based on transmission of the probe packet, and select use of the second network based on the determined latency and congestion.

Example 8 includes one or more examples, wherein the circuitry is to: cause transmission of a duplicated data packet on the second network, wherein the duplicated data packet is associated with a low priority, determine a latency and congestion level of the second network based on transmission of the duplicated data packet, and select use of the second network based on the determined latency and congestion.

Example 9 includes one or more examples, wherein a node within the wireless network and the second network is to: based on a packet drop, drop at least one other packet based on packet group and packet priority.

Example 10 includes one or more examples, wherein a node within the wireless network and the second network is to: proactively drop packets from low to high priorities in first in first out (FIFO) queue based on predicted number of bytes to be dropped.

Example 11 includes one or more examples, wherein a node within the wireless network and the second network is to: apply a loss rate based congestion control technique to consider more heavily dropped high priority packets in performing congestion signaling to a sender.

Example 12 includes one or more examples, and includes a non-transitory computer-readable medium comprising instructions stored thereon, that if executed by one or more processors, cause the one or more processors to: configure a network device to transmit one or more packets for Integrated Access Backhaul (IAB) via a 3rd Generation Partnership Project (3GPP)-consistent wireless network and transmit one or more other packets for IAB to Multi Access Management Services (MAMS) over Generic Multi-Access (GMA) over a second network.

Example 13 includes one or more examples, wherein the MAMS over GMA for the network and the second network are to utilize one or more of: IP virtual connection, GTP-U virtual connection, or F1-AP virtual connection.

Example 14 includes one or more examples, wherein the second network is consistent with one or more of: IEEE 802.11, 3GPP LTE/5G, wireline, or satellite.

Example 15 includes one or more examples, wherein the traffic transmitted over the second network comprises a multi-access (MX) uplink (UL) user-plane (UP) Transport Layer (TNL) information element (IE) for the IAB BAP layer specifies offset from end of UDP field to beginning of GTP-u header field.

Example 16 includes one or more examples, wherein the network device comprise an IAB node or IAB donor node.

Example 17 includes one or more examples, wherein the second network comprises a network whereby a client connects to server through a relay device.

Example 18 includes one or more examples, wherein the network device is to: cause transmission of a probe packet on the second network, wherein the probe packet is associated with a low priority, determine a latency and congestion level of the second network based on transmission of the probe packet, and select use of the second network based on the determined latency and congestion.

Example 19 includes one or more examples, wherein the network device is to: cause transmission of a duplicated data packet on the second network, wherein the duplicated data packet is associated with a low priority, determine a latency and congestion level of the second network based on transmission of the duplicated data packet, and select use of the second network based on the determined latency and congestion.

Example 20 includes one or more examples, wherein a node within the wireless network and the second network is to: based on a packet drop, drop at least one other packet based on packet group and packet priority.

Example 21 includes one or more examples, wherein a node within the wireless network and the second network is to: proactively drop packets from low to high priorities in first in first out (FIFO) queue based on predicted number of bytes to be dropped.

Example 22 includes one or more examples, wherein a node within the wireless network and the second network is to: apply a loss rate based congestion control technique to consider more heavily dropped high priority packets in performing congestion signaling to a sender.

Example 23 includes one or more examples, and includes a method comprising: transmitting one or more packets for Integrated Access Backhaul (IAB) via a 3rd Generation Partnership Project (3GPP)-consistent wireless network and transmit one or more other packets for IAB to Multi Access Management Services (MAMS) over Generic Multi-Access (GMA) over a second network.

Example 24 includes one or more examples, wherein the MAMS over GMA for the network and the second network are to utilize one or more of: IP virtual connection, GTP-U virtual connection, or F1-AP virtual connection.

Example 25 includes one or more examples, wherein the second network is consistent with one or more of: IEEE 802.11, 3GPP LTE/5G, wireline, or satellite.

Example 26 includes one or more examples, wherein the traffic transmitted over the second network comprises a multi-access (MX) uplink (UL) user-plane (UP) Transport Layer (TNL) information element (IE) for the IAB BAP layer specifies offset from end of UDP field to beginning of GTP-u header field.

Example 27 includes one or more examples, wherein the network device comprise an IAB node or IAB donor node.

Example 28 includes one or more examples, wherein the second network comprises a network whereby a client connects to server through a relay device.

Example 29 includes one or more examples, and includes causing transmission of a probe packet on the second network, wherein the probe packet is associated with a low priority, determining a latency and congestion level of the second network based on transmission of the probe packet, and selecting use of the second network based on the determined latency and congestion.

Example 30 includes one or more examples, and includes causing transmission of a duplicated data packet on the second network, wherein the duplicated data packet is associated with a low priority, determining a latency and congestion level of the second network based on transmission of the duplicated data packet, and selecting use of the second network based on the determined latency and congestion.

Example 31 includes one or more examples, wherein a node within the wireless network and the second network is to: based on a packet drop, drop at least one other packet based on packet group and packet priority.

Example 32 includes one or more examples, wherein a node within the wireless network and the second network is to: proactively drop packets from low to high priorities in first in first out (FIFO) queue based on predicted number of bytes to be dropped.

Example 33 includes one or more examples, wherein a node within the wireless network and the second network is to: apply a loss rate based congestion control technique to consider more heavily dropped high priority packets in performing congestion signaling to a sender.

Example 34 includes one or more examples, and includes an apparatus that includes: a network device comprising: at least one network interface and circuitry to transmit packets by multiple hops using frequencies utilized by user equipment (UE) by access to a Third Generation Partnership Project (3GPP)-consistent network to a second network based on selection of network paths in a multi-access (MX) communication environment over a protocol specified to encode control information at a sublayer, wherein the control information includes key, sequence number, and time stamp.

What is claimed is:

1. An apparatus comprising:
a network device comprising:
at least one network interface and
circuitry to transmit one or more packets for Integrated Access Backhaul (IAB) via a 3rd Generation Partnership Project (3GPP)-consistent wireless network and transmit one or more other packets for IAB by Multi Access Management Services (MAMS) over Generic Multi-Access (GMA) protocol over a second network, wherein the circuitry is to:
based on transmission of a probe packet, determine a latency and/or congestion level of the second network;
select use of the second network based on the determined latency and/or congestion of the second network at least in response to the probe packet; and
cause transmission of the one or more other packets to a receiver using the selected second network in accordance with MAMS over GMA, wherein the second network comprises a MAMS over GMA network whereby a GMA client communicates with a GMA server through a GMA relay device.

2. The apparatus of claim 1, wherein communication by MAMS over GMA for the second network are to utilize:
for a first connection type identified in a header of at least one of the one or more transmitted packets: Internet Protocol (IP) virtual connection,
for a second connection type identified in the header of at least one of the one or more transmitted packets: General Packet Radio System Tunnelling Protocol User Plane (GTP-U) virtual connection, and
for a third connection type identified in the header of at least one of the one or more transmitted packets: F1 application protocol (F1-AP) virtual connection.

3. The apparatus of claim 1, wherein the second network is consistent with one or more of: Institute of Electrical and Electronics Engineers (IEEE) 802.11, 3rd Generation Partnership Project (3GPP) Long Term Evolution (LTE)/Fifth Generation (5G), wireline, or satellite.

4. The apparatus of claim 1, wherein the one or more other packets transmitted over the second network comprises a multi-access (MX) uplink (UL) user-plane (UP) Transport Layer (TNL) information element (IE) for an Integrated Access Backhaul (IAB) Backhaul Adaptation Protocol (BAP) to specify an offset amount from an end of a User Datagram Protocol (UDP) field to a beginning of General Packet Radio System Tunnelling Protocol User Plane (GTP-u) header field.

5. The apparatus of claim 1, wherein the network device comprise an Integrated Access Backhaul (IAB) node or IAB donor node.

6. The apparatus of claim 1, wherein the circuitry is to:
cause transmission of a duplicated data packet on the second network, wherein the duplicated data packet is associated with a low priority,
determine a latency and congestion level of the second network based on transmission of the duplicated data packet, and
select use of the second network based on the determined latency and/or congestion level.

7. The apparatus of claim 1, wherein the at least one network interface comprises circuitry that is to:
based on a drop of a packet associated with a packet group so that the packet is not egressed, drop at least one other packet in the packet group, wherein packets of the packet group are identified by a value in a header of the packets and are associated with video data.

8. The apparatus of claim 1, wherein the at least one network interface comprises circuitry that is to:
proactively drop received packets of the one or more packets based on a predicted number of bytes to drop from low priority to high priority, wherein the predicted number of bytes to drop is based on an enqueue time of at least one of the received packets meeting or exceeding a configured level.

9. The apparatus of claim 1, wherein the at least one network interface comprises circuitry that is to:
apply a congestion control technique to more heavily weigh dropped high priority packets than dropped low priority packets in a determination of whether to signal congestion to a sender, wherein dropped high priority packets increases a likelihood to signal congestion to the sender of the one or more packets.

10. The apparatus of claim 1, wherein the circuitry is to:
transmit packets by multiple hops using frequencies utilized by user equipment (UE) by access to a Third Generation Partnership Project (3GPP)-consistent network and a second network based on selection of network paths in a multi-access (MX) communication environment over a protocol specified to encode control information at a sublayer, wherein the control information includes key, sequence number, and time stamp.

11. A method comprising:
a network device performing:
transmitting one or more packets for Integrated Access Backhaul (IAB) via a 3rd Generation Partnership Project (3GPP)-consistent wireless network and transmitting one or more other packets for IAB by Multi Access Management Services (MAMS) over Generic Multi-Access (GMA) protocol over a second network;
transmitting a probe packet to the second network;
determining a latency and/or congestion level of the second network; and
selecting use of the second network based on the determined latency and/or congestion of the second network at least in response to the probe packet; and transmitting the one or more other packets to a receiver using the selected second network in accordance with MAMS over GMA, wherein the second network comprises a MAMS over GMA network whereby a GMA client communicates with a GMA server through a GMA relay device.

12. The method of claim 11, wherein the MAMS over GMA for the 3GPP-consistent network and the second network are to utilize one or more of:
for a first connection type: Internet Protocol (IP) virtual connection,
for a second connection type: General Packet Radio System Tunnelling Protocol User Plane (GTP-U) virtual connection, and
for a third connection type: F1 application protocol (F1-AP) virtual connection.

13. The method of claim 11, wherein the second network is consistent with one or more of: Institute of Electrical and Electronics Engineers (IEEE) 802.11, 3rd Generation Partnership Project (3GPP) Long Term Evolution (LTE)/Fifth Generation (5G), wireline, or satellite.

14. The method of claim 11, wherein the one or more packets transmitted over the second network comprises a multi-access (MX) uplink (UL) user-plane (UP) Transport Layer (TNL) information element (IE) for an Integrated Access Backhaul (IAB) Backhaul Adaptation Protocol (BAP) to specify an offset amount from an end of a User Datagram Protocol (UDP) field to a beginning of General Packet Radio System Tunnelling Protocol User Plane (GTP-u) header field.

15. The method of claim 11, wherein the network device comprise an IAB node or IAB donor node.

16. The method of claim 11, comprising:
causing transmission of a probe packet on the second network, wherein the probe packet is associated with a low priority,
determining a latency and congestion level of the second network based on transmission of the probe packet, and
selecting use of the second network based on the determined latency and/or congestion level.

17. The method of claim 11, comprising:
causing transmission of a duplicated data packet on the second network, wherein the duplicated data packet is associated with a low priority,
determining a latency and congestion level of the second network based on transmission of the duplicated data packet, and
selecting use of the second network based on the determined latency and congestion level.

18. The method of claim 11, wherein the transmitting packets to the receiver using the selected second network in accordance with MAMS over GMA comprises transmitting IAB backhaul traffic without use of a User Datagram Protocol (UDP) over Internet Protocol (IP) header.

* * * * *